(12) United States Patent
Paullin et al.

(10) Patent No.: US 10,479,841 B2
(45) Date of Patent: Nov. 19, 2019

(54) OXIDIZED SOY POLYSACCHARIDE

(71) Applicants: E I DU PONT DE NEMOURS AND COMPANY, Wilmington, DE (US); SOLAE, LLC, St. Louis, MO (US)

(72) Inventors: Jayme L. Paullin, Claymont, DE (US); Rakesh Nambiar, West Chester, PA (US); Tam H. Tran, Ballwin, MO (US); Brian C. Pierce, St. Louis, MO (US)

(73) Assignee: Solae Company LLC

( * ) Notice: Subject to any disclaimer, the term of this patent is extended or adjusted under 35 U.S.C. 154(b) by 61 days.

(21) Appl. No.: 15/563,652

(22) PCT Filed: Mar. 28, 2016

(86) PCT No.: PCT/US2016/024585
§ 371 (c)(1),
(2) Date: Oct. 2, 2017

(87) PCT Pub. No.: WO2016/160740
PCT Pub. Date: Oct. 6, 2016

(65) Prior Publication Data
US 2018/0079832 A1    Mar. 22, 2018

Related U.S. Application Data

(60) Provisional application No. 62/142,665, filed on Apr. 3, 2015, provisional application No. 62/180,795, filed on Jun. 17, 2015.

(51) Int. Cl.
*C11D 3/22* (2006.01)
*C08B 37/00* (2006.01)
*C11D 3/00* (2006.01)

(52) U.S. Cl.
CPC ............ *C08B 37/00* (2013.01); *C11D 3/0036* (2013.01); *C11D 3/223* (2013.01)

(58) Field of Classification Search
CPC ............ C11D 3/22; C11D 3/223; C08B 37/00
See application file for complete search history.

(56) References Cited

U.S. PATENT DOCUMENTS

2007/0015678 A1* 1/2007 Rodrigues ................. C02F 5/02
510/320
2008/0175964 A1* 7/2008 Padmanabhan ......... A23L 11/07
426/254

OTHER PUBLICATIONS

Berg et al., "Complex Carbohydrates are Formed by Linkage of Monosaccharides", Biochemistry, 5th Edition, 2002, pp. 1-4.
O'Toole, "Characteristics and Uses of Okara, the Soybean Residue from Soy Milk Production—A Review", J. Agric. Food Chem., 1999, vol. 47, pp. 363-371.
Saito et al., "TEMPO-Mediated Oxidation of Native Cellulose. The Effect of Oxidation Conditions on Chemical and Crystal Structures of the Water-Insoluble Fractions", Biomacromolecules, 2004, vol. 5, pp. 1983-1989.

(Continued)

*Primary Examiner* — Brian P Mruk

(57) ABSTRACT

Compositions comprising oxidized soy polysaccharide compounds are disclosed herein. Oxidized soy polysaccharide compounds are produced by contacting soy polysaccharide under aqueous conditions with at least one N-oxoammonium salt, periodate compound, and/or peroxide compound.

13 Claims, 6 Drawing Sheets

(56) References Cited

OTHER PUBLICATIONS

Tamura et al., "Oxidation of Curdlan and Other Polsaccharides by 4-Acetaide-TEMPO/NaClO/NaClO Under Acid Conditions", Carbohydrate Polymers, 2010, vol. 81, pp. 592-598.
Xia et al., "Preparation of Water Soluble Chitosan by Hydrolysis Using Hydrogen Peroxide", International Journal of Biology Macromolecules, 2013, vol. 59, pp. 242-245.
Kristiansen et al., "Periodate Oxidation of Polysaccharides for Modification of Chemical and Physical Properties", Carbohydrate Research, 2010, vol. 345, pp. 1264-1271.
International Preliminary Report on Patentability, International Application No. PCT/US2016/024585. International Filing Date Mar. 28, 2016.

* cited by examiner

OXIDIZED SOY POLYSACCHARIDE

This application claims the benefit of U.S. Provisional Application Nos. 62/142,665 (filed Apr. 3, 2015) and 62/180,795 (filed Jun. 17, 2015), which are both incorporated herein by reference in their entirety.

FIELD OF INVENTION

The present disclosure is in the field of soy polysaccharide derivatives. For example, the disclosure pertains to oxidized soy polysaccharide and methods of preparation thereof.

BACKGROUND

Soy polysaccharide (soy fiber) is produced in large quantities as a byproduct of protein and oil isolation during soybean processing. This carbohydrate byproduct, which is commonly referred to as soy spent flakes or soy fiber, is composed primarily of water-insoluble cell wall polysaccharides. Although the polysaccharide components of this material obtained from some isolation processes can make up over 80% of its dry matter, limited knowledge exists of the exact structure and linkages of these carbohydrates. Structural analyses have indicated that soy polysaccharide is composed primarily of various monosaccharides including galactose, glucose, arabinose, galacturonic acid, xylose, rhamnose and fucose (Aspinall et al., *J. Chem. Soc. C*(0), 1065-1070). Also, it has been shown that soy polysaccharide contains spans of certain polysaccharide, such as galacturonans, rhamnogalacturonans, arabinogalactans and arabinans (FIG. 1).

Soy polysaccharide is generally insoluble in many types of solvents, including water. For this reason, recent studies on this type of polysaccharide have focused on either chemical extraction alone (Li et al., *Molecules* 17:753-761) or in combination with enzymatic hydrolysis (Yamaguchi et al., *Carbohydrate Polymers* 30:265-273) to solubilize the polysaccharide for structural analysis. These types of solubilization techniques have made soy polysaccharide more accessible to structural analysis techniques (e.g., NMR, SEC).

Despite these advances, development of new techniques for solubilizing soy polysaccharides could be beneficial. Solubilized soy polysaccharides produced by alternative means, such as those now disclosed herein, have potential utility in various applications.

SUMMARY OF INVENTION

In one embodiment, the disclosure concerns a composition comprising an oxidized soy polysaccharide compound, wherein the compound is produced by contacting soy polysaccharide under aqueous conditions with (i) at least one N-oxoammonium salt, (ii) at least one periodate compound, and/or (iii) at least one peroxide compound.

In another embodiment, the soy polysaccharide is contacted with the N-oxoammonium salt.

In another embodiment, the soy polysaccharide is first contacted with the periodate compound, and then contacted with the N-oxoammonium salt.

In another embodiment, the N-oxoammonium salt comprises a TEMPO oxoammonium salt. The N-oxoammonium salt comprises a 4-acetamido-TEMPO oxoammonium salt in another embodiment.

In another embodiment, the soy polysaccharide is contacted with the peroxide compound. The peroxide compound can be hydrogen peroxide in another embodiment.

In another embodiment, the composition is a household product, personal care product, industrial product, pharmaceutical product, or food product. The composition is a detergent composition in another embodiment. A detergent composition is preferably a household product, for example.

In another embodiment, the disclosure concerns a method for producing an oxidized soy polysaccharide compound. This method comprises: contacting soy polysaccharide under aqueous conditions with (i) at least one N-oxoammonium salt, (ii) at least one periodate compound, and/or (iii) at least one peroxide compound, wherein the soy polysaccharide is oxidized by the N-oxoammonium salt, periodate compound, and/or peroxide compound thereby producing an oxidized soy polysaccharide compound. The oxidized soy polysaccharide compound produced by this method can optionally be isolated.

In another embodiment of the method, the soy polysaccharide is contacted with the N-oxoammonium salt.

In another embodiment of the method, the soy polysaccharide is first contacted with the periodate compound, and then contacted with the N-oxoammonium salt.

In another embodiment of the method, the N-oxoammonium salt comprises a TEMPO oxoammonium salt. The N-oxoammonium salt can comprise a 4-acetamido-TEMPO oxoammonium salt in another embodiment of the method.

In another embodiment of the method, the TEMPO oxoammonium salt is provided in the method by oxidizing an agent comprising TEMPO under the aqueous conditions. The agent comprising TEMPO is 4-acetamido-TEMPO in another embodiment.

In another embodiment of the method, the soy polysaccharide is contacted with the peroxide compound. The peroxide compound can be hydrogen peroxide in another embodiment.

In another embodiment, the aqueous conditions of the method are acidic or basic.

In another embodiment, the disclosure concerns a method of preparing an aqueous composition having increased builder and/or anti-redeposition capacity. This method comprises: contacting an oxidized soy polysaccharide compound produced according to the present disclosure with an aqueous composition, wherein the builder and/or anti-redeposition capacity of the aqueous composition is increased by the oxidized soy polysaccharide compound compared to the builder and/or anti-redeposition capacity of the aqueous composition as it existed before the contacting step.

In another embodiment, the disclosure concerns a method of treating a material. This method comprises: contacting a material with an aqueous composition comprising an oxidized soy polysaccharide compound produced according to the present disclosure.

DETAILED DESCRIPTION

Figure 1:
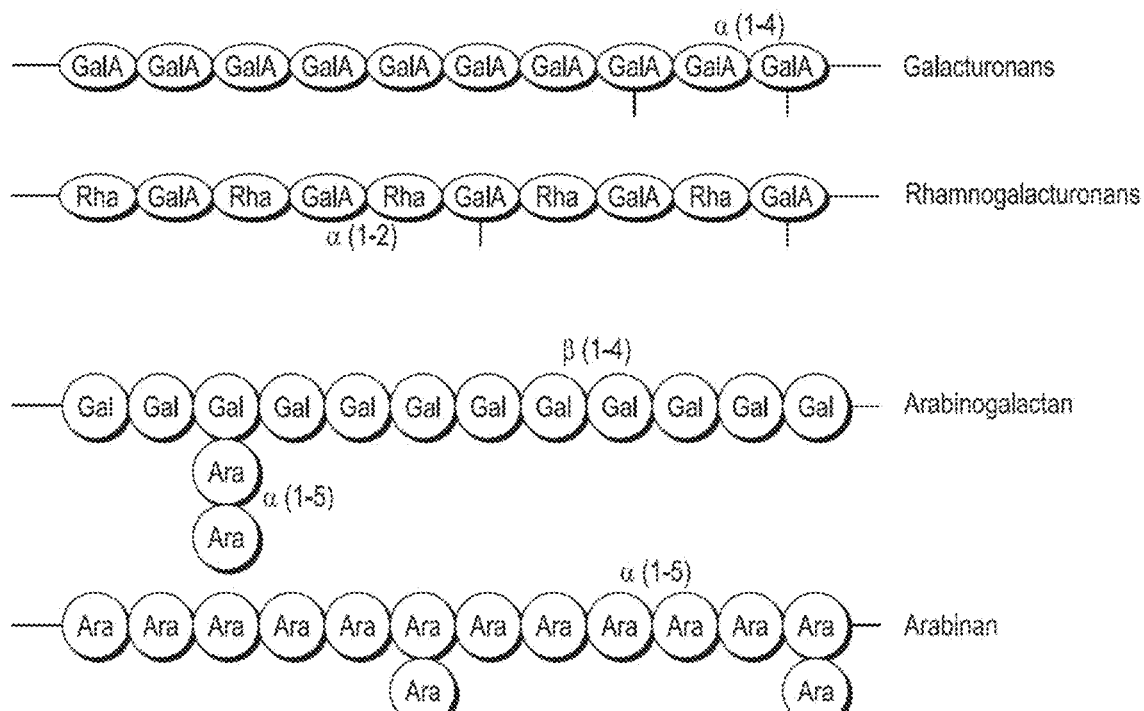
FIG. 1: Types of polysaccharides typically found within soy polysaccharide polymer. GalA, galacturonic acid; Rha, rhamnose; Gal, galactose; Ara, arabinose.

The disclosures of all patent and non-patent literature cited herein are incorporated herein by reference in their entirety.

Unless otherwise disclosed, the terms "a" and "an" as used herein are intended to encompass one or more (i.e., at least one) of a referenced feature.

Where present, all ranges are inclusive and combinable, except as otherwise noted. For example, when a range of "1 to 5" is recited, the recited range should be construed as including ranges "1 to 4", "1 to 3", "1-2", "1-2 & 4-5", "1-3 & 5", and the like.

The terms "soy polysaccharide" and "soy fiber" are used interchangeably herein, and refer to the high molecular weight, water-insoluble polysaccharide material of soybeans. Typically, soy polysaccharide is obtained from cell wall structural components of soybeans.

The terms "glycosidic linkage", "glycosidic bond" and the like are used interchangeably herein and refer to the type of covalent bond that joins a carbohydrate molecule to another carbohydrate molecule. The glycosidic linkage profile of soy polysaccharide herein can be determined using any method known in the art. For example, a linkage profile can be determined using methods that use nuclear magnetic resonance (NMR) spectroscopy (e.g., $^{13}$C NMR or $^{1}$H NMR). These and other methods that can be used are disclosed in *Food Carbohydrates: Chemistry, Physical Properties, and Applications* (S. W. Cui, Ed., Chapter 3, S. W. Cui, Structural Analysis of Polysaccharides, Taylor & Francis Group LLC, Boca Raton, Fla., 2005), which is incorporated herein by reference.

The "molecular weight" of soy polysaccharide or an oxidized soy polysaccharide compound herein can be represented as weight-average molecular weight ($M_w$) or number-average molecular weight ($M_n$), the units of which are in Daltons or grams/mole. Alternatively, molecular weight can be represented as $DP_w$ (weight average degree of polymerization) or $DP_n$ (number average degree of polymerization). Various means are known in the art for calculating these molecular weight measurements such as with high-pressure liquid chromatography (HPLC), size exclusion chromatography (SEC), or gel permeation chromatography (GPC).

The terms "oxidized soy polysaccharide compound", "oxidized soy polysaccharide derivative", "oxidized soy polysaccharide" and the like are used interchangeably herein. An oxidized soy polysaccharide compound herein is a compound resulting from oxidation of one or more of the hydroxyl groups of the monosaccharide monomeric units (e.g., galactose, glucose, arabinose, galacturonic acid, xylose, rhamnose, and/or fucose) of a soy polysaccharide. This oxidation may independently convert each of these hydroxyl groups to an aldehyde, ketone, or carboxylic group. Soy polysaccharide can be oxidized herein by contacting it with one or more oxidizing/oxidation agents (e.g., an N-oxoammonium salt, periodate compound, and/or peroxide compound) under aqueous conditions, for example. It is believed that oxidized soy polysaccharide as disclosed herein can also be prepared via application of other oxidation processes, if desired, such as processes disclosed in Canadian Patent Publ. Nos. 2028284 and 2038640, and U.S. Pat. Nos. 4,985,553, 2,894,945, 5,747,658 and 7,595,392, all of which are incorporated herein by reference. Some forms of oxidized soy polysaccharide herein can be water-soluble, while other forms can be water-insoluble, for example.

The term "oxidized" as used herein characterizes a compound, or atom within a compound, from which electrons have been removed. The carbon of a primary alcohol group (R—CH$_2$—OH) in a monomeric unit (e.g., position 6 in certain pyranose ring monomeric units such as galactose) in soy polysaccharide can be oxidized to an aldehyde (R—CHO) or carboxylic acid (R—COOH). The carbon of a secondary alcohol group (R$_1$R$_2$CH—OH) in a monomeric unit of soy polysaccharide can be oxidized to a ketone (R$_1$R$_2$CH=OH). Alternatively, a secondary alcohol group (R$_1$R$_2$CH—OH) in a monomeric unit of soy polysaccharide can be oxidized to an aldehyde or carboxylic acid group, in which case the monomeric ring unit of soy polysaccharide is opened (i.e., no longer cyclic).

An "agent for oxidizing soy polysaccharide" (and similar terms) herein can comprise an N-oxoammonium salt, a periodate, and/or a peroxide compound, for example.

The terms "N-oxoammonium salt" and "oxoammonium salt" are used interchangeably herein. An N-oxoammonium salt herein refers to the following structure:

(structure I)

where R$^1$ and R$^2$ each represent the same or different organic groups (e.g., a linear or branched carbon chain), and X$^-$ is a counterion. Alternatively, R$^1$ and R$^2$ can each be part of the same group bound to the N$^+$, in which case N$^+$ is part of a ring structure. An example herein of an N-oxoammonium salt having a ring structure (i.e., a "cyclic N-oxoammonium salt") is a TEMPO oxoammonium salt.

The term "TEMPO oxoammonium salt" herein refers to the following structure:

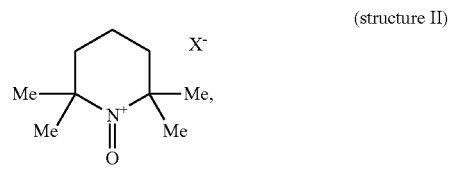

(structure II)

where each Me represents a methyl group and X$^-$ is a counterion. An example of an N-oxoammonium salt comprising TEMPO oxoammonium salt is 4-acetamido-TEMPO oxoammonium salt.

The terms "4-acetamido-TEMPO oxoammonium salt", "4-acimido-TEMPO oxoammonium salt" and the like are used interchangeably herein. 4-acetamido-TEMPO oxoammonium salt herein refers to the following structure:

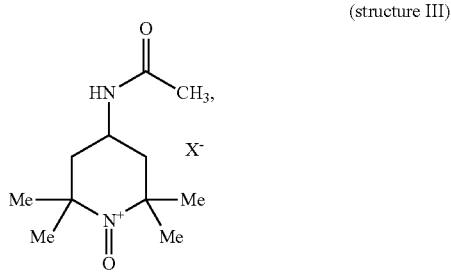

(structure III)

where each Me represents a methyl group and $X^-$ is a counterion.

An "agent comprising TEMPO" herein refers to an agent/compound comprising 2,2,6,6-tetramethylpiperidine 1-oxyl (TEMPO). TEMPO has the following structure:

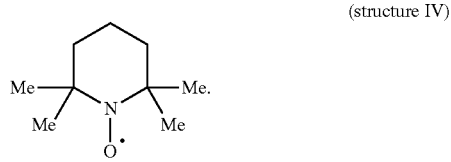 [SMILES: CC1(C)CCCC(C)(C)N1O]

(structure IV)

Examples of agents comprising TEMPO are TEMPO itself and 4-acetamido-TEMPO. "4-acetamido-TEMPO" (alternatively referred to as "4-acimido-TEMPO") has the following structure:

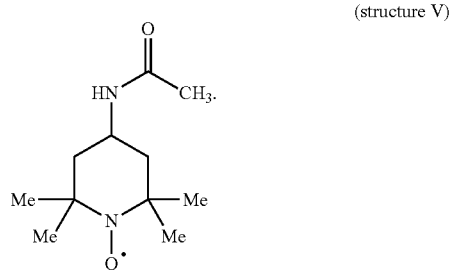 [SMILES: CC(=O)NC1CC(C)(C)N(O)C(C)(C)C1]

(structure V)

An agent comprising TEMPO can be oxidized to its corresponding N-oxoammonium salt. For example, TEMPO can be oxidized to TEMPO oxoammonium salt, and 4-acetamido-TEMPO can be oxidized to 4-acetamido-TEMPO oxoammonium salt. Thus, a "precursor of an N-oxoammonium salt" such as TEMPO or 4-acetamido-TEMPO, can be used to provide an N-oxoammonium salt in an oxidation reaction as disclosed herein.

The terms "periodate", "periodate compound" and the like are used interchangeably herein and refer to a salt of periodic acid containing the monovalent anion $IO^-$. An example of a periodate herein is sodium periodate (e.g., sodium metaperiodate[$NaIO_4$]).

The terms "peroxide", "peroxide compound" and the like are used interchangeably herein and refer to a compound containing an oxygen-oxygen (O—O) single bond or a peroxide anion ($O_2^{-2}$). The O—O group is called the peroxide group (peroxo group). Hydrogen peroxide ($H_2O_2$) is an example of a peroxide compound herein.

The terms "reaction", "reaction preparation", "reaction composition", "oxidation reaction" and the like are used interchangeably herein and refer to a reaction under aqueous conditions comprising at least soy polysaccharide and an N-oxoammonium salt, a periodate, and/or a peroxide. A reaction preparation herein typically begins as a mixture (e.g., slurry), and becomes a solution (or at least partly a solution) as soy polysaccharide becomes oxidized. A reaction is conducted under suitable conditions (e.g., time, temperature, pH) for the N-oxoammonium salt, periodate, and/or peroxide to oxidize one or more hydroxyl groups of the monosaccharide monomeric units of soy polysaccharide, thereby yielding an oxidized soy polysaccharide compound.

The terms "aqueous conditions", "aqueous reaction conditions", "aqueous setting", "aqueous system" and the like are used interchangeably herein. Aqueous conditions herein refer to a solution or mixture in which the solvent is at least about 60 wt % water, for example. An oxidation reaction herein can be performed under aqueous conditions. Aqueous conditions can be acidic or basic, for example.

The terms "acidic", "acidic conditions", "acidic aqueous conditions" and the like are used interchangeably herein. Acidic conditions herein can refer to a solution or mixture pH of 5.5 or less, for example. Acidic conditions can be prepared by any means known in the art, such as by adding acetic acid and/or an acetate salt to a solution or mixture.

The terms "basic", "basic conditions", "basic aqueous conditions", "alkaline" and the like are used interchangeably herein. Basic conditions herein can refer to a solution or mixture pH of 8.5 or more, for example. Basic conditions can be prepared by any means known in the art, such as by adding sodium hydroxide to a solution or mixture.

The term "crosslink" herein refers to a chemical bond, atom, or group of atoms that connects two adjacent atoms in one or more molecules. It should be understood that, in a composition comprising crosslinked oxidized soy polysaccharide, crosslinks can be between at least two oxidized soy polysaccharide molecules (i.e., intermolecular crosslinks); there can also be intramolecular crosslinking. A "crosslinking agent" as used herein is an atom or compound that can create crosslinks.

An "aqueous composition" herein has a liquid component that comprises at least about 10 wt % water, for example. Examples of aqueous compositions include mixtures, solutions, dispersions (e.g., colloidal dispersions), suspensions and emulsions, for example. Aqueous compositions in certain embodiments comprise oxidized soy polysaccharide that is (i) dissolved in the aqueous composition (i.e., in solution), or (ii) not dissolved in the aqueous composition (e.g., present as a colloidal dispersion).

As used herein, the term "colloidal dispersion" refers to a heterogeneous system having a dispersed phase and a dispersion medium, i.e., microscopically dispersed insoluble particles (e.g., some forms of oxidized soy polysaccharide herein) are suspended throughout another substance (e.g., an aqueous composition such as water or aqueous solution). An example of a colloidal dispersion herein is a hydrocolloid. All, or a portion of, the particles of a colloidal dispersion such as a hydrocolloid can comprise certain oxidized soy polysaccharide compounds of the present disclosure. The terms "dispersant" and "dispersion agent" are used interchangeably herein to refer to a material that promotes the formation and/or stabilization of a dispersion.

The terms "hydrocolloid" and "hydrogel" are used interchangeably herein. A hydrocolloid refers to a colloid system in which water or an aqueous solution is the dispersion medium.

The term "aqueous solution" herein refers to a solution in which the solvent comprises water. An aqueous solution can serve as a dispersant in certain aspects herein. Oxidized soy polysaccharide compounds in certain embodiments can be dissolved, dispersed, or mixed within an aqueous solution.

The term "viscosity" as used herein refers to the measure of the extent to which a fluid or an aqueous composition resists a force tending to cause it to flow. Various units of viscosity that can be used herein include centipoise (cPs) and Pascal-second (Pa·s). One poise is equal to 0.100 $kg \cdot m^{-1} \cdot s^{-1}$, or 1 mPa·s. Thus, the terms "viscosity modifier" and "viscosity-modifying agent" as used herein refer to anything that can alter/modify the viscosity of a fluid or aqueous composition.

The term "shear thinning behavior" as used herein refers to a decrease in the viscosity of an aqueous composition as shear rate increases. The term "shear thickening behavior" as used herein refers to an increase in the viscosity of an aqueous composition as shear rate increases. "Shear rate" herein refers to the rate at which a progressive shearing deformation is applied to an aqueous composition. A shearing deformation can be applied rotationally, for example.

The term "contacting" as used herein with respect to methods of increasing the builder capacity and/or anti-redeposition capacity of an aqueous composition refers to any action that results in bringing together an aqueous composition with at least one oxidized soy polysaccharide compound as presently disclosed. Contacting can be performed by any means known in the art, such as mixing, shaking, or homogenization, for example.

The terms "fabric", "textile", "cloth" and the like are used interchangeably herein to refer to a woven material having a network of natural and/or artificial fibers. Such fibers can be in the form of thread or yarn, for example.

A "fabric care composition" herein is any composition suitable for treating fabric in some manner. Examples of such a composition include laundry detergents and fabric softeners.

The terms "heavy duty detergent", "all-purpose detergent" and the like are used interchangeably herein to refer to a detergent useful for regular washing of white and colored textiles at any temperature. The terms "low duty detergent", "fine fabric detergent" and the like are used interchangeably herein to refer to a detergent useful for the care of delicate fabrics such as viscose, wool, silk, microfiber or other fabric requiring special care. "Special care" can include conditions of using excess water, low agitation, and/or no bleach, for example.

A "detergent composition" herein typically comprises at least a surfactant (detergent compound) and/or a builder. A "surfactant" herein refers to a substance that tends to reduce the surface tension of a liquid in which the substance is dissolved. A surfactant may act as a detergent, wetting agent, emulsifier, foaming agent, and/or dispersant, for example.

The terms "builder", "builder agent" and the like herein refer to compositions such as oxidized soy polysaccharide that, for example, can complex with hard water cations such as calcium and magnesium cations. Such complex formation is believed to prevent the formation of water-insoluble salt(s) by the cation(s). While not intending to be held to any particular theory, it is believed that oxidized soy polysaccharide herein orchestrates builder activity through cation sequestration (chelation) or cation exchange. In the context of a detergent composition for cleaning applications, a builder added thereto typically can enhance or maintain the cleaning efficiency of a surfactant present in the detergent composition. The terms "builder capacity", "builder activity" and the like are used interchangeably herein and refer to the ability of an aqueous composition to exhibit features endowed by one or more builders (e.g., oxidized soy polysaccharide) present in the aqueous composition.

The terms "anti-redeposition agent", "anti-soil redeposition agent", "anti-greying agent" and the like herein refer to agents that help keep soils from redepositing onto clothing in laundry wash water after these soils have been removed, therefore preventing greying/discoloration of laundry. Anti-redeposition agents can function by helping keep soil dispersed in wash water and/or by blocking attachment of soil onto fabric surfaces.

An "oral care composition" herein is any composition suitable for treating a soft or hard surface in the oral cavity such as dental (teeth) and/or gum surfaces.

The term "adsorption" herein refers to the adhesion of a compound (e.g., oxidized soy polysaccharide herein) to the surface of a material.

The terms "percent by volume", "volume percent", "vol %", "v/v %" and the like are used interchangeably herein. The percent by volume of a solute in a solution can be determined using the formula: [(volume of solute)/(volume of solution)]×100%.

The terms "percent by weight", "weight percentage (wt %)", "weight-weight percentage (% w/w)" and the like are used interchangeably herein. Percent by weight refers to the percentage of a material on a mass basis as it is comprised in a composition, mixture or solution.

The term "increased" as used herein can refer to a quantity or activity that is at least about 1%, 2%, 3%, 4%, 5%, 6%, 7%, 8%, 9%, 10%, 11%, 12%, 13%, 14%, 15%, 16%, 17%, 18%, 19%, 20%, 50%, 100%, or 200% more than the quantity or activity for which the increased quantity or activity is being compared. The terms "increased", "elevated", "enhanced", "greater than", "improved" and the like are used interchangeably herein.

The term "isolated" as used herein refers to material (e.g., oxidized soy polysaccharide) that has been completely or partially purified. Oxidized soy polysaccharide compounds of the present disclosure are synthetic, man-made compounds. Such compounds are believed to not occur in nature, and/or exhibit properties not believed to naturally occur.

Development of new techniques for solubilizing soy polysaccharide would be beneficial. Solubilized soy polysaccharide compounds produced by alternative means, such as those now disclosed herein, have potential utility in various applications.

Embodiments of the present disclosure concern a composition comprising an oxidized soy polysaccharide compound produced by contacting soy polysaccharide under aqueous conditions with (i) at least one N-oxoammonium salt, (ii) at least one periodate compound, and/or (iii) at least one peroxide compound. Thus, oxidized soy polysaccharide is disclosed. Significantly, such compounds are typically soluble in aqueous compositions, and can, for example, be used to provide builder activity and/or anti-redeposition activity to detergent compositions.

An oxidized soy polysaccharide compound herein is a compound resulting from oxidation of one or more of the hydroxyl groups of monosaccharide monomeric units of soy polysaccharide. Such oxidation may occur in all, or in at least 60%, 65%, 70%, 75%, 80%, 85%, 90%, 95%, 96%, 97%, 98%, or 99% (or any integer between 60% and 100%), of the constituent monomeric units of soy polysaccharide, for example.

It is believed that oxidation occurring at a primary alcohol group of a monomeric unit of soy polysaccharide herein converts the hydroxyl group to an aldehyde or carboxylic group. Typically, enhanced oxidation conditions (e.g., increased oxidation reaction time and/or amount of N-oxoammonium salt) may lead to conversion of a primary alcohol group to a carboxylic group, whereas weaker oxidation conditions may lead to conversion of a primary alcohol group to an aldehyde group.

It is believed that oxidation occurring at a secondary alcohol group of a monomeric unit of soy polysaccharide herein converts the hydroxyl group to a ketone, aldehyde, or carboxylic group. Typically, enhanced oxidation conditions (e.g., increased oxidation reaction time and/or amount of N-oxoammonium salt) may lead to conversion of a secondary alcohol group to a carboxylic group. Weaker oxidation conditions may lead to conversion of a secondary alcohol group to an aldehyde group or ketone group, which are both less oxidized than a carboxylic group.

Oxidation of a secondary alcohol group of a monosaccharide monomeric unit of soy polysaccharide to an aldehyde group or carboxylic acid group would open the monomeric ring (i.e., the monomeric unit would no longer be cyclic). Such ring opening would be attributable to breaking a carbon-carbon bond. Oxidation of secondary alcohol groups of soy polysaccharide to aldehyde and/or carboxylic groups may produce an oxidized soy polysaccharide product in which all or at least about 50%, 60%, 70%, 80%, or 90% (or any integer between 50% and 100%) of the constituent monomeric ring units of the soy polysaccharide have been opened, for example. In general, as more monomeric ring units are opened by oxidation, the molecular weight of the oxidized product decreases, since there is an increased chance of polymer fission (breakdown) by the ring-opening events. It is contemplated that such fission accounts for, at least in part, the increased solubility of oxidized soy polysaccharide compounds in aqueous compositions in certain aspects herein.

An oxidized soy polysaccharide compound is produced herein, for example, by contacting soy polysaccharide with at least one N-oxoammonium salt. In certain embodiments, the N-oxoammonium salt comprises a TEMPO oxoammonium salt. Examples of such an N-oxoammonium salt include TEMPO oxoammonium salt itself (structure II) and 4-acetamido-TEMPO oxoammonium salt (structure III). Structure II is comprised within structure III.

Noting that structures II and III are cyclic, an N-oxoammonium salt herein can be a "cyclic N-oxoammonium salt" (or "cyclic oxoammonium salt"). A cyclic N-oxoammonium salt herein can be represented by the following structure:

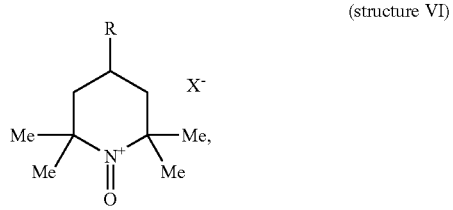

(structure VI)

where each Me represents a methyl group, X⁻ is a counterion, and R is a hydrogen (H), acetamido group (—NH—CO—CH₃), hydroxyl (—OH), amino (—NH₂), carboxyl (—COOH), methoxy (—OCH₃), cyano (—CN), oxo (═O), phosphonooxy [—O—PO(OH)₂], acetoxy (—O—CO—CH₃), benzoyloxy, acetamino, maleimido, or isothiocyanato group. It would be understood that where R in structure VI is an H, the cyclic N-oxoammonium salt is TEMPO oxoammonium salt. Examples of structure VI in which R is a moiety other than an H represent TEMPO oxoammonium salt that is substituted at carbon position 4 (where the N⁺ in structure VI is position 1 in the ring). For example, where R is an acetamido group, the cyclic N-oxoammonium salt of structure VI is 4-acetamido-TEMPO oxoammonium salt. Thus, for example, an N-oxoammonium salt herein can be TEMPO oxoammonium salt having a substitution at carbon position 4 (where the N⁺ in the ring of the TEMPO oxoammonium salt is position 1).

A TEMPO oxoammonium salt can be provided in certain embodiments by oxidizing an agent comprising TEMPO in the aqueous conditions in which the TEMPO oxoammonium salt is contacted with soy polysaccharide. An agent comprising TEMPO is an agent/compound comprising structure IV. Examples of an agent comprising TEMPO are TEMPO itself (structure IV) and 4-acetamido-TEMPO (structure V). Other examples of agents comprising TEMPO can be represented by the following structure:

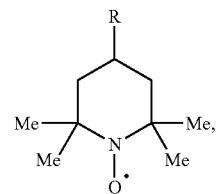

(structure VII)

where each Me represents a methyl group and R is a hydrogen (H), acetamido group (—NH—CO—CH₃), hydroxyl (—OH), amino (—NH₂), carboxyl (—COOH), methoxy (—OCH₃), cyano (—CN), oxo (═O), phosphonooxy [—O—PO(OH)₂], acetoxy (—O—CO—CH₃), benzoyloxy, acetamino, maleimido, or isothiocyanato group. Each of these agents can be converted to its corresponding oxoammonium salt, as represented by structure VI, by contacting it with one or more oxidation agents under aqueous conditions. Thus, structure VI can also be considered as a precursor of an N-oxoammonium salt. TEMPO and its derivatives, such as above (e.g., 4-acetamido-TEMPO), are examples of cyclic nitroxyl compounds. Thus, a cyclic nitroxyl compound can be used to provide a TEMPO oxoammonium salt herein.

An agent comprising TEMPO can be oxidized under aqueous conditions herein to its corresponding oxoammonium salt by contacting the agent with one or more "oxidation agents" (or "oxidant"). This contacting can be performed in the same aqueous conditions in which soy polysaccharide is contacted with an N-oxoammonium salt. In some embodiments, a reaction herein for oxidizing soy polysaccharide can initially be prepared to comprise, under aqueous conditions, at least soy polysaccharide, an agent comprising TEMPO (e.g., structure VII), and one or more oxidation agents. The oxidation agent(s) can convert the agent comprising TEMPO to its corresponding oxoammonium salt (e.g., structure VI), which in turn can oxidize the soy polysaccharide.

Non-limiting examples of an oxidation agent include one or more "inorganic oxidation agents" (or "inorganic oxidant"). An inorganic oxidation agent herein is not an oxoammonium salt such as a TEMPO oxoammonium salt since such compounds contain organic components (refer to structures I-III, for example). Examples of oxidation agents that may be used to convert an agent comprising TEMPO to its corresponding oxoammonium salt include one or more of a halite (e.g., a chlorite, such as sodium chlorite [$NaClO_2$]) or a hypohalite (e.g., a hypochlorite, such as sodium hypochlorite [NaClO]). Other examples of oxidation agents (inorganic or organic) that may be used to convert an agent comprising TEMPO to its corresponding oxoammonium salt include one or more of a halide salt such as KCl, KBr, NaCl, NaBr, or NaI; a hypohalite such as NaOBr; metals such as Fe(III), Mn(II), Mn(III), or Cu(II); $KMnO_4$; $Mn(OAc)_3$; $Mn_2O_3$; $MnO_2$; $Mn(NO_3)_2$; $MgCl_2$; $Mg(OAc)_2$; or Cu $(NO_3)_2$; iodobenzene diacetate [$PhI(OAc)_2$]; $Ca(ClO)_2$; t-BuOCl, $CuCl$—$O_2$; $NaBrO_2$; $Cl_2$; $Br_2$; and trichloroisocyanuric acid.

An oxidized soy polysaccharide compound can be produced herein, for example, by contacting soy polysaccharide with at least one periodate compound. A periodate compound can be a metal periodate (e.g., sodium periodate or potassium periodate), for example. A periodate compound can be a metaperiodate (e.g., $NaIO_4$) or an orthoperiodate in some aspects. Conditions for oxidizing soy polysaccharide with a periodate compound can follow those conditions as disclosed in U.S. Pat. Nos. 3,086,969, 6,800,753, 5,747,658 and/or 6635755, which are all disclosed herein by reference, and/or as disclosed in Example 2 below, for example.

In some aspects herein, an oxidized soy polysaccharide compound is produced by first contacting soy polysaccharide with a periodate compound, followed by contacting the periodate-oxidized soy polysaccharide with an N-oxoammonium salt. Such a sequential oxidation treatment can follow any of the processes disclosed herein, such as in Example 2 below.

An oxidized soy polysaccharide compound can be produced herein, for example, by contacting soy polysaccharide with at least one peroxide compound. A peroxide compound can be hydrogen peroxide, for example. In some aspects, a peroxide compound can be an inorganic peroxide compound or an organic peroxide compound. Suitable peroxide compounds herein further include perborate-monohydrate, perborate-tetrahydrate, percarbonates, alkali persulphates, persilicates, and percitrates, in which sodium or calcium is the preferred cation, as well as hydrogen peroxide adducts of urea or amine oxides, for example.

In some aspects herein, an oxidized soy polysaccharide compound is produced by first contacting soy polysaccharide with a peroxide compound, followed by contacting the peroxide-oxidized soy polysaccharide with an N-oxoammonium salt.

A soy polysaccharide in certain embodiments can be contacted with a peroxide compound in the absence of a chelating agent (e.g., EDTA), whereas in other embodiments a chelating agent can optionally be present.

Aqueous conditions are used in reactions disclosed herein for oxidizing soy polysaccharide. Aqueous conditions herein refer to a solution or mixture in which the solvent is at least about 60 wt % water. Alternatively, aqueous conditions herein are at least about 65, 70, 75, 80, 85, 90, or 95 wt % water (or any integer value between 60 and 95 wt %), for example. Aqueous conditions herein can comprise a buffer, such as an acidic, neutral, or alkaline buffer, at a suitable concentration and selected based on the pH range provided by the buffer. Examples of buffers include citric acid, acetic acid, $KH_2PO_4$, CHES and borate.

Aqueous conditions herein can be acidic, having a pH of 5.5 or less, for example. Alternatively, the pH may be about 2.0, 2.5, 3.0, 3.5, 4.0, 4.5, 5.0, or 5.5, for example. Acidic conditions can be prepared by any means known in the art, such as by adding acetic acid and/or an acetate salt to a solution or mixture. For example, a sodium acetate buffer (acetate buffer) (pH 4-5) (e.g., 0.2-0.3 M solution) can provide acidic conditions.

Aqueous conditions herein can be basic, having a pH of 8.5 or more, for example. Alternatively, the pH may be about 8.5, 9.0, 9.5, 10.0, 10.5, 11.0, 11.5, or 12, for example. Basic conditions can be prepared by any means known in the art, such as by adding an alkaline hydroxide (e.g., sodium hydroxide) to a solution or mixture.

Soy polysaccharide can be included in a reaction herein at about, or at least about, 0.1, 0.25, 0.5, 0.75, 1, 2, 3, 4, 5, 6, 7, 8, 9, or 10 wt % of the reaction, for example. Soy polysaccharide can be mixed or dissolved in aqueous conditions before or after an agent comprising a periodate compound, peroxide compound, TEMPO and/or an oxidation agent (which converts the agent comprising TEMPO to its corresponding oxoammonium salt) is added to the aqueous conditions. The oxidation agent in these particular embodiments can be sodium chlorite and/or sodium hypochlorite, for example.

An agent comprising TEMPO, such as TEMPO and/or 4-acetamido-TEMPO, can be included in a reaction herein at about, or at least about, 0.05, 0.075, 0.1, 0.25, 0.5, 0.75, 1, or 2 wt % of the reaction, for example. In certain embodiments, an agent comprising TEMPO can be added to a reaction in which soy polysaccharide has already been mixed or dissolved. Such addition may be made before, after, or at the time an oxidation agent is added to the reaction.

An oxidation agent such as sodium chlorite, sodium bromide, and/or sodium hypochlorite can be included in a reaction herein at about, or at least about, 0.1, 0.25, 0.5, 0.75, 1, 2, 3, 4, 5, 10, 15, 20, 25, 30, 35, 40, 45, or 50 wt % of the reaction, for example. In certain embodiments, an oxidation agent(s) can be added to a reaction in which soy polysaccharide has already been mixed or dissolved.

A reaction in certain embodiments may initially contain soy polysaccharide, an agent comprising TEMPO (e.g., 4-acetamido-TEMPO), and one or more oxidation agents (e.g., sodium chlorite, sodium bromide, and/or sodium hypochlorite) dissolved in a buffer solution (e.g., sodium acetate buffer at a pH of about 4-5) or other solution (e.g., sodium hydroxide solution at a pH of about 10.5-11.5). Optionally, no additional components are included in preparing this particular reaction.

Soy polysaccharide that is oxidized to produce an oxidized soy polysaccharide compound herein as disclosed herein is typically obtained as a byproduct of soybean protein and/or oil processing. Thus, soy polysaccharide herein can be derived from soybeans. Soybeans in certain aspects can be from cultivated soybean (*Glycine max*) or wild soybean (*Glycine soja*). Suitable *G. max* cultivars/varieties include Ohio FG1, Ohio FG2, Beeson (e.g., Beeson 80), Vinton 81, Willomi, Wolverine, Hawkeye, and Kanrich, for example. Additional examples of soybean plants from which soybeans can be obtained and used herein are disclosed in U.S. Pat. Nos. 7,777,102, 8,835,722, 8,822,776, 7,951,995, 7,951,995, 7,951,995, 6,147,193, and 5,852,226, which are all incorporated herein by reference. Soybeans herein can be from non-genetically modified or genetically modified plants in some aspects.

Figure 2:
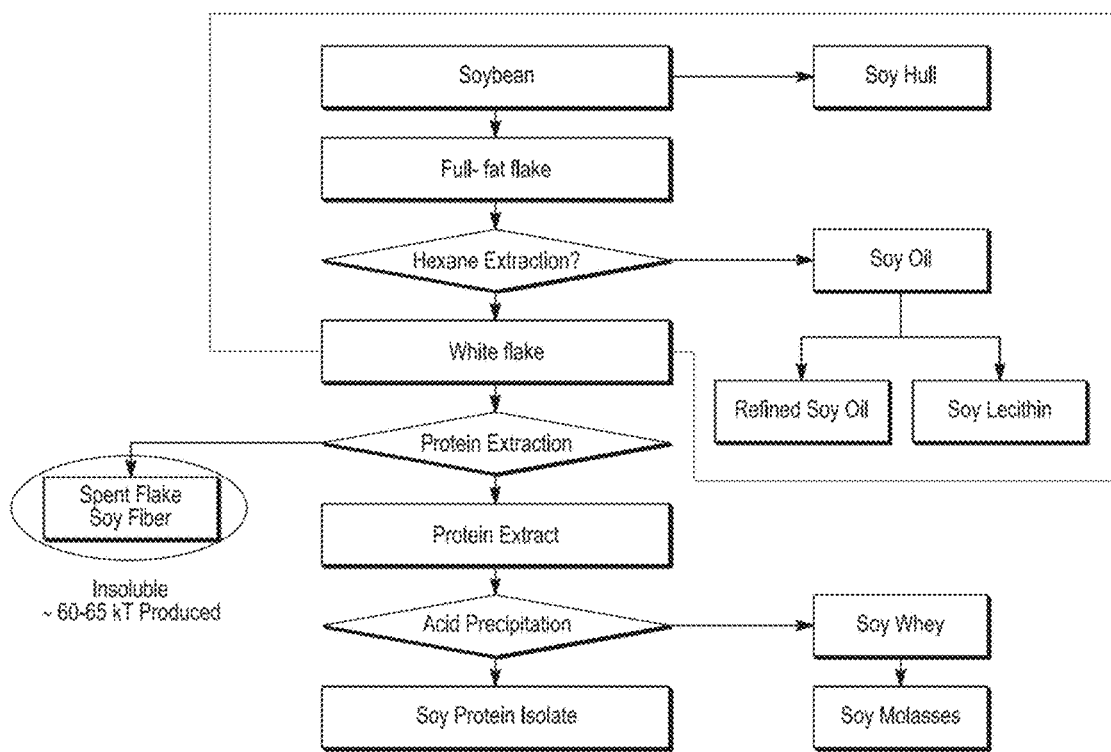
FIG. 2: Process for preparing insoluble soy polysaccharide. Refer to Examples.

Processing steps to obtain soy polysaccharide suitable for producing oxidized soy polysaccharide compounds of the present disclosure can follow those depicted in FIG. 2, if desired. For example, a soy polysaccharide production process can first comprise a step of producing white flakes from whole soybeans. Soy white flake production typically comprises: i) dehulling whole soybeans, ii) flaking the dehulled soybeans, iii) extracting soybean oil from the flaked soybeans with a solvent (e.g., organic solvent such as hexane), and 4) desolventizing the defatted soybeans (preferably without high heating or toasting) to produce white flakes. White flakes can also optionally be ground to soy flour, if desired, prior to the next step (protein extraction). Various procedures useful herein for producing soy white flakes are disclosed in, for example, U.S. Pat. Nos. 5,097,017 and 3,897,574, as well as in Serrato (*J. Am. Oil Chem. Soc.* 58:157-159) and Becker (*J. Am. Oil Chem. Soc.* 55:754-761), all of which are incorporated herein by reference.

Protein extraction can follow production of white flakes. The first step of protein extraction, which typically produces soy polysaccharide, comprises mixing white flakes with water and a base (to increase pH) to form a slurry. Protein solubility is increased in the slurry due to the increased pH. The slurry is then subjected to a process for separating the liquid (comprising protein and soluble sugar fractions) from the solids (comprising insoluble polysaccharide fraction), such as by decanting, centrifugation, and/or filtration. Solid material ("spent flake") obtained by this process can optionally be subjected to another round of alkaline slurry formation followed by liquid removal to further remove protein and other soluble components. Solid material resulting from one or more of the foregoing protein extractions comprises soy polysaccharide, and is suitable for producing oxidized soy polysaccharide compounds as disclosed herein. A soy polysaccharide preparation can optionally be washed (once or multiple times), dried, and/or powderized prior to its use for producing oxidized soy polysaccharide compounds. Dry soy polysaccharide can range from off-white (e.g., light brown, tan) to brown in color in certain aspects herein.

Soy polysaccharide used to produce oxidized soy polysaccharide herein is typically water-insoluble or exhibits only very little water-solubility, but is dispersible in water. Thus, soy polysaccharide herein is typically non-gelling, but can form a paste (but not a gel) when mixed with water. In general, 0%, or less than 5%, 4%, 3%, 2%, 1%, 0.5%, 0.25%, or 0.1% of soy polysaccharide carbohydrate components are soluble in water, for example. On the other hand, oxidized soy polysaccharide herein is typically water-soluble (however, some oxidized soy polysaccharide product herein can be water-insoluble). In general, 100%, or more than 90%, 91%, 92%, 93%, 94%, 95%, 96%, 97%, 98%, 99.0%, 99.5%, 99.75%, or 99.9% of oxidized soy polysaccharide components are soluble in water, for example While most material in a dry soy polysaccharide preparation is insoluble polysaccharide material, other components can optionally be present, such as protein, lipid, and ash. It is believed that this residual soy material, which in some circumstances is not completely removed during soy protein/oil acquisition processing, does not greatly inhibit oxidation of insoluble soy polysaccharide material as disclosed herein. Thus, a soy polysaccharide preparation herein can comprise at least about 50, 55, 60, 65, 70, 75, 76, 77, 78, 79, 80, 81, 82, 83, 84, 85, 86, 87, 88, 89, 90, 91, 92, 93, 94, 95, 96, 97, 98, or 99 wt % insoluble polysaccharide, for example, as measured on a dry basis (e.g., less than 1 or 0.5 wt % water). With respect to the presence of residual soy components, a soy polysaccharide preparation in some embodiments can comprise (i) less than about 25, 20, 15, 14, 13, 12, 11, 10, 9, 8, 7, 6, 5, 4, 3, 2, or 1 wt % protein; (ii) less than about 5, 4, 3, 2, or 1 wt % ash (minerals); (iii) less than about 10, 9, 8, 7, 6, 5, 4, 3, 2, or 1 wt % lipid; and/or (iv) less than about 5, 4, 3, 2, 1, or 0.5 wt % low molecular weight, water-soluble sugars, as measured on a dry basis (e.g., less than 1 or 0.5 wt % water). Other residual soy components that can be comprised within a soy polysaccharide preparation herein include isoflavones, lignans, phytosterols, coumestans, saponins and/or phytates, for example. In some embodiments, a soy polysaccharide preparation comprises about 84-86 wt % insoluble polysaccharide, 9-11 wt % protein, 3-4 wt % ash, and 0.5-1 wt % lipid.

Polysaccharide component(s) of a soy polysaccharide preparation suitable for preparing oxidized soy polysaccharide herein can comprise regions of one or more different types of polysaccharide chains, such as galacturonan, rhamnogalacturonan, arabinogalactan and/or arabinan (FIG. 1). Other polysaccharide sub-regions of soy polysaccharide may comprise galactan, xylogalacturonan, xylan, xyloglucan, and/or cellulose, for example. Still in some embodiments, soy polysaccharide can comprise, by molar percent, polysaccharide sub-component(s) as listed in Table A (Starting Spent Flake). Such molar percent can be within a range of plus/minus 5%, 10%, or 20% of the value(s) listed in Table A, for example.

TABLE A

Polysaccharide Composition (Molar %) of Oxidation Reaction Substrate and Products

| Polysaccharide | Starting Spent Flake | Oxidized Product Soluble | Oxidized Product Insoluble |
|---|---|---|---|
| Arabinan | 8.1 | 9.6 | 7.5 |
| Type I AG[a] | 27.8 | 37.1 | 21.6 |
| Type II AG | 2.0 | 0.9 | 2.0 |
| XG | 2.7 | 3.4 | 2.5 |
| Rhamnogalacturonan I/II | 6.2 | 11.1 | 6.7 |
| HG | 1.6 | 2.2 | 0.3 |
| (Glucurono)arabinoxylan | 14.4 | 18.3 | 11.9 |
| HM | 0.0 | 0.0 | 4.7 |
| Cellulose | 23.5 | 1.3 | 26.7 |
| Others (Unassigned) | 13.7 | 16.1 | 16.1 |

[a]Abbreviations: AG = arabinogalactan; HG = homogalacturonan; HM = heteromannan; XG = xyloglucan.

Soy polysaccharide suitable for preparing oxidized soy polysaccharide herein can comprise arabinose (Ara), galactose (Gal), xylose (Xyl), and galacturonic acid (GalA) as a majority of constituent monosaccharide monomeric units, as well as smaller amounts of rhamnose (Rha), glucose (Glc), fucose (Fuc) and mannose (Man). In certain embodiments, soy polysaccharide can comprise by weight ~21-28% Ara, ~14-42% Gal, ~10-35% GalA, ~5-17% Xyl, ~2-6% Rha, ~1-4% Fuc, ~1-4% Man, and/or ~1-6% Glc. Soy polysaccharide in certain other embodiments can comprise by weight ~11-13% Ara, ~40-42% Gal, ~30-32% Glc and Man, and ~2.5-3.5% Xyl. Soy polysaccharide can comprise polysaccharide sub-regions, monosaccharide monomers, and glycosidic linkage profiles disclosed in Li et al. (*Molecules* 17:753-761), for example, which is incorporated herein by reference. Still in some embodiments, soy polysaccharide can comprise, by molar percent, monosaccharide component(s) as listed in Table B or C (Starting soy polysaccharide or Starting Spent Flake) (either total mol. % of a monosaccharide component [regardless of linkage and/or p or f form], or by mol. % of a monosaccharide component as particularly linked [e.g., terminal Ara, or →2-Ara-1→] [optionally taking account of p or f form). Such molar percent can be within a range of plus/minus 5%, 10%, or 20% of the total or particular values listed in Table B or C, for example. The molar percent composition of monosaccharide components of soy polysaccharide can be measured using gas chromatography mass spectrometry (GC-MS), for example.

TABLE B

Linkage (Molar %) Profiles of Oxidation Reaction Substrate and Products

| Linkage | Starting Soy Polysaccharide | Oxidation Products | |
|---|---|---|---|
| | | Soluble | Insoluble |
| arabinose | | | |
| T-Araf-(1→ | 11.8 | 14.7 | 8.5 |
| T-Arap-(1→ | 2.0 | 0.8 | 3 |
| →2)-Araf-(→ | 0.2 | 0.2 | 0.3 |
| →3)-Araf-(1→ | 0.2 | 0.2 | 0.2 |
| →5)-Araf-(1→ | 11.4 | 14.8 | 7.4 |
| →3,5)-Araf-(1→ | 3.2 | 3.8 | 1.7 |
| →2,5)-Araf-(1→ | 2.1 | 2 | 1 |
| galactose | | | |
| T-Galp-(1→ | 2.8 | 3.0 | 1.7 |
| →4)-Galp-(1→ | 30.7 | 39.3 | 19.9 |
| →2)-Galp-(1→ | 1.0 | 0.4 | 1.3 |
| →6)-Galp-(1→ | 0.2 | 1 | 0.3 |
| →3,4)-Galp-(1→ | 0.4 | 0.8 | 0 |
| →2,4)-Galp-(1→ | 0.4 | 0.6 | 0 |
| →2,3,4)-Galp-(1→ | 0.1 | 0.1 | 0.2 |
| →2,4,6)-Galp-(1→ | 0.1 | 0.1 | 0 |
| glucose | | | |
| T-Glcp-(1→ | 0.3 | 0.1 | 0.3 |
| →4)-Glcp-(1→ | 20.1 | 0.5 | 39.7 |
| →3,4)-Glcp-(1→ | 0.4 | 0 | 0.9 |
| →2,4)-Glcp-(1→ | 0.2 | 0 | 0 |
| →4,6)-Glcp-(1→ | 1.7 | 0 | 0 |
| →3,6)-Glcp-(1→ | 0.9 | 0 | 0 |
| →3,4,6)-Glcp | 0.1 | 0 | 0.1 |
| fucose | | | |
| T-Fucp-(1→ | 1.5 | 1 | 1.8 |
| xylose | | | |
| →2-Xylp-(1→ | 2.8 | 3.4 | 3.1 |
| rhamnose | | | |
| →2,4)-Rhap-(1→ | 1.8 | 3 | 1.2 |
| mannose | | | |
| T-Manp-(1→ | 0.1 | 0 | 0.2 |
| →4,6)-Manp-(1→ | 0.2 | 0 | 2 |
| galacturonic acid | | | |
| T-GalAp-(1→ | 0.2 | 0.3 | 0.2 |
| →4)-GalAp-(1→ | 3.5 | 9.8 | 5 |

TABLE C

Linkage (Molar %) Profiles of Oxidation Reaction Substrate and Products

| Monosaccharide[a] | Linkage | Starting Soy Polysaccharide Mol % | Product Soluble Mol % | Product Insoluble Mol % |
|---|---|---|---|---|
| Ara(f) | Terminal | 12.3 | 15.3 | 11.0 |
| | 2- | 0.4 | 0.1 | 0.5 |

TABLE C-continued

Linkage (Molar %) Profiles of Oxidation Reaction Substrate and Products

| Monosaccharide[a] | Linkage | Starting Soy Polysaccharide Mol % | Product Soluble Mol % | Product Insoluble Mol % |
|---|---|---|---|---|
| | 3- | 0.2 | 0.3 | 0.4 |
| | 5- | 2.1 | 2.5 | 2.5 |
| | 3,5- | 3.0 | 3.5 | 2.5 |
| Ara(p) | Terminal | 1.7 | 1.2 | 2.8 |
| Gal(p) | Terminal | 2.0 | 4.3 | 3.3 |
| | 4- | 26.8 | 36.6 | 20.7 |
| | 3- | 1.7 | 0.7 | 1.7 |
| | 6- | 0.1 | 0.2 | 0.3 |
| | 3,4- | 0.5 | 0.3 | 0.4 |
| | 2,4- | 0.3 | 0.2 | 0.3 |
| | 3,4,6- | 0.1 | 0.0 | 0.0 |
| | 2,3,4- | 0.1 | 0.0 | 0.0 |
| Glc(p) | Terminal | 0.4 | 0.1 | 0.6 |
| | 4- | 24.0 | 1.7 | 27.0 |
| | 6- | 0.2 | 0.1 | 0.2 |
| | 3,4- | 0.3 | 0.9 | 0.4 |
| | 2,4- | 0.2 | 0.0 | 0.2 |
| | 4,6- | 0.5 | 0.4 | 0.4 |
| | 3,4,6- | 0.1 | 0.0 | 0.0 |
| Fuc(p) | Terminal | 1.4 | 0.7 | 3.1 |
| Xyl(p) | 2- | 1.1 | 2.2 | 1.5 |
| | 4- | 9.8 | 12.4 | 8.4 |
| | 2,4- | 2.0 | 2.8 | 1.3 |
| | 3,4- | 0.2 | 0.0 | 0.2 |
| Rha(p) | Terminal | 0.0 | 0.1 | 0.0 |
| | 2- | 0.9 | 1.4 | 1.5 |
| | 2,4- | 2.1 | 4.1 | 1.8 |
| Man(p) | Terminal | 0.2 | 0.2 | 0.0 |
| | 4,6- | 0.0 | 0.0 | 2.4 |
| GalA(p) | Terminal | 0.2 | 0.5 | 0.6 |
| | 4- | 4.7 | 6.5 | 3.7 |
| | 3,4- | 0.0 | 0.8 | 0.0 |
| GlcA(p) | Terminal | 0.1 | 0.0 | 0.3 |

[a]Abbreviations: (f) = furanose; (p) = pyranose; Ara = Arabinose; Gal = Galactose; Glc = Glucose; Fuc = Fucose; Xyl = Xylose; Rha = Rhamnose; GalA = Galacturonic Acid; GlcA = Glucuronic Acid; AG = Arabinogalactan; HG = Homogalacturonan; HM = Heteromannan; HX = Heteroxylan; RG = Rhamnogalactan; XG = Xyloglucan.

The molar percentages of monosaccharides and linkages provided in Tables B and C can be obtained following the procedures disclosed in Example 5, for example.

Any soy polysaccharide or soy polysaccharide preparation herein can be used to prepare oxidized soy compounds as presently disclosed. Thus, certain embodiments herein encompass compositions comprising oxidized soy polysaccharide and one or more of soy protein, soy lipid, and/or soy ash. As shown in Table 7 (Example 5 below), a preparation of oxidized soy polysaccharide, which was soluble in aqueous conditions, also comprised (on a dry weight basis) about 6.8% protein, 0.4% lipid, and 1% minerals (ash). Thus, an oxidized soy polysaccharide preparation can comprise (on a dry weight basis) about 5, 6, 7, or 8 wt % protein, for example. In other examples, an oxidized soy polysaccharide preparation can further comprise (on a dry weight basis) about 0.2, 0.3, 0.4, 0.5, or 0.6 wt % lipid, and/or about 0.5, 0.75, 1.0, 1.25 or 1.5 wt % minerals (ash).

Example 5 below demonstrates that certain polysaccharides can be present in an oxidized soy polysaccharide preparation (water-soluble or water-insoluble). Thus, an oxidized soy polysaccharide compound as presently disclosed can comprise different polysaccharide components, such as arabinan, arabinogalactan, homogalactan, homogalacturonan, rhamnogalacturonan, xyloglucan, and/or cellulose. As another example, an oxidized soy polysaccharide compound can comprise arabinan, type I arabinogalactan, homogalactan, homogalacturonan, and/or rhamnogalacturonan. Still in some embodiments, oxidized soy polysaccharide (water-soluble or -insoluble) can comprise, by molar percent, polysaccharide sub-component(s) as listed in Table A. Such molar percent can be within a range of plus/minus 5%, 10%, or 20% of the value(s) listed in Table A, for example.

Oxidized soy polysaccharide (water-soluble or -insoluble) in some aspects can comprise, by molar percent, monosaccharide component(s) as listed in Table B or C (either total mol. % of a monosaccharide component [regardless of linkage and/or p or f form], or by mol. % of a monosaccharide component as particularly linked [e.g., terminal Ara, or →2-Ara-1→] [optionally taking account of p or f form). Such molar percent can be within a range of plus/minus 5%, 10%, or 20% of the total or particular values listed in Table B or C, for example. The molar percent composition of monosaccharide components of oxidized soy polysaccharide can be measured using GC-MS, for example.

The average molecular weight (g/mol) (molar mass) of oxidized soy polysaccharides in a preparation thereof can be about, or at least about, 1000, 5000, 10000, 50000, 100000, 500000, or 1000000, for example. In certain embodiments, smaller sized oxidized compound can be produced with increasing levels of oxidizing agent (e.g., peroxide), and vice versa (FIG. 3 demonstrates this effect in particular aspects). Thus, a method of preparing oxidized soy polysaccharide compounds can optionally be characterized in some embodiments as a method of controlling the molecular weight of oxidized soy polysaccharide compounds (during preparation thereof).

In certain embodiments, a composition comprising an oxidized soy polysaccharide compound can be an aqueous composition, with or without a detectable amount of viscosity. It is believed that an aqueous composition comprising oxidized soy polysaccharide can, in some aspects, have a viscosity of about, or at least about, 3, 4, 5, 10, 15, 20, 25, 30, 35, 40, 45, or 50 cPs (or any integer between 3 and 50 cPs). Examples of aqueous compositions herein include aqueous mixtures, colloidal dispersions (e.g., hydrocolloid), and aqueous solutions.

Viscosity can be measured with an aqueous composition herein at any temperature between about 3° C. to about 110° C. (or any integer between 3 and 110° C.). Alternatively, viscosity can be measured at a temperature between about 4° C. to 30° C., or about 20° C. to 25° C., for example. Viscosity can be measured at atmospheric pressure (about 760 torr) or any other higher or lower pressure.

The viscosity of an aqueous composition herein can be measured using a viscometer or rheometer, or using any other means known in the art. The viscosity in such embodiments can be measured at a rotational shear rate of about 0.1 to 1000 rpm (revolutions per minute), for example. In other examples, viscosity can be measured at a rotational shear rate of about 10, 60, 150, 250, or 600 rpm.

The pH of an aqueous composition herein can be between about 2.0 to about 12.0, for example. Alternatively, pH can be about 2.0, 3.0, 4.0, 5.0, 6.0, 7.0, 8.0, 9.0, 10.0, 11.0, 12.0; or between 5.0 to about 12.0; or between about 4.0 and 8.0; or between about 5.0 and 8.0, for example.

An aqueous composition herein can comprise a solvent having at least about 10 wt % water. In other embodiments, a solvent is at least about 20, 30, 40, 50, 60, 70, 80, 90, or 100 wt % water (or any integer value between 10 and 100 wt %), for example.

An oxidized soy polysaccharide compound herein can be present in an aqueous composition at a wt % of about, or at least about, 0.01, 0.05, 0.1, 0.2, 0.3, 0.4, 0.5, 0.6, 0.7, 0.8, 0.9, 1.0, 1.2, 1.4, 1.6, 1.8, 2.0, 2.5, 3.0, 3.5, 4.0, 4.5, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, or 90 wt %, for example.

An aqueous composition herein can comprise other components in addition to an oxidized soy polysaccharide compound. For example, an aqueous composition can comprise one or more salts such as a sodium salt (e.g., NaCl, $Na_2SO_4$). Other non-limiting examples of salts include those having (i) an aluminum, ammonium, barium, calcium, chromium (II or III), copper (I or II), iron (II or III), hydrogen, lead (II), lithium, magnesium, manganese (II or III), mercury (I or II), potassium, silver, sodium strontium, tin (II or IV), or zinc cation, and (ii) an acetate, borate, bromate, bromide, carbonate, chlorate, chloride, chlorite, chromate, cyanamide, cyanide, dichromate, dihydrogen phosphate, ferricyanide, ferrocyanide, fluoride, hydrogen carbonate, hydrogen phosphate, hydrogen sulfate, hydrogen sulfide, hydrogen sulfite, hydride, hydroxide, hypochlorite, iodate, iodide, nitrate, nitride, nitrite, oxalate, oxide, perchlorate, permanganate, peroxide, phosphate, phosphide, phosphite, silicate, stannate, stannite, sulfate, sulfide, sulfite, tartrate, or thiocyanate anion. Thus, any salt having a cation from (i) above and an anion from (ii) above can be in an aqueous composition, for example. A salt can be present in an aqueous composition herein at a wt % of about 0.01 to about 10.00 (or any hundredth increment between 0.01 and 10.00), for example.

A composition comprising an oxidized soy polysaccharide compound herein can be non-aqueous (e.g., a dry composition). Examples of such embodiments include powders, granules, microcapsules, flakes, or any other form of particulate matter. Other examples include larger compositions such as pellets, bars, kernels, beads, tablets, sticks, or other agglomerates. A non-aqueous or dry composition herein typically has less than 3, 2, 1, 0.5, or 0.1 wt % water comprised therein. The amount of oxidized soy polysaccharide herein in a non-aqueous or dry composition can be about, or at least about, 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, 90, 91, 92, 93, 94, 95, 96, 97, 98, 99, 99.5, or 99.9 wt %, for example.

An oxidized soy polysaccharide compound comprised in certain embodiments as presently disclosed may be crosslinked. Any means known in the art may be used to crosslink one or more oxidized soy polysaccharide compounds. Such crosslinks may be borate crosslinks, where the borate is from any boron-containing compound (e.g., boric acid, diborates, tetraborates [e.g., tetraborate decahydrate], pentaborates, polymeric compounds such as Polybor®, polymeric compounds of boric acid, alkali borates), for example. Alternatively, crosslinks can be provided with polyvalent metals such as titanium or zirconium. Titanium crosslinks may be provided, for example, using titanium IV-containing compounds such as titanium ammonium lactate, titanium triethanolamine, titanium acetylacetonate, and polyhydroxy complexes of titanium. Zirconium crosslinks can be provided using zirconium IV-containing compounds such as zirconium lactate, zirconium carbonate, zirconium acetylacetonate, zirconium triethanolamine, zirconium diisopropylamine lactate and polyhydroxy complexes of zirconium, for example. Alternatively still, crosslinks can be provided using glyoxal, for example, such as disclosed in U.S. Patent Appl. Publ. No. 2008/0112907 which is incorporated herein by reference. Glyoxal can be applied under acidic conditions (e.g., slightly acidic conditions such as pH 5-6.5) in some aspects. Alternatively still, crosslinks can be provided with any crosslinking agent described in U.S. Pat. Nos. 4,462,917, 4,464,270, 4,477,360 and 4,799,550, which are all incorporated herein by reference. A crosslinking agent (e.g., borate) may be present in an aqueous composition herein at a concentration of about 0.2% to 20 wt %, or about 0.1, 0.2, 0.3, 0.4, 0.5, 1, 2, 3, 4, 5, 6, 7, 8, 9, 10, 15, or 20 wt %, for example.

It is believed that an oxidized soy polysaccharide compound in certain embodiments can have a higher viscosity in an aqueous composition compared to its non-crosslinked counterpart. An aqueous composition (e.g., dispersion or aqueous solution) comprising a crosslinked oxidized soy polysaccharide compound herein is believed to have a viscosity of at least about 25 cPs. Alternatively, such an aqueous composition can have a viscosity of at least about 25, 50, 75, 100, 125, 150, 175, 200, 225, 250, 500, 750, or 1000 cPs (or any integer between 25 and 1000 cPs), for example.

An aqueous composition herein comprising a crosslinked oxidized soy polysaccharide compound can be in the form of a personal care product, pharmaceutical product, food product, household product, or industrial product, for example. Examples of such products are disclosed below.

Oxidized soy polysaccharide compounds disclosed herein may be crosslinked using any means known in the art. Such crosslinkage may be between the same oxidized soy polysaccharide compounds, or between two or more different oxidized soy polysaccharide compounds. Also, crosslinkage may be intermolecular and/or intramolecular.

A crosslinked oxidized soy polysaccharide compound can be prepared as follows, for example. One or more oxidized soy polysaccharide compounds can be dissolved in water or an aqueous solution to prepare a 0.2, 0.5, 1, 2, 3, 4, 5, 6, 7, 8, 9, or 10 wt % solution of the compound(s). Oxidized soy polysaccharide compound(s) can be dissolved or mixed using any process known in the art, such as by increasing temperature, manual mixing, and/or homogenization.

A crosslinking agent is next dissolved in the preparation containing an oxidized soy polysaccharide compound. The concentration of the crosslinking agent in the resulting preparation can be about 0.2 to 20 wt %, or about 0.1, 0.2, 0.3, 0.4, 0.5, 1, 2, 3, 4, 5, 6, 7, 8, 9, 10, 15, or 20 wt %, for example.

The pH of the preparation containing both a crosslinking agent(s) and an oxidized soy polysaccharide compound(s) can be adjusted to be alkali (e.g., pH of 8, 8.5, 9, 9.5, or 10). Modification of pH can be done by any means known in the art, such as with a concentrated aqueous solution of an alkali hydroxide such as sodium hydroxide. Dissolving a crosslinking agent in a preparation containing one or more oxidized soy polysaccharide compounds at an alkali pH results in crosslinking of the oxidized soy polysaccharide compound(s).

A composition herein may optionally contain one or more active enzymes. Non-limiting examples of suitable enzymes include proteases, cellulases, hemicellulases, peroxidases, lipolytic enzymes (e.g., metallolipolytic enzymes), xylanases, lipases, phospholipases, esterases (e.g., arylesterase, polyesterase), perhydrolases, cutinases, pectinases, pectate lyases, mannanases, keratinases, reductases, oxidases (e.g., choline oxidase), phenoloxidases, lipoxygenases, ligninases, pullulanases, tannases, pentosanases, malanases, beta-glucanases, arabinosidases, hyaluronidases, chondroitinases, laccases, metalloproteinases, amadoriases, glucoamylases, arabinofuranosidases, phytases, isomerases, transferases and amylases. If an enzyme(s) is included, it may be comprised in a composition herein at about 0.0001-0.1 wt % (e.g., 0.01-0.03 wt %) active enzyme (e.g., calculated as pure enzyme protein), for example.

A cellulase herein can have endocellulase activity (EC 3.2.1.4), exocellulase activity (EC 3.2.1.91), or cellobiase activity (EC 3.2.1.21). A cellulase herein is an "active cellulase" having activity under suitable conditions for maintaining cellulase activity; it is within the skill of the art to determine such suitable conditions. Besides being able to degrade cellulose, a cellulase in certain embodiments can also degrade cellulose ether derivatives such as carboxymethyl cellulose. Examples of cellulose ether derivatives which are expected to not be stable to cellulase are disclosed in U.S. Pat. Nos. 7,012,053, 7,056,880, 6,579,840, 7,534,759 and 7,576,048.

A cellulase herein may be derived from any microbial source, such as a bacteria or fungus. Chemically-modified cellulases or protein-engineered mutant cellulases are included. Suitable cellulases include, but are not limited to, cellulases from the genera *Bacillus*, *Pseudomonas*, *Streptomyces*, *Trichoderma*, *Humicola*, *Fusarium*, *Thielavia* and *Acremonium*. As other examples, a cellulase may be derived from *Humicola insolens*, *Myceliophthora thermophila* or *Fusarium oxysporum*; these and other cellulases are disclosed in U.S. Pat. Nos. 4,435,307, 5,648,263, 5,691,178, 5,776,757 and 7,604,974, which are all incorporated herein by reference. Exemplary *Trichoderma reesei* cellulases are disclosed in U.S. Pat. Nos. 4,689,297, 5,814,501, 5,324,649, and International Patent Appl. Publ. Nos. WO92/06221 and WO92/06165, all of which are incorporated herein by reference. Exemplary *Bacillus* cellulases are disclosed in U.S. Pat. No. 6,562,612, which is incorporated herein by reference. A cellulase, such as any of the foregoing, preferably is in a mature form lacking an N-terminal signal peptide. Commercially available cellulases useful herein include CELLUZYME® and CAREZYME® (Novozymes A/S); CLAZINASE® and PURADAX® HA (DuPont Industrial Biosciences), and KAC-500(B)® (Kao Corporation).

One or more cellulases can be directly added as an ingredient when preparing a composition disclosed herein. Alternatively, one or more cellulases can be indirectly (inadvertently) provided in the disclosed composition. For example, cellulase can be provided in a composition herein by virtue of being present in a non-cellulase enzyme preparation used for preparing a composition. Cellulase in compositions in which cellulase is indirectly provided thereto can be present at about 0.1-10 ppb (e.g., less than 1 ppm), for example. A contemplated benefit of a composition herein, by virtue of employing an oxidized soy polysaccharide compound instead of a cellulose-based compound, is that non-cellulase enzyme preparations that might have background cellulase activity can be used without concern that the desired effects of the oxidized soy polysaccharide compound will be negated by the background cellulase activity.

A cellulase in certain embodiments can be thermostable. Cellulase thermostability refers to the ability of the enzyme to retain activity after exposure to an elevated temperature (e.g. about 60-70° C.) for a period of time (e.g., about 30-60 minutes). The thermostability of a cellulase can be measured by its half-life ($t\frac{1}{2}$) given in minutes, hours, or days, during which time period half the cellulase activity is lost under defined conditions.

A cellulase in certain embodiments can be stable to a wide range of pH values (e.g. neutral or alkaline pH such as pH of ~7.0 to ~11.0). Such enzymes can remain stable for a predetermined period of time (e.g., at least about 15 min., 30 min., or 1 hour) under such pH conditions.

At least one, two, or more cellulases may be included in a composition herein. The effective concentration of cellulase in an aqueous composition in which a fabric is treated can be readily determined by a skilled artisan. In fabric care processes, cellulase can be present in an aqueous composition (e.g., wash liquor) in which a fabric is treated in a concentration that is minimally about 0.01-0.1 ppm total cellulase protein, or about 0.1-10 ppb total cellulase protein (e.g., less than 1 ppm), to maximally about 100, 200, 500, 1000, 2000, 3000, 4000, or 5000 ppm total cellulase protein, for example.

Oxidized soy polysaccharide compounds herein are mostly or completely stable (resistant) to being degraded by cellulase. For example, the percent degradation of an oxidized soy polysaccharide compound by one or more cellulases is less than 10%, 9%, 8%, 7%, 6%, 5%, 4%, 3%, 2%, or 1%, or is 0%. Such percent degradation can be determined, for example, by comparing the molecular weight of oxidized soy polysaccharide before and after treatment with a cellulase for a period of time (e.g., ~24 hours).

Aqueous compositions in certain embodiments are believed to have either shear thinning behavior or shear thickening behavior. Shear thinning behavior is observed as a decrease in viscosity of the aqueous composition as shear rate increases, whereas shear thickening behavior is observed as an increase in viscosity of the aqueous composition as shear rate increases. Modification of the shear thinning behavior or shear thickening behavior of an aqueous composition herein is due to the admixture of an oxidized soy polysaccharide compound to the aqueous composition. Thus, one or more oxidized soy polysaccharide compounds herein can be added to an aqueous composition to modify its rheological profile (i.e., the flow properties of an aqueous liquid, solution, or mixture are modified) in some aspects. Also, one or more oxidized soy polysaccharide compounds can be added to an aqueous composition to modify its viscosity in some aspects.

The rheological properties of aqueous compositions herein can be observed by measuring viscosity over an increasing rotational shear rate (e.g., from about 0.1 rpm to about 1000 rpm). For example, shear thinning behavior of an aqueous composition can be observed as a decrease in viscosity (cPs) by at least about 5%, 10%, 15%, 20%, 25%, 30%, 35%, 40%, 45%, 50%, 55%, 60%, 65%, 70%, 75%, 80%, 85%, 90%, or 95% (or any integer between 5% and 95%) as the rotational shear rate increases from about 10 rpm to 60 rpm, 10 rpm to 150 rpm, 10 rpm to 250 rpm, 60 rpm to 150 rpm, 60 rpm to 250 rpm, or 150 rpm to 250 rpm. As another example, shear thickening behavior of an aqueous composition can be observed as an increase in viscosity (cPs) by at least about 5%, 10%, 15%, 20%, 25%, 30%, 35%, 40%, 45%, 50%, 55%, 60%, 65%, 70%, 75%, 80%, 85%, 90%, 95%, 100%, 125%, 150%, 175%, or 200% (or any integer between 5% and 200%) as the rotational shear rate increases from about 10 rpm to 60 rpm, 10 rpm to 150 rpm, 10 rpm to 250 rpm, 60 rpm to 150 rpm, 60 rpm to 250 rpm, or 150 rpm to 250 rpm.

An aqueous composition disclosed herein can be in the form of, and/or comprised in, a household product, personal care product, industrial product, pharmaceutical product, or food product, for example, such as any of those products described below. Oxidized soy polysaccharide compounds herein can optionally be used as builder agents and/or anti-redeposition agents in one or more of these type of products—such use, which depends in part on the application of the product, can be contemplated by a skilled artisan, especially in view of some of the embodiments disclosed herein. In other embodiments, oxidized soy polysaccharide compounds herein are believed to have some use as thickening agents in one or more of these products. Such a thickening agent may be used in conjunction with one or more other types of thickening agents if desired, such as those disclosed in U.S. Pat. No. 8,541,041, which is incorporated herein by reference.

Personal care products herein are not particularly limited and include, for example, skin care compositions, cosmetic compositions, antifungal compositions, and antibacterial compositions. Personal care products herein may be in the form of, for example, lotions, creams, pastes, balms, ointments, pomades, gels, liquids, combinations of these and the like. The personal care products disclosed herein can include at least one active ingredient, if desired. An active ingredient is generally recognized as an ingredient that causes an intended pharmacological effect. A personal care product herein can be used in personal care cleaning applications in certain embodiments.

In certain embodiments, a skin care product can be applied to skin for addressing skin damage related to a lack of moisture. A skin care product may also be used to address the visual appearance of skin (e.g., reduce the appearance of flaky, cracked, and/or red skin) and/or the tactile feel of the skin (e.g., reduce roughness and/or dryness of the skin while improved the softness and subtleness of the skin). A skin care product typically may include at least one active ingredient for the treatment or prevention of skin ailments, providing a cosmetic effect, or for providing a moisturizing benefit to skin, such as zinc oxide, petrolatum, white petrolatum, mineral oil, cod liver oil, lanolin, dimethicone, hard fat, vitamin A, allantoin, calamine, kaolin, glycerin, or colloidal oatmeal, and combinations of these. A skin care product may include one or more natural moisturizing factors such as ceramides, hyaluronic acid, glycerin, squalane, amino acids, cholesterol, fatty acids, triglycerides, phospholipids, glycosphingolipids, urea, linoleic acid, glycosaminoglycans, mucopolysaccharide, sodium lactate, or sodium pyrrolidone carboxylate, for example. Other ingredients that may be included in a skin care product include, without limitation, glycerides, apricot kernel oil, canola oil, squalane, squalene, coconut oil, corn oil, jojoba oil, jojoba wax, lecithin, olive oil, safflower oil, sesame oil, shea butter, soybean oil, sweet almond oil, sunflower oil, tea tree oil, shea butter, palm oil, cholesterol, cholesterol esters, wax esters, fatty acids, and orange oil.

A personal care product herein can also be in the form of makeup, lipstick, mascara, rouge, foundation, blush, eyeliner, lip liner, lip gloss, other cosmetics, sunscreen, sun block, nail polish, nail conditioner, bath gel, shower gel, body wash, face wash, lip balm, skin conditioner, cold cream, moisturizer, body spray, soap, body scrub, exfoliant, astringent, scruffing lotion, depilatory, permanent waving solution, antidandruff formulation, antiperspirant composition, deodorant, shaving product, pre-shaving product, after-shaving product, cleanser, skin gel, rinse, dentifrice composition, toothpaste, or mouthwash, for example.

A personal care product in some aspects can be a hair care product. Examples of hair care products herein include shampoo, hair conditioner (leave-in or rinse-out), cream rinse, hair dye, hair coloring product, hair shine product, hair serum, hair anti-frizz product, hair split-end repair product, mousse, hair spray, and styling gel. A hair care product can be in the form of a liquid, paste, gel, solid, or powder in some embodiments. A hair care product as presently disclosed typically comprises one or more of the following ingredients, which are generally used to formulate hair care products: anionic surfactants such as polyoxyethylenelauryl ether sodium sulfate; cationic surfactants such as stearyltrimethylammonium chloride and/or distearyltrimethylammonium chloride; nonionic surfactants such as glyceryl monostearate, sorbitan monopalmitate and/or polyoxyethylenecetyl ether; wetting agents such as propylene glycol, 1,3-butylene glycol, glycerin, sorbitol, pyroglutamic acid salts, amino acids and/or trimethylglycine; hydrocarbons such as liquid paraffins, petrolatum, solid paraffins, squalane and/or olefin oligomers; higher alcohols such as stearyl alcohol and/or cetyl alcohol; superfatting agents; antidandruff agents; disinfectants; anti-inflammatory agents; crude drugs; water-soluble polymers such as methylcellulose, hydroxycellulose and/or partially deacetylated chitin; antiseptics such as paraben; ultra-violet light absorbers; pearling agents; pH adjustors; perfumes; and pigments.

A pharmaceutical product herein can be in the form of an emulsion, liquid, elixir, gel, suspension, solution, cream, or ointment, for example. Also, a pharmaceutical product herein can be in the form of any of the personal care products disclosed herein, such as an antibacterial or antifungal composition. A pharmaceutical product can further comprise one or more pharmaceutically acceptable carriers, diluents, and/or pharmaceutically acceptable salts. An oxidized soy polysaccharide compound disclosed herein can also be used in capsules, encapsulants, tablet coatings, and excipients for medicaments and drugs.

Non-limiting examples of food products herein include vegetable, meat, and soy patties; reformed seafood; reformed cheese sticks; cream soups; gravies and sauces; salad dressing; mayonnaise; onion rings; jams, jellies, and syrups; pie filling; potato products such as French fries and extruded fries; batters for fried foods, pancakes/waffles and cakes; pet foods; confectioneries (candy); beverages; frozen desserts; ice cream; cultured dairy products such as cottage cheese, yogurt, cheeses, and sour creams; cake icing and glazes; whipped topping; leavened and unleavened baked goods; bars; and the like.

Oxidized soy polysaccharide compounds disclosed herein can typically be used in a food product or any other ingestible material (e.g., enteral pharmaceutical preparation) at a level of about 0.01-10 wt %, 0.01-5 wt %, 0.1-3 wt %, 0.1-4 wt %, 0.1-5 wt %, or 0.1-10 wt %, for example.

A household and/or industrial product herein can be in the form of drywall tape-joint compounds; mortars; grouts; cement plasters; spray plasters; cement stucco; adhesives; pastes; wall/ceiling texturizers; binders and processing aids for tape casting, extrusion forming, injection molding and ceramics; spray adherents and suspending/dispersing aids for pesticides, herbicides, and fertilizers; fabric care products such as fabric softeners and laundry detergents; dishwashing detergents; hard surface cleaners; air fresheners; polymer emulsions; gels such as water-based gels; surfactant solutions; paints such as water-based paints; protective coatings; adhesives; sealants and caulks; inks such as water-based ink; metal-working fluids; or emulsion-based metal cleaning fluids used in electroplating, phosphatizing, galvanizing and/or general metal cleaning operations, for example. A household product or industrial product herein can be used in cleaning applications in certain embodiments, and as such can be comprised in detergent compositions, for example.

Oxidized soy polysaccharide compounds disclosed herein are believed to be useful for providing one or more of the following physical properties to a personal care product, pharmaceutical product, household product, industrial product, or food product: thickening, freeze/thaw stability, lubricity, moisture retention and release, texture, consistency, shape retention, emulsification, binding, suspension, dispersion, gelation, reduced mineral hardness, for example. Examples of a concentration or amount of an oxidized soy polysaccharide compound in a product can be any of the weight percentages provided above, for example.

A food product herein can be in the form of a confectionery, for example. A confectionary herein can contain one or more sugars (e.g., sucrose, fructose, dextrose) for sweetening, or otherwise be sugar-free.

Examples of confectioneries herein include boiled sugars (hard boiled candies [i.e., hard candy]), dragees, jelly candies, gums, licorice, chews, caramels, toffee, fudge, chewing gums, bubble gums, nougat, chewy pastes, halawa, tablets, lozenges, icing, frosting, pudding, and gels (e.g., fruit gels, gelatin dessert). Other examples of confectioneries include aerated confectioneries such as marshmallows, and baked confectioneries.

A confectionery herein can optionally be prepared with chocolate, in any form (e.g., bars, candies, bonbons, truffles, lentils). A confectionary can be coated with chocolate, sugar-coated, candied, glazed, and/or film-coated, for example. Film-coating processes typically comprise applying to the surface of a confectionery a film-forming liquid composition which becomes, after drying, a protective film. This film-coating serves, for example, to protect the active principles contained in the confectionery; to protect the confectionery itself from moisture, shocks, and/or friability; and/or to confer the confectionery attractive visual properties (e.g., shine, uniform color, smooth surface).

In certain embodiments, a confectionery can be filled with a filling that is liquid, pasty, solid, or powdered. An oxidized soy polysaccharide compound herein can be comprised in such a filling, in which case the compound is optionally also included in the confectionery component being filled.

A confectionery herein is optionally sugar-free, comprising no sugar and typically instead having one or more artificial and/or non-sugar sweeteners (optionally non-caloric) (e.g., aspartame, saccharin, STEVIA, SUCRALOSE). A sugar-free confectionery in certain embodiments can comprise one or more polyols (e.g., erythritol, glycerol, lactitol, mannitol, maltitol, xylitol), soluble fibers, and/or proteins in place of sugar.

A food product herein can be in the form of a pet food, for example. A pet food herein can be a food for a domesticated animal such as a dog or cat (or any other companion animal), for example. A pet food in certain embodiments provides to a domestic animal one or more of the following: necessary dietary requirements, treats (e.g., dog biscuits), food supplements. Examples of pet food include dry pet food (e.g., kernels, kibbles), semi-moist compositions, wet pet food (e.g., canned pet food), or any combination thereof. Wet pet food typically has a moisture content over 65%. Semi-moist pet food typically has a moisture content of 20-65% and can include humectants such as propylene glycol, potassium sorbate, and ingredients that prevent microbial growth (bacteria and mold). Dry pet food typically has a moisture content less than 20% and its processing usually includes extruding, drying and/or baking. A pet food can optionally be in the form of a gravy, yogurt, powder, suspension, chew, or treat (e.g., biscuits); all these compositions can also be used as pet food supplements, if desired. Pet treats can be semi-moist chewable treats; dry treats; chewable bones; baked, extruded or stamped treats; or confection treats, for example. Examples of pet food compositions/formulations in which an oxidized soy polysaccharide compound herein can be added include those disclosed in U.S. Patent Appl. Publ. Nos. 2013/0280352 and 2010/0159103, and U.S. Pat. No. 6,977,084, which are all incorporated herein by reference.

Compositions disclosed herein can be in the form of a fabric care composition. A fabric care composition herein can be used for hand wash, machine wash and/or other purposes such as soaking and/or pretreatment of fabrics, for example. A fabric care composition may take the form of, for example, a laundry detergent; fabric conditioner; any wash-, rinse-, or dryer-added product; unit dose or spray. Fabric care compositions in a liquid form may be in the form of an aqueous composition as disclosed herein. In other aspects, a fabric care composition can be in a dry form such as a granular detergent or dryer-added fabric softener sheet. Other non-limiting examples of fabric care compositions herein include: granular or powder-form all-purpose or heavy-duty washing agents; liquid, gel or paste-form all-purpose or heavy-duty washing agents; liquid or dry fine-fabric (e.g., delicates) detergents; cleaning auxiliaries such as bleach additives, "stain-stick", or pre-treatments; substrate-laden products such as dry and wetted wipes, pads, or sponges; sprays and mists.

A detergent composition herein may be in any useful form, e.g., as powders, granules, pastes, bars, unit dose, or liquid. A liquid detergent may be aqueous, typically containing up to about 70 wt % of water and 0 wt % to about 30 wt % of organic solvent. It may also be in the form of a compact gel type containing only about 30 wt % water.

A detergent composition herein typically comprises one or more surfactants, wherein the surfactant is selected from nonionic surfactants, anionic surfactants, cationic surfactants, ampholytic surfactants, zwitterionic surfactants, semipolar nonionic surfactants and mixtures thereof. In some embodiments, the surfactant is present at a level of from about 0.1% to about 60%, while in alternative embodiments the level is from about 1% to about 50%, while in still further embodiments the level is from about 5% to about 40%, by weight of the detergent composition. A detergent will usually contain 0 wt % to about 50 wt % of an anionic surfactant such as linear alkylbenzenesulfonate (LAS), alpha-olefinsulfonate (AOS), alkyl sulfate (fatty alcohol sulfate) (AS), alcohol ethoxysulfate (AEOS or AES), secondary alkanesulfonates (SAS), alpha-sulfo fatty acid methyl esters, alkyl- or alkenylsuccinic acid, or soap. In addition, a detergent composition may optionally contain 0 wt % to about 40 wt % of a nonionic surfactant such as alcohol ethoxylate (AEO or AE), carboxylated alcohol ethoxylates, nonylphenol ethoxylate, alkylpolyglycoside, alkyldimethylamineoxide, ethoxylated fatty acid monoethanolamide, fatty acid monoethanolamide, or polyhydroxy alkyl fatty acid amide (as described for example in WO92/06154, which is incorporated herein by reference).

A detergent composition herein typically comprises one or more detergent builders or builder systems. One or more oxidized soy polysaccharide compounds can be included as a builder, for example. In some aspects, oxidized soy polysaccharide can be included as a co-builder, in which it is used together with one or more additional builders such as any disclosed herein. In some embodiments incorporating at least one builder, the cleaning compositions comprise at least about 1%, from about 3% to about 60%, or even from about 5% to about 40%, builder by weight of the composition. Builders (in addition to oxidized soy polysaccharide herein) include, but are not limited to, alkali metal, ammonium and alkanolammonium salts of polyphosphates, alkali metal silicates, alkaline earth and alkali metal carbonates, aluminosilicates, polycarboxylate compounds, ether hydroxypolycarboxylates, copolymers of maleic anhydride with ethylene or vinyl methyl ether, 1,3,5-trihydroxy benzene-2,4,6-trisulphonic acid, and carboxymethyloxysuccinic acid, various alkali metal, ammonium and substituted ammonium salts of polyacetic acids such as ethylenediamine tetraacetic acid and nitrilotriacetic acid, as well as polycarboxylates such as mellitic acid, succinic acid, citric acid, oxydisuccinic acid, polymaleic acid, benzene 1,3,5-tricarboxylic acid, carboxymethyloxysuccinic acid, and soluble salts thereof. Indeed, it is contemplated that any suitable builder will find use in various embodiments of the present disclosure. Additional examples of a detergent builder or complexing agent include zeolite, diphosphate, triphosphate, phosphonate, citrate, nitrilotriacetic acid (NTA), ethylenediaminetetraacetic acid (EDTA), diethylenetriaminepentaacetic acid (DTMPA), alkyl- or alkenylsuccinic acid, soluble silicates or layered silicates (e.g., SKS-6 from Hoechst).

In some embodiments, builders form water-soluble hardness ion complexes (e.g., sequestering builders), such as citrates and polyphosphates (e.g., sodium tripolyphosphate and sodium tripolyphospate hexahydrate, potassium tripolyphosphate, and mixed sodium and potassium tripolyphosphate, etc.). It is contemplated that any suitable builder will find use in the present disclosure, including those known in the art (See, e.g., EP2100949).

In some embodiments, suitable builders can include phosphate builders and non-phosphate builders. In some embodiments, a builder is a phosphate builder. In some embodiments, a builder is a non-phosphate builder. A builder can be used in a level of from 0.1% to 80%, or from 5% to 60%, or from 10% to 50%, by weight of the composition. In some embodiments, the product comprises a mixture of phosphate and non-phosphate builders. Suitable phosphate builders include mono-phosphates, di-phosphates, tri-polyphosphates or oligomeric-polyphosphates, including the alkali metal salts of these compounds, including the sodium salts. In some embodiments, a builder can be sodium tripolyphosphate (STPP). Additionally, the composition can comprise carbonate and/or citrate, preferably citrate that helps to achieve a neutral pH composition. Other suitable non-phosphate builders include homopolymers and copolymers of polycarboxylic acids and their partially or completely neutralized salts, monomeric polycarboxylic acids and hydroxycarboxylic acids and their salts. In some embodiments, salts of the above mentioned compounds include ammonium and/or alkali metal salts, i.e., lithium, sodium, and potassium salts, including sodium salts. Suitable polycarboxylic acids include acyclic, alicyclic, hetero-cyclic and aromatic carboxylic acids, wherein in some embodiments, they can contain at least two carboxyl groups which are in each case separated from one another by, in some instances, no more than two carbon atoms.

A detergent composition herein can comprise at least one chelating agent. Suitable chelating agents include, but are not limited to copper, iron and/or manganese chelating agents and mixtures thereof. In embodiments in which at least one chelating agent is used, the composition comprises from about 0.1% to about 15%, or even from about 3.0% to about 10%, chelating agent by weight of the composition.

A detergent composition herein can comprise at least one deposition aid. Suitable deposition aids include, but are not limited to, polyethylene glycol, polypropylene glycol, polycarboxylate, soil release polymers such as polytelephthalic acid, clays such as kaolinite, montmorillonite, atapulgite, illite, bentonite, halloysite, and mixtures thereof.

A detergent composition herein can comprise one or more dye transfer inhibiting agents. Suitable polymeric dye transfer inhibiting agents include, but are not limited to, polyvinylpyrrolidone polymers, polyamine N-oxide polymers, copolymers of N-vinylpyrrolidone and N-vinylimidazole, polyvinyloxazolidones and polyvinylimidazoles or mixtures thereof. Additional dye transfer inhibiting agents include manganese phthalocyanine, peroxidases, polyvinylpyrrolidone polymers, polyamine N-oxide polymers, copolymers of N-vinylpyrrolidone and N-vinylimidazole, polyvinyloxazolidones and polyvinylimidazoles and/or mixtures thereof; chelating agents examples of which include ethylene-diamine-tetraacetic acid (EDTA); diethylene triamine penta methylene phosphonic acid (DTPMP); hydroxy-ethane diphosphonic acid (HEDP); ethylenediamine N,N'-disuccinic acid (EDDS); methyl glycine diacetic acid (MGDA); diethylene triamine penta acetic acid (DTPA); propylene diamine tetracetic acid (PDT A); 2-hydroxypyridine-N-oxide (HPNO); or methyl glycine diacetic acid (MGDA); glutamic acid N,N-diacetic acid (N,N-dicarboxymethyl glutamic acid tetrasodium salt (GLDA); nitrilotriacetic acid (NTA); 4,5-dihydroxy-m-benzenedisulfonic acid; citric acid and any salts thereof; N-hydroxyethyl ethylenediaminetriacetic acid (HEDTA), triethylenetetraaminehexaacetic acid (TTHA), N-hydroxyethyliminodiacetic acid (HEIDA), dihydroxyethylglycine (DHEG), ethylenediaminetetrapropionic acid (EDTP) and derivatives thereof, which can be used alone or in combination with any of the above. In embodiments in which at least one dye transfer inhibiting agent is used, a composition herein may comprise from about 0.0001% to about 10%, from about 0.01% to about 5%, or even from about 0.1% to about 3%, by weight of the composition.

A detergent composition herein can comprise silicates. In some of these embodiments, sodium silicates (e.g., sodium disilicate, sodium metasilicate, and/or crystalline phyllosilicates) find use. In some embodiments, silicates are present at a level of from about 1% to about 20% by weight of the composition. In some embodiments, silicates are present at a level of from about 5% to about 15% by weight of the composition.

A detergent composition herein can comprise dispersants. Suitable water-soluble organic materials include, but are not limited to the homo- or co-polymeric acids or their salts, in which the polycarboxylic acid comprises at least two carboxyl radicals separated from each other by not more than two carbon atoms.

A detergent composition herein may additionally comprise one or more enzymes. Examples of enzymes include proteases, cellulases, hemicellulases, peroxidases, lipolytic enzymes (e.g., metallolipolytic enzymes), xylanases, lipases, phospholipases, esterases (e.g., arylesterase, polyesterase), perhydrolases, cutinases, pectinases, pectate lyases, mannanases, keratinases, reductases, oxidases (e.g., choline oxidase, phenoloxidase), phenoloxidases, lipoxygenases, ligninases, pullulanases, tannases, pentosanases, malanases, beta-glucanases, arabinosidases, hyaluronidases, chondroitinases, laccases, metalloproteinases, amadoriases, glucoamylases, alpha-amylases, beta-amylases, galactosidases, galactanases, catalases, carageenases, hyaluronidases, keratinases, lactases, ligninases, peroxidases, phosphatases, polygalacturonases, pullulanases, rhamnogalacturonases, tannases, transglutaminases, xyloglucanases, xylosidases, metalloproteases, arabinofuranosidases, phytases, isomerases, transferases and/or amylases in any combination.

In some embodiments, a detergent composition can comprise one or more enzymes (e.g., any disclosed herein), each at a level from about 0.00001% to about 10% by weight of the composition and the balance of cleaning adjunct materials by weight of composition. In some other embodiments, a detergent composition can also comprise each enzyme at a level of about 0.0001% to about 10%, about 0.001% to about 5%, about 0.001% to about 2%, or about 0.005% to about 0.5%, by weight of the composition.

Enzymes that may be comprised in a detergent composition herein may be stabilized using conventional stabilizing agents, e.g., a polyol such as propylene glycol or glycerol; a sugar or sugar alcohol; lactic acid; boric acid or a boric acid derivative (e.g., an aromatic borate ester).

A detergent composition in certain embodiments may comprise one or more polymers. Examples of suitable polymers include carboxymethyl cellulose (CMC), poly (vinylpyrrolidone) (PVP), polyethylene glycol (PEG), poly (vinyl alcohol) (PVA), polycarboxylates such as polyacrylates, maleic/acrylic acid copolymers and lauryl methacrylate/acrylic acid copolymers.

A detergent composition herein may contain a bleaching system. For example, a bleaching system can comprise an $H_2O_2$ source such as perborate or percarbonate, which may be combined with a peracid-forming bleach activator such as tetraacetylethylenediamine (TAED) or nonanoyloxybenzenesulfonate (NOBS). Alternatively, a bleaching system may comprise peroxyacids (e.g., amide, imide, or sulfone type peroxyacids). Alternatively still, a bleaching system can be an enzymatic bleaching system comprising perhydrolase, for example, such as the system described in WO2005/056783.

A detergent composition herein may also contain conventional detergent ingredients such as fabric conditioners, clays, foam boosters, suds suppressors, anti-corrosion agents, soil-suspending agents, anti-soil redeposition agents, dyes, bactericides, tarnish inhibiters, optical brighteners, or perfumes. The pH of a detergent composition herein (measured in aqueous solution at use concentration) is usually neutral or alkaline (e.g., pH of about 7.0 to about 11.0).

It is believed that an oxidized soy polysaccharide can be included as an anti-redeposition agent and/or clay soil removal agent in a detergent composition such as a fabric care composition, if desired (such agents can optionally be characterized as whiteness maintenance agents in certain aspects). Examples of other suitable anti-redeposition and/or clay soil removal agents herein include polyethoxy zwitterionic surfactants, water-soluble copolymers of acrylic or methacrylic acid with acrylic or methacrylic acid-ethylene oxide condensates (e.g., U.S. Pat. No. 3,719,647), cellulose derivatives such as carboxymethylcellulose and hydroxypropylcellulose (e.g., U.S. Pat. Nos. 3,597,416 and 3,523,088), and mixtures comprising nonionic alkyl polyethoxy surfactant, polyethoxy alkyl quaternary cationic surfactant and fatty amide surfactant (e.g., U.S. Pat. No. 4,228,044). Non-limiting examples of other suitable anti-redeposition and clay soil removal agents are disclosed in U.S. Pat. Nos. 4,597,898 and 4,891,160, and Int. Pat. Appl. Publ. No. WO95/32272, all of which are incorporated herein by reference.

Particular forms of detergent compositions that can be adapted for purposes disclosed herein are disclosed in, for example, US20090209445A1, US20100081598A1, U.S. Pat. No. 7,001,878B2, EP1504994B1, WO2001085888A2, WO2003089562A1, WO2009098659A1, WO2009098660-A1, WO2009112992A1, WO2009124160A1, WO2009152031A1, WO2010059483A1, WO2010088112-A1, WO2010090915A1, WO2010135238A1, WO2011094687A1, WO2011094690A1, WO2011127102A1, WO2011163428A1, WO2008000567A1, WO2006045391A1, WO2006007911A1, WO2012027404A1, EP1740690B1, WO2012059336A1, U.S. Pat. No. 6,730,646B1, WO2008087426A1, WO2010116139A1, and WO2012104613A1, all of which are incorporated herein by reference.

Laundry detergent compositions herein can optionally be heavy duty (all purpose) laundry detergent compositions. Exemplary heavy duty laundry detergent compositions comprise a detersive surfactant (10%-40% wt/wt), including an anionic detersive surfactant (selected from a group of linear or branched or random chain, substituted or unsubstituted alkyl sulphates, alkyl sulphonates, alkyl alkoxylated sulphate, alkyl phosphates, alkyl phosphonates, alkyl carboxylates, and/or mixtures thereof), and optionally non-ionic surfactant (selected from a group of linear or branched or random chain, substituted or unsubstituted alkyl alkoxylated alcohol, e.g., C8-C18 alkyl ethoxylated alcohols and/or C6-C12 alkyl phenol alkoxylates), where the weight ratio of anionic detersive surfactant (with a hydrophilic index (Hlc) of from 6.0 to 9) to non-ionic detersive surfactant is greater than 1:1. Suitable detersive surfactants also include cationic detersive surfactants (selected from a group of alkyl pyridinium compounds, alkyl quaternary ammonium compounds, alkyl quaternary phosphonium compounds, alkyl ternary sulphonium compounds, and/or mixtures thereof); zwitterionic and/or amphoteric detersive surfactants (selected from a group of alkanolamine sulpho-betaines); ampholytic surfactants; semi-polar non-ionic surfactants and mixtures thereof.

A detergent herein such as a heavy duty laundry detergent composition may optionally include, a surfactancy boosting polymer consisting of amphiphilic alkoxylated grease cleaning polymers (selected from a group of alkoxylated polymers having branched hydrophilic and hydrophobic properties, such as alkoxylated polyalkylenimines in the range of 0.05 wt %-10 wt %) and/or random graft polymers (typically comprising of hydrophilic backbone comprising monomers selected from the group consisting of: unsaturated C1-C6 carboxylic acids, ethers, alcohols, aldehydes, ketones, esters, sugar units, alkoxy units, maleic anhydride, saturated polyalcohols such as glycerol, and mixtures thereof; and hydrophobic side chain(s) selected from the group consisting of: C4-C25 alkyl group, polypropylene, polybutylene, vinyl ester of a saturated C1-C6 mono-carboxylic acid, C1-C6 alkyl ester of acrylic or methacrylic acid, and mixtures thereof.

A detergent herein such as a heavy duty laundry detergent composition may optionally include additional polymers such as soil release polymers (include anionically end-capped polyesters, for example SRP1, polymers comprising at least one monomer unit selected from saccharide, dicarboxylic acid, polyol and combinations thereof, in random or block configuration, ethylene terephthalate-based polymers and co-polymers thereof in random or block configuration, for example REPEL-O-TEX SF, SF-2 AND SRP6, TEXCARE SRA100, SRA300, SRN100, SRN170, SRN240, SRN300 AND SRN325, MARLOQUEST SL), anti-redeposition agent(s) herein (0.1 wt % to 10 wt %), include carboxylate polymers, such as polymers comprising at least one monomer selected from acrylic acid, maleic acid (or maleic anhydride), fumaric acid, itaconic acid, aconitic acid, mesaconic acid, citraconic acid, methylenemalonic acid, and any mixture thereof, vinylpyrrolidone homopolymer, and/or polyethylene glycol, molecular weight in the range of from 500 to 100,000 Da); and polymeric carboxylate (such as maleate/acrylate random copolymer or polyacrylate homopolymer).

A detergent herein such as a heavy duty laundry detergent composition may optionally further include saturated or unsaturated fatty acids, preferably saturated or unsaturated C12-C24 fatty acids (0 wt % to 10 wt %); deposition aids disclosed herein (examples for which include polysaccharides, cellulosic polymers, poly diallyl dimethyl ammonium halides (DADMAC), and co-polymers of DAD MAC with vinyl pyrrolidone, acrylamides, imidazoles, imidazolinium halides, and mixtures thereof, in random or block configuration, cationic guar gum, cationic starch, cationic polyacylamides, and mixtures thereof).

A detergent herein such as a heavy duty laundry detergent composition may optionally further include dye transfer inhibiting agents, examples of which include manganese phthalocyanine, peroxidases, polyvinylpyrrolidone polymers, polyamine N-oxide polymers, copolymers of N-vinylpyrrolidone and N-vinylimidazole, polyvinyloxazolidones and polyvinylimidazoles and/or mixtures thereof; chelating agents, examples of which include ethylene-diamine-tetraacetic acid (EDTA), diethylene triamine penta methylene phosphonic acid (DTPMP), hydroxy-ethane diphosphonic acid (HEDP), ethylenediamine N,N'-disuccinic acid (EDDS), methyl glycine diacetic acid (MGDA), diethylene triamine penta acetic acid (DTPA), propylene diamine tetracetic acid (PDTA), 2-hydroxypyridine-N-oxide (HPNO), or methyl glycine diacetic acid (MGDA), glutamic acid N,N-diacetic acid (N,N-dicarboxymethyl glutamic acid tetrasodium salt (GLDA), nitrilotriacetic acid (NTA), 4,5-dihydroxy-m-benzenedisulfonic acid, citric acid and any salts thereof, N-hydroxyethylethylenediaminetriacetic acid (HEDTA), triethylenetetraaminehexaacetic acid (TTHA), N-hydroxyethyliminodiacetic acid (HEIDA), dihydroxyethylglycine (DHEG), ethylenediaminetetrapropionic acid (EDTP), and derivatives thereof.

A detergent herein such as a heavy duty laundry detergent composition may optionally include silicone or fatty-acid based suds suppressors; hueing dyes, calcium and magnesium cations, visual signaling ingredients, anti-foam (0.001 wt % to about 4.0 wt %), and/or a structurant/thickener (0.01 wt % to 5 wt %) selected from the group consisting of diglycerides and triglycerides, ethylene glycol distearate, microcrystalline cellulose, microfiber cellulose, biopolymers, xanthan gum, gellan gum, and mixtures thereof). Such structurant/thickener would be, in certain embodiments, in addition to the one or more oxidized soy polysaccharide compounds comprised in the detergent. A structurant can also be referred to as a structural agent.

A detergent herein can be in the form of a heavy duty dry/solid laundry detergent composition, for example. Such a detergent may include: (i) a detersive surfactant, such as any anionic detersive surfactant disclosed herein, any non-ionic detersive surfactant disclosed herein, any cationic detersive surfactant disclosed herein, any zwitterionic and/or amphoteric detersive surfactant disclosed herein, any ampholytic surfactant, any semi-polar non-ionic surfactant, and mixtures thereof; (ii) a builder, such as any phosphate-free builder (e.g., zeolite builders in the range of 0 wt % to less than 10 wt %), any phosphate builder (e.g., sodium tri-polyphosphate in the range of 0 wt % to less than 10 wt %), citric acid, citrate salts and nitrilotriacetic acid, any silicate salt (e.g., sodium or potassium silicate or sodium meta-silicate in the range of 0 wt % to less than 10 wt %);

any carbonate salt (e.g., sodium carbonate and/or sodium bicarbonate in the range of 0 wt % to less than 80 wt %), and mixtures thereof; (iii) a bleaching agent, such as any photobleach (e.g., sulfonated zinc phthalocyanines, sulfonated aluminum phthalocyanines, xanthenes dyes, and mixtures thereof), any hydrophobic or hydrophilic bleach activator (e.g., dodecanoyl oxybenzene sulfonate, decanoyl oxybenzene sulfonate, decanoyl oxybenzoic acid or salts thereof, 3,5,5-trimethy hexanoyl oxybenzene sulfonate, tetraacetyl ethylene diamine-TAED, nonanoyloxybenzene sulfonate-NOBS, nitrile quats, and mixtures thereof), any source of hydrogen peroxide (e.g., inorganic perhydrate salts, examples of which include mono or tetra hydrate sodium salt of perborate, percarbonate, persulfate, perphosphate, or persilicate), any preformed hydrophilic and/or hydrophobic peracids (e.g., percarboxylic acids and salts, percarbonic acids and salts, perimidic acids and salts, peroxymonosulfuric acids and salts, and mixtures thereof); and/or (iv) any other components such as a bleach catalyst (e.g., imine bleach boosters examples of which include iminium cations and polyions, iminium zwitterions, modified amines, modified amine oxides, N-sulphonyl imines, N-phosphonyl imines, N-acyl imines, thiadiazole dioxides, perfluoroimines, cyclic sugar ketones, and mixtures thereof), and a metal-containing bleach catalyst (e.g., copper, iron, titanium, ruthenium, tungsten, molybdenum, or manganese cations along with an auxiliary metal cations such as zinc or aluminum and a sequestrate such as EDTA, ethylenediaminetetra(methylenephosphonic acid).

Compositions disclosed herein can be in the form of a dishwashing detergent composition. Examples of dishwashing detergents include automatic dishwashing detergents (typically used in dishwasher machines) and hand-washing dish detergents. A dishwashing detergent composition can be in any dry or liquid/aqueous form as disclosed herein, for example. Components that may be included in certain embodiments of a dishwashing detergent composition include, for example, one or more of a phosphate; oxygen- or chlorine-based bleaching agent; non-ionic surfactant; alkaline salt (e.g., metasilicates, alkali metal hydroxides, sodium carbonate); any active enzyme disclosed herein; anti-corrosion agent (e.g., sodium silicate); anti-foaming agent; additives to slow down the removal of glaze and patterns from ceramics; perfume; anti-caking agent (in granular detergent); starch (in tablet-based detergents); gelling agent (in liquid/gel based detergents); and/or sand (powdered detergents).

Dishwashing detergents such as an automatic dishwasher detergent or liquid dishwashing detergent can comprise (i) a non-ionic surfactant, including any ethoxylated non-ionic surfactant, alcohol alkoxylated surfactant, epoxy-capped poly(oxyalkylated) alcohol, or amine oxide surfactant present in an amount from 0 to 10 wt %; (ii) a builder, in the range of about 5-60 wt %, including oxidized soy polysaccharide and any phosphate builder (e.g., mono-phosphates, di-phosphates, tri-polyphosphates, other oligomeric-polyphosphates, sodium tripolyphosphate-STPP), any phosphate-free builder (e.g., amino acid-based compounds including methyl-glycine-diacetic acid [MGDA] and salts or derivatives thereof, glutamic-N,N-diacetic acid [GLDA] and salts or derivatives thereof, iminodisuccinic acid (IDS) and salts or derivatives thereof, carboxy methyl inulin and salts or derivatives thereof, nitrilotriacetic acid [NTA], diethylene triamine penta acetic acid [DTPA], B-alaninediacetic acid [B-ADA] and salts thereof), homopolymers and copolymers of poly-carboxylic acids and partially or completely neutralized salts thereof, monomeric polycarboxylic acids and hydroxycarboxylic acids and salts thereof in the range of 0.5 wt % to 50 wt %, or sulfonated/carboxylated polymers in the range of about 0.1 wt % to about 50 wt %; (iii) a drying aid in the range of about 0.1 wt % to about 10 wt % (e.g., polyesters, especially anionic polyesters, optionally together with further monomers with 3 to 6 functionalities—typically acid, alcohol or ester functionalities which are conducive to polycondensation, polycarbonate-, polyurethane- and/or polyurea-polyorganosiloxane compounds or precursor compounds thereof, particularly of the reactive cyclic carbonate and urea type); (iv) a silicate in the range from about 1 wt % to about 20 wt % (e.g., sodium or potassium silicates such as sodium disilicate, sodium meta-silicate and crystalline phyllosilicates); (v) an inorganic bleach (e.g., perhydrate salts such as perborate, percarbonate, perphosphate, persulfate and persilicate salts) and/or an organic bleach (e.g., organic peroxyacids such as diacyl- and tetraacylperoxides, especially diperoxydodecanedioic acid, diperoxytetradecanedioic acid, and diperoxyhexadecanedioic acid); (vi) a bleach activator (e.g., organic peracid precursors in the range from about 0.1 wt % to about 10 wt %) and/or bleach catalyst (e.g., manganese triazacyclononane and related complexes; Co, Cu, Mn, and Fe bispyridylamine and related complexes; and pentamine acetate cobalt(III) and related complexes); (vii) a metal care agent in the range from about 0.1 wt % to 5 wt % (e.g., benzatriazoles, metal salts and complexes, and/or silicates); and/or (viii) any active enzyme disclosed herein in the range from about 0.01 to 5.0 mg of active enzyme per gram of automatic dishwashing detergent composition, and an enzyme stabilizer component (e.g., oligosaccharides, polysaccharides, and inorganic divalent metal salts).

It is believed that numerous commercially available detergent formulations can be adapted to include an oxidized soy polysaccharide compound as disclosed herein. Examples include PUREX® ULTRAPACKS (Henkel), FINISH® QUANTUM (Reckitt Benckiser), CLOROX™ 2 PACKS (Clorox), OXICLEAN MAX FORCE POWER PAKS (Church & Dwight), TIDE® STAIN RELEASE, CASCADE® ACTIONPACS, and TIDE® PODS™ (Procter & Gamble).

Compositions disclosed herein can be in the form of an oral care composition, for example. Examples of oral care compositions include dentifrices, toothpaste, mouth wash, mouth rinse, chewing gum, edible strips, and tooth cream/gel that provide some form of oral care (e.g., treatment or prevention of cavities [dental caries], gingivitis, plaque, tartar, and/or periodontal disease). An oral care composition can also be for treating an "oral surface", which encompasses any soft or hard surface within the oral cavity including surfaces of the tongue, hard and soft palate, buccal mucosa, gums and dental surfaces. A "dental surface" herein is a surface of a natural tooth or a hard surface of artificial dentition including a crown, cap, filling, bridge, denture, or dental implant, for example.

An oral care composition herein can comprise about 0.01-15.0 wt % (e.g., ~0.1-10 wt % or ~0.1-5.0 wt %, ~0.1-2.0 wt %) of one or more oxidized soy polysaccharide compounds as disclosed herein, for example. One or more oxidized soy polysaccharide compounds comprised in an oral care composition can sometimes be provided therein as a thickening agent and/or dispersion agent, which may be useful to impart a desired consistency and/or mouth feel to the composition. One or more other thickening or dispersion agents can also be provided in an oral care composition herein, such as a carboxyvinyl polymer, carrageenan (e.g., L-carrageenan), natural gum (e.g., karaya, xanthan, gum arabic, tragacanth), colloidal magnesium aluminum silicate, or colloidal silica, for example. In some embodiments, oxidized soy polysaccharide can be included as a builder.

An oral care composition herein may be a toothpaste or other dentifrice, for example. Such compositions, as well as any other oral care composition herein, can additionally comprise, without limitation, one or more of an anticaries agent, antimicrobial or antibacterial agent, anticalculus or tartar control agent, surfactant, abrasive, pH-modifying agent, foam modulator, humectant, flavorant, sweetener, pigment/colorant, whitening agent, and/or other suitable components. Examples of oral care compositions to which one or more oxidized soy polysaccharide compounds can be added are disclosed in U.S. Patent Appl. Publ. Nos. 2006/0134025, 2002/0022006 and 2008/0057007, which are incorporated herein by reference.

An anticaries agent herein can be an orally acceptable source of fluoride ions. Suitable sources of fluoride ions include fluoride, monofluorophosphate and fluorosilicate salts as well as amine fluorides, including olaflur (N'-octadecyltrimethylendiamine-N,N,N'-tris(2-ethanol)-dihydrofluoride), for example. An anticaries agent can be present in an amount providing a total of about 100-20000 ppm, about 200-5000 ppm, or about 500-2500 ppm, fluoride ions to the composition, for example. In oral care compositions in which sodium fluoride is the sole source of fluoride ions, an amount of about 0.01-5.0 wt %, about 0.05-1.0 wt %, or about 0.1-0.5 wt %, sodium fluoride can be present in the composition, for example.

An antimicrobial or antibacterial agent suitable for use in an oral care composition herein includes, for example, phenolic compounds (e.g., 4-allylcatechol; p-hydroxybenzoic acid esters such as benzylparaben, butylparaben, ethylparaben, methylparaben and propylparaben; 2-benzylphenol; butylated hydroxyanisole; butylated hydroxytoluene; capsaicin; carvacrol; creosol; eugenol; guaiacol; halogenated bisphenolics such as hexachlorophene and bromochlorophene; 4-hexylresorcinol; 8-hydroxyquinoline and salts thereof; salicylic acid esters such as menthyl salicylate, methyl salicylate and phenyl salicylate; phenol; pyrocatechol; salicylanilide; thymol; halogenated diphenylether compounds such as triclosan and triclosan monophosphate), copper (II) compounds (e.g., copper (II) chloride, fluoride, sulfate and hydroxide), zinc ion sources (e.g., zinc acetate, citrate, gluconate, glycinate, oxide, and sulfate), phthalic acid and salts thereof (e.g., magnesium monopotassium phthalate), hexetidine, octenidine, sanguinarine, benzalkonium chloride, domiphen bromide, alkylpyridinium chlorides (e.g. cetylpyridinium chloride, tetradecylpyridinium chloride, N-tetradecyl-4-ethylpyridinium chloride), iodine, sulfonamides, bisbiguanides (e.g., alexidine, chlorhexidine, chlorhexidine digluconate), piperidino derivatives (e.g., delmopinol, octapinol), magnolia extract, grapeseed extract, rosemary extract, menthol, geraniol, citral, eucalyptol, antibiotics (e.g., augmentin, amoxicillin, tetracycline, doxycycline, minocycline, metronidazole, neomycin, kanamycin, clindamycin), and/or any antibacterial agents disclosed in U.S. Pat. No. 5,776,435, which is incorporated herein by reference. One or more antimicrobial agents can optionally be present at about 0.01-10 wt % (e.g., 0.1-3 wt %), for example, in the disclosed oral care composition.

An anticalculus or tartar control agent suitable for use in an oral care composition herein includes, for example, phosphates and polyphosphates (e.g., pyrophosphates), polyaminopropanesulfonic acid (AMPS), zinc citrate trihydrate, polypeptides (e.g., polyaspartic and polyglutamic acids), polyolefin sulfonates, polyolefin phosphates, diphosphonates (e.g., azacycloalkane-2,2-diphosphonates such as azacycloheptane-2,2-diphosphonic acid), N-methyl azacyclopentane-2,3-diphosphonic acid, ethane-1-hydroxy-1,1-diphosphonic acid, ethane-1-amino-1,1-diphosphonate, and/or phosphonoalkane carboxylic acids and salts thereof (e.g., their alkali metal and ammonium salts). Useful inorganic phosphate and polyphosphate salts include, for example, monobasic, dibasic and tribasic sodium phosphates, sodium tripolyphosphate, tetrapolyphosphate, mono-, di-, tri- and tetra-sodium pyrophosphates, disodium dihydrogen pyrophosphate, sodium trimetaphosphate, sodium hexametaphosphate, or any of these in which sodium is replaced by potassium or ammonium. Other useful anticalculus agents in certain embodiments include anionic polycarboxylate polymers (e.g., polymers or copolymers of acrylic acid, methacrylic, and maleic anhydride such as polyvinyl methyl ether/maleic anhydride copolymers). Still other useful anticalculus agents include sequestering agents such as hydroxycarboxylic acids (e.g., citric, fumaric, malic, glutaric and oxalic acids and salts thereof) and aminopolycarboxylic acids (e.g., EDTA). One or more anticalculus or tartar control agents can optionally be present at about 0.01-50 wt % (e.g., about 0.05-25 wt % or about 0.1-15 wt %), for example, in the disclosed oral care composition.

A surfactant suitable for use in an oral care composition herein may be anionic, non-ionic, or amphoteric, for example. Suitable anionic surfactants include, without limitation, water-soluble salts of $C_{8-20}$ alkyl sulfates, sulfonated monoglycerides of $C_{8-20}$ fatty acids, sarcosinates, and taurates. Examples of anionic surfactants include sodium lauryl sulfate, sodium coconut monoglyceride sulfonate, sodium lauryl sarcosinate, sodium lauryl isoethionate, sodium laureth carboxylate and sodium dodecyl benzenesulfonate. Suitable non-ionic surfactants include, without limitation, poloxamers, polyoxyethylene sorbitan esters, fatty alcohol ethoxylates, alkylphenol ethoxylates, tertiary amine oxides, tertiary phosphine oxides, and dialkyl sulfoxides. Suitable amphoteric surfactants include, without limitation, derivatives of $C_{8-20}$ aliphatic secondary and tertiary amines having an anionic group such as a carboxylate, sulfate, sulfonate, phosphate or phosphonate. An example of a suitable amphoteric surfactant is cocoamidopropyl betaine. One or more surfactants are optionally present in a total amount of about 0.01-10 wt % (e.g., about 0.05-5.0 wt % or about 0.1-2.0 wt %), for example, in the disclosed oral care composition.

An abrasive suitable for use in an oral care composition herein may include, for example, silica (e.g., silica gel, hydrated silica, precipitated silica), alumina, insoluble phosphates, calcium carbonate, and resinous abrasives (e.g., a urea-formaldehyde condensation product). Examples of insoluble phosphates useful as abrasives herein are orthophosphates, polymetaphosphates and pyrophosphates, and include dicalcium orthophosphate dihydrate, calcium pyrophosphate, beta-calcium pyrophosphate, tricalcium phosphate, calcium polymetaphosphate and insoluble sodium polymetaphosphate. One or more abrasives are optionally present in a total amount of about 5-70 wt % (e.g., about 10-56 wt % or about 15-30 wt %), for example, in the disclosed oral care composition. The average particle size of an abrasive in certain embodiments is about 0.1-30 microns (e.g., about 1-20 microns or about 5-15 microns).

An oral care composition in certain embodiments may comprise at least one pH-modifying agent. Such agents may be selected to acidify, make more basic, or buffer the pH of a composition to a pH range of about 2-10 (e.g., pH ranging from about 2-8, 3-9, 4-8, 5-7, 6-10, or 7-9). Examples of pH-modifying agents useful herein include, without limitation, carboxylic, phosphoric and sulfonic acids; acid salts (e.g., monosodium citrate, disodium citrate, monosodium malate); alkali metal hydroxides (e.g. sodium hydroxide, carbonates such as sodium carbonate, bicarbonates, sesquicarbonates); borates; silicates; phosphates (e.g., monosodium phosphate, trisodium phosphate, pyrophosphate salts); and imidazole.

A foam modulator suitable for use in an oral care composition herein may be a polyethylene glycol (PEG), for example. High molecular weight PEGs are suitable, including those having an average molecular weight of about 200000-7000000 (e.g., about 500000-5000000 or about 1000000-2500000), for example. One or more PEGs are optionally present in a total amount of about 0.1-10 wt % (e.g. about 0.2-5.0 wt % or about 0.25-2.0 wt %), for example, in the disclosed oral care composition.

An oral care composition in certain embodiments may comprise at least one humectant. A humectant in certain embodiments may be a polyhydric alcohol such as glycerin, sorbitol, xylitol, or a low molecular weight PEG. Most suitable humectants also may function as a sweetener herein. One or more humectants are optionally present in a total amount of about 1.0-70 wt % (e.g., about 1.0-50 wt %, about 2-25 wt %, or about 5-15 wt %), for example, in the disclosed oral care composition.

A natural or artificial sweetener may optionally be comprised in an oral care composition herein. Examples of suitable sweeteners include dextrose, sucrose, maltose, dextrin, invert sugar, mannose, xylose, ribose, fructose, levulose, galactose, corn syrup (e.g., high fructose corn syrup or corn syrup solids), partially hydrolyzed starch, hydrogenated starch hydrolysate, sorbitol, mannitol, xylitol, maltitol, isomalt, aspartame, neotame, saccharin and salts thereof, dipeptide-based intense sweeteners, and cyclamates. One or more sweeteners are optionally present in a total amount of about 0.005-5.0 wt %, for example, in the disclosed oral care composition.

A natural or artificial flavorant may optionally be comprised in an oral care composition herein. Examples of suitable flavorants include vanillin; sage; marjoram; parsley oil; spearmint oil; cinnamon oil; oil of wintergreen (methylsalicylate); peppermint oil; clove oil; bay oil; anise oil; eucalyptus oil; citrus oils; fruit oils; essences such as those derived from lemon, orange, lime, grapefruit, apricot, banana, grape, apple, strawberry, cherry, or pineapple; bean- and nut-derived flavors such as coffee, cocoa, cola, peanut, or almond; and adsorbed and encapsulated flavorants. Also encompassed within flavorants herein are ingredients that provide fragrance and/or other sensory effect in the mouth, including cooling or warming effects. Such ingredients include, without limitation, menthol, menthyl acetate, menthyl lactate, camphor, eucalyptus oil, eucalyptol, anethole, eugenol, cassia, oxanone, Irisone®, propenyl guaiethol, thymol, linalool, benzaldehyde, cinnamaldehyde, N-ethyl-p-menthan-3-carboxamine, N,2,3-trimethyl-2-isopropylbutanamide, 3-(1-menthoxy)-propane-1,2-diol, cinnamaldehyde glycerol acetal (CGA), and menthone glycerol acetal (MGA). One or more flavorants are optionally present in a total amount of about 0.01-5.0 wt % (e.g., about 0.1-2.5 wt %), for example, in the disclosed oral care composition.

An oral care composition in certain embodiments may comprise at least one bicarbonate salt. Any orally acceptable bicarbonate can be used, including alkali metal bicarbonates such as sodium or potassium bicarbonate, and ammonium bicarbonate, for example. One or more bicarbonate salts are optionally present in a total amount of about 0.1-50 wt % (e.g., about 1-20 wt %), for example, in the disclosed oral care composition.

An oral care composition in certain embodiments may comprise at least one whitening agent and/or colorant. A suitable whitening agent is a peroxide compound such as any of those disclosed in U.S. Pat. No. 8,540,971, which is incorporated herein by reference. Suitable colorants herein include pigments, dyes, lakes and agents imparting a particular luster or reflectivity such as pearling agents, for example. Specific examples of colorants useful herein include talc; mica; magnesium carbonate; calcium carbonate; magnesium silicate; magnesium aluminum silicate; silica; titanium dioxide; zinc oxide; red, yellow, brown and black iron oxides; ferric ammonium ferrocyanide; manganese violet; ultramarine; titaniated mica; and bismuth oxychloride. One or more colorants are optionally present in a total amount of about 0.001-20 wt % (e.g., about 0.01-10 wt % or about 0.1-5.0 wt %), for example, in the disclosed oral care composition.

Additional components that can optionally be included in an oral composition herein include one or more enzymes (above), vitamins, and anti-adhesion agents, for example. Examples of vitamins useful herein include vitamin C, vitamin E, vitamin B5, and folic acid. Examples of suitable anti-adhesion agents include solbrol, ficin, and quorum-sensing inhibitors.

The present disclosure also concerns a method of preparing an aqueous composition having increased builder and/or anti-redeposition capacity. This method comprises contacting at least one oxidized soy polysaccharide compound as disclosed herein with an aqueous composition, wherein the builder and/or anti-redeposition capacity of the aqueous composition is increased by the compound when compared to the builder and/or anti-redeposition capacity of the aqueous composition as it existed before the contacting step. An increase in anti-redeposition capacity can, in some embodiments, also refer to an increase in clay removal capacity.

An aqueous composition in this method can be any aqueous composition as disclosed herein, for example, such as a household care product, personal care product, industrial product, pharmaceutical product, or food product. Examples of suitable household care products include fabric care products such as laundry detergent and fabric softener, and dishwashing detergent. Examples of suitable personal care items include hair care products (e.g. shampoos, conditioners), dentifrice compositions (e.g., toothpaste, mouthwash), and skin care products (e.g., hand or body soap, lotion, cosmetics).

In some embodiments, an aqueous composition in this method is a detergent and/or surfactant composition. Such a composition herein can comprise at least one detergent/surfactant ingredient, such as any of the present disclosure, at about 0.01-10 wt % (e.g., about 0.05-5.0 wt % or about 0.1-2.0 wt %), for example. A skilled artisan would recognize all the various products disclosed herein that constitute examples of detergent/surfactant-comprising compositions such as certain household care products (e.g., laundry detergent, dishwashing detergent) and personal care products (e.g., hand/body soap, dentifrices), particularly those used in cleaning applications.

Contacting an aqueous composition with one or more oxidized soy polysaccharide compounds herein can increase the builder and/or anti-redeposition capacity of the aqueous composition. This increase can be an increase of at least about 1%, 5%, 10%, 25%, 50%, 100%, 500%, or 1000% (or any integer between 1% and 1000%), for example, compared to the builder and/or anti-redeposition capacity of the aqueous composition before the contacting step. An increase in builder and/or anti-redeposition capacity can be determined, for example, by comparing the builder and/or anti-redeposition capacity of the aqueous composition obtained by the method (i.e., after the contacting step) with the builder and/or anti-redeposition capacity of the aqueous composition as it had existed before the method (i.e., before the contacting step). Alternatively, a control aqueous composition can be used, which is not contacted with oxidized soy polysaccharide, but otherwise contains the same contents as the test composition.

The degree of anti-redeposition and/or clay removal capacity achieved using the presently disclosed subject matter can be measured following the disclosure of U.S. Pat. No. 4,597,898, for example, which is incorporated herein by reference. For example, anti-redeposition comparisons can be conducted in a 5-pot Automatic Miniwasher (AMW) employing 7-grain hardness water and a temperature of 95° F. Test swatches are washed for 10 minutes and rinsed twice with water (7-grain hardness) at 75° F. for 2 minutes. The AMW pots are filled with 6 liters of water each, after which a detergent composition to be tested (control or further containing oxidized soy polysaccharide [e.g., 20 ppm]) is added and agitated for 2 minutes. A background soil mixture (200 ppm artificial body soil, 100 ppm vacuum cleaner soil and 200 ppm clay soil) is then added and agitated for an additional 3 minutes. Three 5-inch square test swatches (50% polyester/50% cotton T-shirt material) are then added, along with two 80% cotton/20% polyester terry clothes and two 11-inch square swatches of 100% polyester knit fabric. A 10-minute wash cycle is initiated at this point. Following a rinse cycle, the test swatches are dried in a mini-dryer. Gardner Whiteness meter readings (L, a and b) are then determined for the three test swatches. Anti-redeposition performance (ARD) is then calculated according to the following equation: ARD=$(7(L^2)-40(L)(b))/700$. The ARD values for the three test swatches are then averaged. The improvement in anti-redeposition performance of the detergent composition containing oxidized soy polysaccharide is measured as the difference in ARD value relative to the control composition. As another example of determining degree of anti-redeposition, such can be gauged, in part, following methodology disclosed in the below Examples (adsorption studies).

The degree of increased builder capacity achieved using the presently disclosed subject matter can be measured following any number of methods. For example, increased builder capacity effected by an oxidized soy polysaccharide compound can be estimated by determining the extent to which the compound supplies alkalinity to an aqueous composition, or buffers an aqueous composition to maintain alkalinity. As another example, increased builder capacity effected by an oxidized soy polysaccharide compound can be estimated by determining the extent to which the compound reduces hardness in an aqueous composition (it is believed that oxidized soy polysaccharide can effect this feature by sequestering or chelating hard water cations) and/or helps to remove soil in suspension (this feature typically applies to fabric care compositions). As another example, increased builder capacity can be determined following methodology disclosed in the below Examples (calcium dispersing capacity).

The contacting step in a method for increasing the builder and/or anti-redeposition capacity of an aqueous composition can be performed by mixing or dissolving any oxidized soy polysaccharide compound as presently disclosed in the aqueous composition by any means known in the art. For example, mixing or dissolving can be performed manually or with a machine (e.g., industrial mixer or blender, orbital shaker, stir plate, homogenizer, sonicator, bead mill). Mixing or dissolving can comprise a homogenization step in certain embodiments. Homogenization (as well as any other type of mixing) can be performed for about 5 to 60, 5 to 30, 10 to 60, 10 to 30, 5 to 15, or 10 to 15 seconds (or any integer between 5 and 60 seconds), or longer periods of time as necessary to mix oxidized soy polysaccharide with the aqueous composition. A homogenizer can be used at about 5000 to 30000 rpm, 10000 to 30000 rpm, 15000 to 30000 rpm, 15000 to 25000 rpm, or 20000 rpm (or any integer between 5000 and 30000 rpm), for example.

After an oxidized soy polysaccharide compound herein is mixed with or dissolved into an aqueous composition, the resulting aqueous composition may be filtered, or may not be filtered. For example, an aqueous composition prepared with a homogenization step may or may not be filtered.

The order in which components of an aqueous composition, including oxidized soy polysaccharide, are brought together to form the aqueous composition is not believed to be important. For example, oxidized soy polysaccharide can be added as an ingredient at the same time as when one or more other ingredients are added. Thus, the feature of contacting oxidized soy polysaccharide with an aqueous composition is not intended to refer only to embodiments in which an oxidized soy polysaccharide is added to a final- or near final-prepared aqueous composition.

The present disclosure also concerns a method of treating a material. This method comprises contacting a material with an aqueous composition comprising at least one oxidized soy polysaccharide compound as disclosed herein.

A material contacted with an aqueous composition in a contacting method herein can comprise a fabric in certain embodiments. A fabric herein can comprise natural fibers, synthetic fibers, semi-synthetic fibers, or any combination thereof. A semi-synthetic fiber herein is produced using naturally occurring material that has been chemically derivatized, an example of which is rayon. Non-limiting examples of fabric types herein include fabrics made of (i) cellulosic fibers such as cotton (e.g., broadcloth, canvas, chambray, chenille, chintz, corduroy, cretonne, damask, denim, flannel, gingham, jacquard, knit, matelassé, oxford, percale, poplin, plissé, sateen, seersucker, sheers, terry cloth, twill, velvet), rayon (e.g., viscose, modal, lyocell), linen, and Tencel®; (ii) proteinaceous fibers such as silk, wool and related mammalian fibers; (iii) synthetic fibers such as polyester, acrylic, nylon, and the like; (iv) long vegetable fibers from jute, flax, ramie, coir, kapok, sisal, henequen, abaca, hemp and sunn; and (v) any combination of a fabric of (i)-(iv). Fabric comprising a combination of fiber types (e.g., natural and synthetic) include those with both a cotton fiber and polyester, for example. Materials/articles containing one or more fabrics herein include, for example, clothing, curtains, drapes, upholstery, carpeting, bed linens, bath linens, tablecloths, sleeping bags, tents, car interiors, etc. Other materials comprising natural and/or synthetic fibers include, for example, non-woven fabrics, paddings, paper, and foams.

An aqueous composition that is contacted with a fabric can be, for example, a fabric care composition (e.g., laundry detergent, fabric softener). Thus, a treatment method in certain embodiments can be considered a fabric care method or laundry method if employing a fabric care composition therein. A fabric care composition herein is contemplated to effect one or more of the following fabric care benefits (i.e., surface substantive effects): wrinkle removal, wrinkle reduction, wrinkle resistance, fabric wear reduction, fabric wear resistance, fabric pilling reduction, extended fabric life, fabric color maintenance, fabric color fading reduction, reduced dye transfer, fabric color restoration, fabric soiling reduction, fabric soil release, fabric shape retention, fabric smoothness enhancement, anti-redeposition of soil on fabric, anti-greying of laundry, improved fabric hand/handle, and/or fabric shrinkage reduction.

Examples of conditions (e.g., time, temperature, wash/rinse volumes) for conducting a fabric care method or laundry method herein are disclosed in WO1997/003161 and U.S. Pat. Nos. 4,794,661, 4,580,421 and 5,945,394, which are incorporated herein by reference. In other examples, a material comprising fabric can be contacted with an aqueous composition herein: (i) for at least about 5, 10, 20, 30, 40, 50, 60, 70, 80, 90, 100, 110, or 120 minutes; (ii) at a temperature of at least about 10, 15, 20, 25, 30, 35, 40, 45, 50, 55, 60, 65, 70, 75, 80, 85, 90, or 95° C. (e.g., for laundry wash or rinse: a "cold" temperature of about 15-30° C., a "warm" temperature of about 30-50° C., a "hot" temperature of about 50-95° C.), (iii) at a pH of about 2, 3, 4, 5, 6, 7, 8, 9, 10, 11, or 12 (e.g., pH range of about 2-12, or about 3-11); (iv) at a salt (e.g., NaCl) concentration of at least about 0.5, 1.0, 1.5, 2.0, 2.5, 3.0, 3.5, or 4.0 wt %; or any combination of (i)-(iv).

The contacting step in a fabric care method or laundry method can comprise any of washing, soaking, and/or rinsing steps, for example. Contacting a material or fabric in still further embodiments can be performed by any means known in the art, such as dissolving, mixing, shaking, spraying, treating, immersing, flushing, pouring on or in, combining, painting, coating, applying, affixing to, and/or communicating an effective amount of an oxidized soy polysaccharide compound herein with the fabric or material. In still further embodiments, contacting may be used to treat a fabric to provide a surface substantive effect. As used herein, the term "fabric hand" or "handle" refers to a person's tactile sensory response towards fabric which may be physical, physiological, psychological, social or any combination thereof. In one embodiment, the fabric hand may be measured using a PhabrOmeter® System for measuring relative hand value (available from Nu Cybertek, Inc. Davis, Calif.) (American Association of Textile Chemists and Colorists (AATCC test method "202-2012, Relative Hand Value of Textiles: Instrumental Method")).

In certain embodiments of treating a material comprising fabric, an oxidized soy polysaccharide component(s) of the aqueous composition adsorbs to the fabric. This feature is believed, in part, to render oxidized soy polysaccharide compounds herein useful as anti-redeposition agents and/or anti-greying agents in fabric care compositions (in addition to their soil dispersion effect). An anti-redeposition agent or anti-greying agent herein helps keep soil from redepositing onto clothing in wash water after the soil has been removed. It is further contemplated that adsorption of one or more oxidized soy polysaccharide compounds herein to a fabric enhances mechanical properties of the fabric.

Adsorption of an oxidized soy polysaccharide compound to a fabric herein can be measured using a colorimetric technique (e.g., Dubois et al., 1956, *Anal. Chem.* 28:350-356; Zemljič et al., 2006, *Lenzinger Berichte* 85:68-76; both incorporated herein by reference), for example, or any other method known in the art.

Other materials that can be contacted in the above treatment method include surfaces that can be treated with a dish detergent (e.g., automatic dishwashing detergent or hand dish detergent). Examples of such materials include surfaces of dishes, glasses, pots, pans, baking dishes, utensils and flatware made from ceramic material, china, metal, glass, plastic (e.g., polyethylene, polypropylene, polystyrene, etc.) and wood (collectively referred to herein as "tableware"). Thus, the treatment method in certain embodiments can be considered a dishwashing method or tableware washing method, for example. Examples of conditions (e.g., time, temperature, wash volume) for conducting a dishwashing or tableware washing method herein are disclosed in U.S. Pat. No. 8,575,083, which is incorporated herein by reference. In other examples, a tableware article can be contacted with an aqueous composition herein under a suitable set of conditions such as any of those disclosed above with regard to contacting a fabric-comprising material.

Other materials that can be contacted in the above treatment method include oral surfaces such as any soft or hard surface within the oral cavity including surfaces of the tongue, hard and soft palate, buccal mucosa, gums and dental surfaces (e.g., natural tooth or a hard surface of artificial dentition such as a crown, cap, filling, bridge, denture, or dental implant). Thus, a treatment method in certain embodiments can be considered an oral care method or dental care method, for example. Conditions (e.g., time, temperature) for contacting an oral surface with an aqueous composition herein should be suitable for the intended purpose of making such contact. Other surfaces that can be contacted in a treatment method also include a surface of the integumentary system such as skin, hair or nails.

Thus, certain embodiments of the present disclosure concern material (e.g., fabric) that comprises an oxidized soy polysaccharide compound herein. Such material can be produced following a material treatment method as disclosed herein, for example. A material may comprise an oxidized soy polysaccharide compound in certain embodiments if the compound is adsorbed to, or otherwise in contact with, the surface of the material.

Certain embodiments of a method of treating a material herein further comprise a drying step, in which a material is dried after being contacted with the aqueous composition. A drying step can be performed directly after the contacting step, or following one or more additional steps that might follow the contacting step (e.g., drying of a fabric after being rinsed, in water for example, following a wash in an aqueous composition herein). Drying can be performed by any of several means known in the art, such as air drying (e.g., ~20-25° C.), or at a temperature of at least about 30, 40, 50, 60, 70, 80, 90, 100, 120, 140, 160, 170, 175, 180, or 200° C., for example. A material that has been dried herein typically has less than 3, 2, 1, 0.5, or 0.1 wt % water comprised therein. Fabric is a preferred material for conducting an optional drying step.

An aqueous composition used in a treatment method herein can be any aqueous composition disclosed herein. Thus, the oxidized soy polysaccharide component(s) of an aqueous composition can be any as disclosed herein. Examples of aqueous compositions include detergents (e.g., laundry detergent or dish detergent) and water-containing dentifrices such as toothpaste.

The present disclosure also concerns a method for producing an oxidized soy polysaccharide compound. This method comprises: contacting soy polysaccharide under aqueous conditions with (i) at least one N-oxoammonium salt, (ii) at least one periodate compound, and/or (iii) at least one peroxide compound, wherein the soy polysaccharide is oxidized by the N-oxoammonium salt, periodate compound, and/or peroxide compound thereby producing an oxidized soy polysaccharide compound. The oxidized soy polysaccharide compound produced by this method can optionally be isolated.

An N-oxoammonium salt in certain embodiments of an oxidation method can comprise a TEMPO oxoammonium salt. Examples of such an N-oxoammonium salt include TEMPO oxoammonium salt itself (structure II) and 4-acetamido-TEMPO oxoammonium salt (structure III). An N-oxoammonium salt herein can be a cyclic N-oxoammonium salt, for example. A cyclic N-oxoammonium salt is represented by structure VI (above) in certain embodiments. An N-oxoammonium salt in the disclosed method can be a TEMPO oxoammonium salt having a substitution at carbon position 4 (where the $N^+$ in the ring of the TEMPO oxoammonium salt is position 1).

A TEMPO oxoammonium salt can be provided in an oxidation method, for example, by oxidizing an agent comprising TEMPO under aqueous conditions in which a TEMPO oxoammonium salt is contacted with soy polysaccharide. An agent comprising TEMPO is an agent/compound comprising structure IV. Examples of an agent comprising TEMPO is TEMPO itself (structure IV) and 4-acetamido-TEMPO (structure V). Other examples of agents comprising TEMPO can be represented by structure VII (above). Each of these agents can be converted to its corresponding oxoammonium salt, as represented by structure VI, by contacting it with one or more oxidation agents in aqueous conditions. Given that TEMPO and its derivatives, such as above (e.g., 4-acetamido-TEMPO), are examples of cyclic nitroxyl compounds, a cyclic nitroxyl compound can be used to provide a TEMPO oxoammonium salt herein.

An agent comprising TEMPO can be oxidized under aqueous conditions of an oxidation method to its corresponding oxoammonium salt by contacting the agent with one or more "oxidation agents" (or "oxidant"). This contacting can be performed under the same aqueous conditions in which soy polysaccharide is contacted with an N-oxoammonium salt. In some embodiments, a reaction herein for oxidizing soy polysaccharide can initially be prepared to comprise, under aqueous conditions, at least soy polysaccharide, an agent comprising TEMPO (e.g., structure VII), and one or more oxidation agents. The oxidation agent(s) can convert the agent comprising TEMPO to its corresponding oxoammonium salt (e.g., structure VI), which in turn oxidizes the soy polysaccharide.

Non-limiting examples of an oxidation agent for use in the disclosed oxidation method include one or more "inorganic oxidation agents" (or "inorganic oxidant"). Examples of oxidation agents that may be used to convert an agent comprising TEMPO to its corresponding oxoammonium salt under aqueous conditions of the method include one or more of a halite (e.g., a chlorite, such as sodium chlorite [$NaClO_2$]) or a hypohalite (e.g., a hypochlorite, such as sodium hypochlorite [$NaClO$]). Other examples of oxidation agents (inorganic or organic) include one or more of a halide salt such as KCl, KBr, NaCl, NaBr, or NaI; a hypohalite such as NaOBr; metals such as Fe(III), Mn(II), Mn(III), or Cu(II); $KMnO_4$, $Mn(OAc)_3$; $Mn_2O_3$; $MnO_2$; $Mn(NO_3)_2$; $MgCl_2$; $Mg(OAc)_2$; $Cu(NO_3)_2$; iodobenzene diacetate [$PhI(OAc)_2$]; $Ca(ClO)_2$; t-BuOCl, $CuCl-O_2$; $NaBrO_2$; $Cl_2$; $Br_2$; and trichloroisocyanuric acid.

Aqueous conditions are used in a method for oxidizing soy polysaccharide. Aqueous conditions in the method refer to a solution or mixture in which the solvent is at least about 60 wt % water, for example. Alternatively, aqueous conditions can be at least about 65, 70, 75, 80, 85, 90, or 95 wt % water (or any integer value between 60 and 95 wt %), for example. Aqueous conditions herein can comprise a buffer, such as an acidic, neutral, or alkaline buffer, at a suitable concentration and selected based on the pH range provided by the buffer. Examples of buffers include citric acid, acetic acid, $KH_2PO_4$, CHES and borate.

The aqueous conditions of an oxidation method herein can be acidic (e.g., pH of 5.5 or less). Alternatively, the pH may be about 2.0, 2.5, 3.0, 3.5, 4.0, 4.5, 5.0, or 5.5. Acidic conditions can be prepared by any means known in the art, such as by adding acetic acid and/or an acetate salt to a solution or mixture. For example, a sodium acetate buffer (acetate buffer) (pH 4-5) (e.g., 0.2-0.3 M solution) can provide acidic conditions.

The aqueous conditions of an oxidation method herein can be basic, having a pH of 8.5 or more, for example. Alternatively, the pH may be about 8.5, 9.0, 9.5, 10.0, 10.5, 11.0, 11.5, or 12, for example. Basic conditions can be prepared by any means known in the art, such as by adding an alkaline hydroxide (e.g., sodium hydroxide) to a solution or mixture.

A periodate compound in certain embodiments of an oxidation method can be a metal periodate (e.g., sodium periodate or potassium periodate), for example. A periodate compounds can be a metaperiodate (e.g., $NaIO_4$) or an orthoperiodate in some aspects. Conditions for oxidizing soy polysaccharide with a periodate compound can follow those as disclosed in U.S. Pat. Nos. 3,086,969, 6,800,753, 5,747, 658 and/or 6635755, which are all disclosed herein by reference, and/or as disclosed in Example 2 below, for example. Typically, a reaction employing periodate comprises providing soy polysaccharide in an aqueous periodate solution. The concentration of a periodate in a reaction can be about 1, 2, 3, 4, 5, 6, 7, 8, 9, or 10 wt %, for example. The temperature of a reaction herein comprising a periodate can be between about 18° C. to about 40° C. (e.g., room temperature), for example. In certain embodiments, a reaction comprising a periodate can proceed for about 24-72 hours (e.g., ~48 hours).

In some aspects of an oxidation method herein, an oxidized soy polysaccharide compound is produced by first contacting soy polysaccharide with a periodate compound, followed by contacting the soy polysaccharide (i.e., periodate-oxidized soy polysaccharide) with an N-oxoammonium salt. Such a sequential oxidation treatment can follow any of the processes disclosed herein, such as in Example 2 below. Periodate-oxidized soy polysaccharide can optionally first be isolated (e.g., via alcohol precipitation) from the periodate reaction before contacting it with an N-oxoammonium salt.

A peroxide compound in certain embodiments of an oxidation method herein can be hydrogen peroxide ($H_2O_2$), for example. In some aspects, a peroxide compound can be an inorganic peroxide compound or an organic peroxide compound. Suitable peroxide compounds herein further include perborate-monohydrate, perborate-tetrahydrate, percarbonates, alkali persulphates, persilicates, and percitrates, in which sodium or calcium is the preferred cation, as well as hydrogen peroxide adducts of urea or amine oxides, for example.

Conditions for oxidizing soy polysaccharide with a peroxide compound can follow those as disclosed in U.S. Pat. Nos. 6,610,884 and 6,670,470, which are both disclosed herein by reference, and/or as disclosed in Example 5 below, for example. Typically, a reaction employing a peroxide (e.g., $H_2O_2$) comprises providing soy polysaccharide in an aqueous peroxide solution. The amount of peroxide in a reaction can be about 1, 2, 3, 4, 5, 6, 7, 8, 9, or 10 wt %, for example, or can range from about 0.6 wt % to 50 wt %, where such wt % is with respect to the amount of soy polysaccharide present in the reaction. A peroxide can be used at about 5 wt % in certain preferred embodiments. A reaction employing a peroxide compound herein can have a neutral pH (e.g., pH 6-8) in some embodiments, or can have a pH ranging from 2.8 to 11.2 (e.g., pH can be about 3, 4, 5, 6, 7, 8, 9, 10, or 11). The temperature of a reaction comprising a peroxide can be between about 80° C. to about 150° C., or about 110° C. to about 140° C. (e.g., ~121° C.), for example. It would be understood that achieving such elevated reaction temperatures can involve application of pressure (e.g., at least 20, 30 or 40 psi), such as can be provided with an autoclave or other high pressure device (e.g., Parr® reactor). In certain embodiments, a reaction comprising a peroxide can proceed for about 5-240, 5-120, 5-75, 15-240, 15-120, or 15-75 minutes (e.g., ~60 minutes). Soy polysaccharide or a soy polysaccharide preparation herein can be initially provided in an oxidation reaction at about 0.1, 1, 2, 3, 4, 5, 6, 7, 8, 9, or 10 wt %, for example.

In some aspects of an oxidation method herein, an oxidized soy polysaccharide compound is produced by first contacting soy polysaccharide with a peroxide compound, followed by contacting the peroxide-oxidized soy polysaccharide with an N-oxoammonium salt.

A soy polysaccharide in certain embodiments of an oxidation method as presently disclosed can be contacted with a peroxide compound in the absence of a chelating agent (e.g., EDTA), whereas in other embodiments a chelating agent can optionally be present.

Soy polysaccharide can be included under aqueous conditions of an oxidation method at about, or at least about, 0.1, 0.25, 0.5, 0.75, 1, 2, 3, 4, 5, 6, 7, 8, 9, or 10 wt %, for example. Soy polysaccharide can be mixed or dissolved under aqueous conditions before or after a periodate compound, peroxide compound, and/or an agent comprising TEMPO and/or an oxidation agent (which converts the agent comprising TEMPO to its corresponding oxoammonium salt) is added to the aqueous conditions. The oxidation agent in these particular embodiments can be sodium chlorite, sodium bromide, and/or sodium hypochlorite (or any other oxidation agent listed herein), for example.

An agent comprising TEMPO, such as TEMPO and/or 4-acetamido-TEMPO, can be included under aqueous conditions of the method at about, or at least about, 0.05, 0.075, 0.1, 0.25, 0.5, 0.75, 1, or 2 wt %, for example. In certain embodiments, an agent comprising TEMPO can be added to aqueous conditions in which soy polysaccharide has already been mixed or dissolved. Such addition may be made before, after, or at the time an oxidation agent is added to the aqueous conditions.

An oxidation agent such as sodium chlorite, sodium bromide, and/or sodium hypochlorite (or any other oxidation agent listed herein) can be included in aqueous conditions of the method at about, or at least about, 0.1, 0.25, 0.5, 0.75, 1, 2, 3, 4, 5, 10, 15, 20, 25, 30, 35, 40, 45, or 50 wt %, for example. In certain embodiments, an oxidation agent(s) can be added to aqueous conditions in which soy polysaccharide has already been mixed or dissolved.

Aqueous conditions in certain embodiments of the disclosed oxidation method may initially contain soy polysaccharide, an agent comprising TEMPO (e.g., 4-acetamido-TEMPO), and one or more oxidation agents (e.g., sodium chlorite and/or sodium hypochlorite) in a buffer solution (e.g., sodium acetate buffer at a pH of about 4-5). Optionally, no additional components are included in preparing these particular aqueous conditions. These particular aqueous conditions can be maintained for about 48-96 hours (e.g., ~72 hours) at a temperature of about 18° C. to about 40° C. (e.g., room temperature).

Aqueous conditions in certain embodiments of the disclosed method may initially contain soy polysaccharide, an agent comprising TEMPO (e.g., 4-acetamido-TEMPO), and one or more oxidation agents (e.g., sodium bromide and/or sodium hypochlorite) in a basic solution (e.g., sodium hydroxide solution at a pH of about 10.5-11.5). Optionally, no additional components are included in preparing these particular aqueous conditions. These particular aqueous conditions can be maintained for about 0.5-5 hours (e.g., ~1 hours) at a temperature of about 18° C. to about 40° C. (e.g., room temperature).

Soy polysaccharide can be contacted with at least one periodate compound, peroxide compound, and/or N-oxoammonium salt under aqueous conditions by mixing, for example. Mixing can be performed by manual mixing, mixing using an overhead mixer, using a magnetic stir bar, or shaking, for example. Such mixing can be performed during and/or after adding each of soy polysaccharide, an agent comprising TEMPO (and/or a periodate or peroxide compound), and one or more oxidation agents to the aqueous conditions. As described above, such aqueous conditions allow contact between the agent comprising TEMPO and one or more oxidation agents, thereby converting the agent comprising TEMPO to its corresponding N-oxoammonium salt. This N-oxoammonium salt can then contact and oxidize the soy polysaccharide.

The time period for which soy polysaccharide is contacted with at least one N-oxoammonium salt, peroxide, and/or periodate under aqueous conditions can be at least about 0.5, 1, 4, 8, 12, 16, 20, 24, 28, 32, 36, 40, 44, 48, 72, or 96 hours (or any integer value between 1 to 96 hours), for example. A reaction can be maintained for about 0.5-5 hours (e.g., ~1 hour) or 48-96 hours (e.g., ~72 hours) in certain embodiments. The period of time for contacting soy polysaccharide with at least one N-oxoammonium salt, peroxide, and/or periodate under aqueous conditions can be measured, for example, from the point of time after each reaction component has been dissolved and/or mixed in the aqueous conditions.

The temperature of aqueous conditions of the disclosed method can be about 18° C. to about 40° C. (or any integer value between 18 to 40° C.) in certain embodiments (e.g., when employing a periodate and/or N-oxoammonium salt). Aqueous conditions in certain embodiments of the method can be maintained at a temperature of about 20-25° C. The temperature of aqueous conditions can be maintained from the time in which each reaction component has been dissolved and/or mixed under the aqueous conditions, until the reaction is completed. Optionally, the initial aqueous conditions to which each reaction component is added may be at the temperature held for the reaction.

Optionally, a reaction herein can be maintained under an inert gas, with or without heating. As used herein, the term "inert gas" refers to a gas which does not undergo chemical reactions under a set of given conditions, such as those disclosed for preparing a reaction herein.

Upon completion of an oxidation reaction in which acidic or basic aqueous conditions are used, the pH of the reaction can optionally be neutralized. Neutralization of an acidic reaction can be performed using one or more bases (e.g., an alkali hydroxide such as sodium hydroxide). Neutralization of a basic reaction can be performed using one or more acids (e.g., an inorganic acid such as hydrochloric acid). The term "neutral pH" as used herein, refers to a pH that is neither substantially acidic or basic (e.g., a pH of about 6-8, or about 6.0, 6.2, 6.4, 6.6, 6.8, 7.0, 7.2, 7.4, 7.6, 7.8, or 8.0).

An oxidized soy polysaccharide compound produced in a reaction herein can optionally be isolated. Such a product may first be precipitated from the aqueous conditions of the reaction. Precipitation can be performed by adding an excess amount (e.g., at least 2-3 times the volume of the reaction volume) of an alcohol (e.g., 100% or 95% concentration) such as ethanol or isopropanol to the reaction. A precipitated product can then be isolated using a filtration funnel, centrifuge, press filter, or any other method or equipment known in the art that allows removal of liquids from solids. For example, a vacuum filtration may be used to isolate an oxidized soy polysaccharide product. The isolated compound can be dried using any method known in the art, such as vacuum drying, air drying, or freeze drying.

An oxidized soy polysaccharide compound produced in a reaction herein can optionally be washed, following precipitation, one or more times with a liquid that does not readily dissolve the compound. For example, oxidized soy polysaccharide can be washed with alcohol, acetone, aromatics, or any combination of these, depending on the solubility of the oxidized compound therein (where lack of solubility is desirable for washing). In general, a solvent comprising an organic solvent (e.g. 95-100%) such as alcohol is preferred for washing an oxidized soy polysaccharide compound. An oxidized soy polysaccharide compound can be washed one or more times with an aqueous solution containing an alcohol (e.g., methanol or ethanol), for example.

Any of the above oxidation reactions can be repeated using an oxidized soy polysaccharide compound produced herein as the starting material for further modification. For example, soy polysaccharide that has been periodate-oxidized can be subjected to another round of periodate oxidation, or oxidation with another agent such as an N-oxoammonium salt.

Soy polysaccharide herein can optionally be provided in a pre-treated form prior to being oxidized according to the present disclosure. An example of a pre-treated form is soy polysaccharide that has been treated with an oxidizing agent other than those used in embodiments of the instantly disclosed subject matter. Thus, soy polysaccharide in certain aspects herein can be provided in a pre-oxidized form. It is contemplated that such pre-oxidized material in certain embodiments would comprise some amount of intact soy polysaccharide polymer that was not oxidized. It is believed that pre-oxidized soy polysaccharide can be prepared, for example, via application of oxidation processes as disclosed in Canadian Patent Publ. Nos. 2028284 and 2038640, and U.S. Pat. Nos. 4,985,553, 2,894,945, 5,747,658 and 7,595, 392, all of which are incorporated herein by reference.

The structure and molecular weight of an oxidized soy polysaccharide product can be determined using various physiochemical analyses known in the art such as NMR spectroscopy and size exclusion chromatography (SEC).

Any of the embodiments of soy polysaccharide disclosed herein can be used in an oxidation reaction, for example. Soy polysaccharide can be provided in some aspects of preparing an oxidation reaction in a dry form (e.g., powder, meal, flakes), wet form (e.g., aqueous mixture such as a slurry), or any other suitable form for preparing an oxidation reaction. Also, soy polysaccharide can be provided in the form of a soy polysaccharide preparation as disclosed herein.

Non-limiting examples of compositions and methods disclosed herein include:

1. A composition comprising an oxidized soy polysaccharide compound, wherein the compound is produced by contacting soy polysaccharide under aqueous conditions with: (i) at least one N-oxoammonium salt, (ii) at least one periodate compound, and/or (iii) at least one peroxide compound.
2. The composition of embodiment 1, wherein the soy polysaccharide is contacted with the N-oxoammonium salt.
3. The composition of embodiment 1, wherein the soy polysaccharide is first contacted with the periodate compound, and then contacted with the N-oxoammonium salt.
4. The composition of embodiment 1, 2, or 3, wherein the N-oxoammonium salt comprises a TEMPO oxoammonium salt.
4a. The composition of embodiment 1, wherein the soy polysaccharide is contacted with the peroxide compound, and wherein the peroxide compound preferably is hydrogen peroxide.
5. The composition of embodiment 1, 2, 3, 4, or 4a, wherein the composition is a household product, personal care product, industrial product, pharmaceutical product, or food product.
6. The composition of embodiment 5, wherein the composition is a detergent composition, and further wherein the composition is preferably a household product.
7. A method of producing an oxidized soy polysaccharide compound, the method comprising: (a) contacting soy polysaccharide under aqueous conditions with: (i) at least one N-oxoammonium salt, (ii) at least one periodate compound, and/or (iii) at least one peroxide compound, wherein the soy polysaccharide is oxidized by the N-oxoammonium salt, periodate compound, and/or peroxide compound thereby producing an oxidized soy polysaccharide compound, and (b) optionally, isolating the oxidized soy polysaccharide compound.
8. The method of embodiment 7, wherein the soy polysaccharide is contacted with the N-oxoammonium salt.
9. The method of embodiment 7, wherein the soy polysaccharide is first contacted with the periodate compound, and then contacted with the N-oxoammonium salt.
10. The method of embodiment 7, 8, or 9, wherein the N-oxoammonium salt comprises a TEMPO oxoammonium salt.
11. The method of embodiment 10, wherein the N-oxoammonium salt comprises a 4-acetamido-TEMPO oxoammonium salt.
12. The method of embodiment 10 or 11, wherein the TEMPO oxoammonium salt is provided by oxidizing an agent comprising TEMPO under said aqueous conditions.
12a. The method of embodiment 7, wherein the soy polysaccharide is contacted with the peroxide compound, and wherein the peroxide compound preferably is hydrogen peroxide.
13. The method of embodiment 7, 8, 9, 10, 11, 12, or 12a, wherein the aqueous conditions are acidic or basic.
14. A method of increasing the builder capacity and/or anti-redeposition capacity of an aqueous composition, wherein the method comprises: contacting an oxidized soy polysaccharide compound (i) produced according to the method of any one of embodiments 7-13, or (ii) as recited in any one of embodiments 1-4 or 4a, with an aqueous composition, wherein the builder and/or anti-redeposition capacity of the aqueous composition is increased by the oxidized soy polysaccharide compound compared to the builder and/or anti-redeposition capacity of the aqueous composition before the contacting step.
15. A method of treating a material, said method comprising: contacting a material with an aqueous composition comprising an oxidized soy polysaccharide compound that is (i) produced according to the method of any one of embodiments 7-13, or (ii) as recited in any one of embodiments 1-4 or 4a.

EXAMPLES

The present disclosure is further exemplified in the following Examples. It should be understood that these Examples, while indicating certain preferred aspects herein, are given by way of illustration only. From the above discussion and these Examples, one skilled in the art can ascertain the essential characteristics of the disclosed embodiments, and without departing from the spirit and scope thereof, can make various changes and modifications to adapt the disclosed embodiments to various uses and conditions.

Preparation of Insoluble Soy Polysaccharide

Insoluble soy polysaccharide was prepared as a byproduct of the soy protein extraction procedure outlined in FIG. 2. Soy white flake, which was obtained after removing oil from soybeans, was subjected to protein extraction to isolate soy protein. Byproducts of the protein extraction process included insoluble polysaccharide ("spent flake"/"soy fiber" in FIG. 2) and soluble polysaccharides ("soy whey"/"molasses" in FIG. 2). The insoluble polysaccharide preparation comprised mostly insoluble polysaccharide (~85.8 wt %), but also some protein (~10.1 wt %), lipid (~0.8 wt %), and ash (~3.3 wt %) (see Table 7 below).

Example 1

Preparation of Oxidized Soy Polysaccharide at Room Temperature

This Example describes producing oxidized soy polysaccharide in a reaction held at room temperature using an N-oxoammonium salt.

1 g of soy polysaccharide (a dry, tan powder) was added to 99 mL of de-ionized (DI) water and adjusted to pH 11.5 using 15% sodium hydroxide in a 500-mL capacity Erlenmeyer flask fitted with a thermocouple for temperature monitoring, a rubber stopper, and a magnetic stir bar. 4-acetamido-TEMPO (0.086 g, Sigma-Aldrich, St. Louis, Mo.) and sodium bromide (1.92 g) were then added to this preparation. Sodium hypochlorite (50 g) was next added to the preparation, which was then stirred for 1 hour at room temperature (20-25° C.) while maintaining the pH at 11 using 15% sodium hydroxide. At the completion of this reaction, the solution was neutralized using 3.6% hydrochloric acid. The reaction was quenched by adding an excess amount of methanol, thereby precipitating solid oxidized soy polysaccharide product. The solid (sample product no. 132) thus formed was collected by vacuum filtration, washed with ethanol (95%) four times, and dried under a vacuum at 20-25° C.

An additional reaction was performed using the same preparation and reaction conditions as above, except that 10 g of sodium hypochlorite was used (instead of 50 g). The reaction product (sample 134) was isolated as described above.

Thus, oxidized soy polysaccharide was prepared and isolated from reactions maintained at room temperature. An N-oxoammonium salt was used as an oxidant in these reactions.

Example 2

Preparation of Oxidized Soy Polysaccharide at Room Temperature Using a Two-Step Reaction Process This Example describes producing oxidized soy polysaccharide using a two-step reaction process held at room temperature. A first oxidation was performed with a periodate compound, afterwhich a second oxidation was performed with an N-oxoammonium salt.

4.7 g of sodium periodate was dissolved in 100 g of DI water in a 500-mL capacity Erlenmeyer flask fitted with a thermocouple for temperature monitoring, a rubber stopper, and a magnetic stir bar. 1 g of soy polysaccharide was added to this preparation, which was then stirred for 48 hours at room temperature (20-25° C.). The reaction was quenched by adding 15 g of ethylene glycol. Excess methanol was added to precipitate any dissolved solid. Solid material (periodate-oxidized soy polysaccharide) was then collected by vacuum filtration, washed with 95% ethanol, and dried under vacuum.

1 g of periodate-oxidized soy polysaccharide (prepared above) was added to 100 mL of sodium acetate buffer (1.64 g of sodium acetate dissolved in 100 mL of 5% acetic acid and adjusted to pH 4.6 with sodium hydroxide) in a 500-mL capacity Erlenmeyer flask fitted with a thermocouple for temperature monitoring, a rubber stopper, and a magnetic stir bar. Sodium chlorite (0.68 g) and 4-acetamido-TEMPO (0.096 g) were then added to this preparation. Sodium hypochlorite (5 g) was next added to the preparation, which was then stirred for 72 hours at room temperature (20-25° C.). The reaction was quenched by adding an excess amount of ethanol, thereby precipitating solid oxidized soy polysaccharide product. The solid (sample product no. 189) thus formed was collected by vacuum filtration, washed with ethanol (95%) four times, and dried under a vacuum at 20-25° C.

Additional two-step reactions at room temperature were carried out using different reaction conditions (Table 1), thereby preparing sample products 200 and 244.

TABLE 1

Preparation of Oxidized Soy Polysaccharide Using Various Two-Step Reaction Conditions

| Sample Product Designation | Substrate[a] | Sodium Periodate | TEMPO[b] | Sodium Chlorite | Sodium Hypochlorite | Reaction Time |
|---|---|---|---|---|---|---|
| 200 | 1 g | 4.7 g | 0.09 g | 0.68 g | 5.9 g | 96 hr. |
| 244 | 2 g | 6.9 g | 0.3 g | 2.1 g | 10 g | 72 hr. |

[a]Starting amount of soy polysaccharide entered into the two step reaction.
[b]4-acetamido-TEMPO.

Thus, oxidized soy polysaccharide was prepared and isolated using two-step oxidation reactions maintained at room temperature. A periodate compound and an N-oxoammonium salt were used as oxidizing agents in these reactions.

Example 3

Oxidized Soy Polysaccharide has Builder Activity

This Example discloses testing whether oxidized soy polysaccharide has builder activity. This activity was determined by measuring the calcium dispersing capacity of oxidized soy polysaccharide material under aqueous conditions.

For each assay, oxidized soy polysaccharide (as prepared in above Examples) was dissolved into 100 mL of water with stirring using a magnetic stir bar. The exact mass of the oxidized soy polysaccharide that dissolved was recorded, after which the pH was adjusted to 8 using 4.5% sodium hydroxide. To this solution 10 g of 2% sodium carbonate was added and the pH was then adjusted to 11 using sodium hydroxide (if needed). The turbidity of the solution was measured using a turbidity meter. A 4.4% calcium acetate solution was titrated into the oxidized soy solution using a glass burette, with samples taken out for turbidity measurements after each addition. When the percent transmittance of the solution decreased, such decrease indicated that the oxidized soy polysaccharide was no longer dispersing the calcium carbonate. The amount of calcium acetate added during the assay was used to determine the calcium dispersing capacity of the oxidized soy polysaccharide. The calcium dispersing capacity of each sample of oxidized soy polysaccharide is listed in Table 2.

TABLE 2

Calcium Dispersing Capacity of Oxidized Soy Polysaccharide

| Sample Product | Mass (g) Dissolved | Calcium Acetate (mL) | CCDC$^a$ of sample (g calcium carbonate/g polymer) |
|---|---|---|---|
| 189 | 0.0499 | 0.88 | 775.9 |
| 200 (1) | 0.0194 | 0.65 | 1474.2 |
| 200 (2) | 0.1015 | 0.85 | 593.9 |
| 244 | 0.1052 | 2.41 | 1007.9 |

$^a$CCDC, calcium carbonate dispersing capacity.

Each sample of oxidized soy polysaccharide exhibited the ability to delay precipitation of calcium carbonate in this assay, thereby indicating that oxidized soy polysaccharide has builder activity. Such builder activity is contemplated to be useful in various applications that benefit from the use of a builder, such as in fabric care compositions.

Example 4

Adsorption of Oxidized Soy Polysaccharide on Various Fabrics

This example discloses how one could test the degree of adsorption of oxidized soy polysaccharide herein, such as produced above, on different types of fabric.

First, calibration curves were prepared that could be useful for determining the relative level of adsorption of oxidized soy polysaccharide onto fabric surfaces.

Solutions of known concentration (ppm) were made using Direct Red 80 and Toluidine Blue O dyes. The absorbance of these solutions were measured using a LAMOTTE SMART2 Colorimeter at either 520 or 620 nm. The absorption information was plotted in order that it can be used to determine dye concentration of solutions exposed to fabric samples. The concentration and absorbance of each calibration curve are provided in Tables 3 and 4.

TABLE 3

Direct Red 80 Dye Calibration Curve Data

| Dye Concentration (ppm) | Average Absorbance @520 nm |
|---|---|
| 25 | 0.823333333 |
| 22.5 | 0.796666667 |
| 20 | 0.666666667 |
| 15 | 0.51 |
| 10 | 0.37 |
| 5 | 0.2 |

TABLE 4

Toluidine Blue O Dye Calibration Curve Data

| Dye Concentration (ppm) | Average Absorbance @620 nm |
|---|---|
| 12.5 | 1.41 |
| 10 | 1.226666667 |
| 7 | 0.88 |
| 5 | 0.676666667 |
| 3 | 0.44 |
| 1 | 0.166666667 |

These calibration curves may be useful for determining the relative level of adsorption of oxidized soy polysaccharide on fabric surfaces, such as by following the below methodology.

0.07 wt % or 0.25 wt % solutions of an oxidized soy polysaccharide compound in deionized water are made. Each solution is divided into several aliquots with different concentrations of compound (Table 5). Other components are added such as acid (dilute hydrochloric acid) or base (sodium hydroxide) to modify pH, or NaCl salt.

TABLE 5

Oxidized Soy Polysaccharide Compound Solutions Useful in Fabric Adsorption Studies

| Amount of NaCl (g) | Amount of Solution (g) | Compound Concentration (wt %) | Final pH |
|---|---|---|---|
| 0 | 15 | 0.07 | ~7 |
| 0.15 | 14.85 | 0.0693 | ~7 |
| 0.3 | 14.7 | 0.0686 | ~7 |
| 0.45 | 14.55 | 0.0679 | ~7 |
| 0 | 9.7713 | 0.0683 | ~3 |
| 0 | 9.7724 | 0.0684 | ~5 |
| 0 | 10.0311 | 0.0702 | ~9 |
| 0 | 9.9057 | 0.0693 | ~11 |
| 0 | 15 | 0.25 | ~7 |
| 0.15 | 14.85 | 0.2475 | ~7 |
| 0.3 | 14.7 | 0.245 | ~7 |
| 0.45 | 14.55 | 0.2425 | ~7 |
| 0 | 9.8412 | 0.2459 | ~3 |
| 0 | 9.4965 | 0.2362 | ~5 |
| 0 | 9.518 | 0.2319 | ~9 |
| 0 | 9.8811 | 0.247 | ~11 |

Four different fabric types (cretonne, polyester, 65:35 polyester/cretonne, bleached cotton) are cut into 0.17 g pieces. Each piece is placed in a 2-mL well in a 48-well cell culture plate. Each fabric sample is exposed to 1 mL of each of the above solutions (Table 5) (a control solution with no compound is included for each fabric test). The fabric samples are allowed to sit for at least 30 minutes in the compound solutions. The fabric samples are removed from the compound solutions and rinsed in DI water for at least one minute to remove any unbound compound. The fabric samples are then dried at 60° C. for at least 30 minutes until constant dryness is achieved. The fabric samples are weighed after drying and individually placed in 2-mL wells in a clean 48-well cell culture plate. The fabric samples are then exposed to 1 mL of a 250 ppm Direct Red 80 dye solution or a 250 ppm Toluidine Blue dye solution. The samples are left in the dye solution for at least 15 minutes. Each fabric sample is removed from the dye solution, after which the dye solution is diluted 10×.

The absorbance of the diluted solutions is measured compared to a control sample. A relative measure of oxidized soy polysaccharide compound adsorbed to the fabric is calculated based on the calibration curve created above for Direct Red 80 and/or Toluidine Blue dye, as appropriate. Specifically, the difference in UV absorbance for the fabric samples exposed to the oxidized compound compared to the controls (fabric not exposed to compound) represents a relative measure of compound adsorbed to the fabric. This difference in UV absorbance could also be expressed as the amount of dye bound to the fabric (over the amount of dye bound to control), which is calculated using the calibration curve (i.e., UV absorbance is converted to ppm dye). A positive value represents the dye amount that is in excess to the dye amount bound to the control fabric, whereas a negative value represents the dye amount that is less than the dye amount bound to the control fabric. A positive value would reflect that the oxidized soy polysaccharide compound adsorbed to the fabric surface.

It is believed that this assay would demonstrate that oxidized soy polysaccharide can adsorb to various types of fabric under different salt and pH conditions. This adsorption would suggest that oxidized soy polysaccharide compounds are useful in detergents for fabric care (e.g., as anti-redeposition agents).

Example 5

Peroxide Solubilization of Soy Polysaccharide

This Example describes producing oxidized soy polysaccharide in a reaction comprising a peroxide compound.
General Overview of Process:
Soy polysaccharides (a dry, tan powder) were mixed with deionized (DI) water to create a reaction slurry with a solids percentage of about 0.1% to 10%. The pH was then adjusted to the desired level, between about 2.8 and 11.2, using 2 M sodium hydroxide and/or 2 M hydrochloric acid. 30% hydrogen peroxide was then added to the reaction to achieve a w/w percentage of hydrogen peroxide to dry soy polysaccharides between about 0.6% and 50%. For some reactions, a chelating agent (e.g., EDTA, ~0.1% w/w based on dry soy polysaccharide content) was added to control the degree of polysaccharide degradation. The preparation was mixed thoroughly, sealed in a glass reaction vessel, and autoclaved for about 6.5 to 73.5 minutes at a temperature of about 80-150° C. The reaction was then cooled to room temperature, and centrifuged at 10,000×g for 15 minutes to remove insoluble material, leaving behind a soluble fraction. This soluble fraction comprised peroxide-solubilized soy polysaccharide product, which is soluble in aqueous solution.

Figure 3:
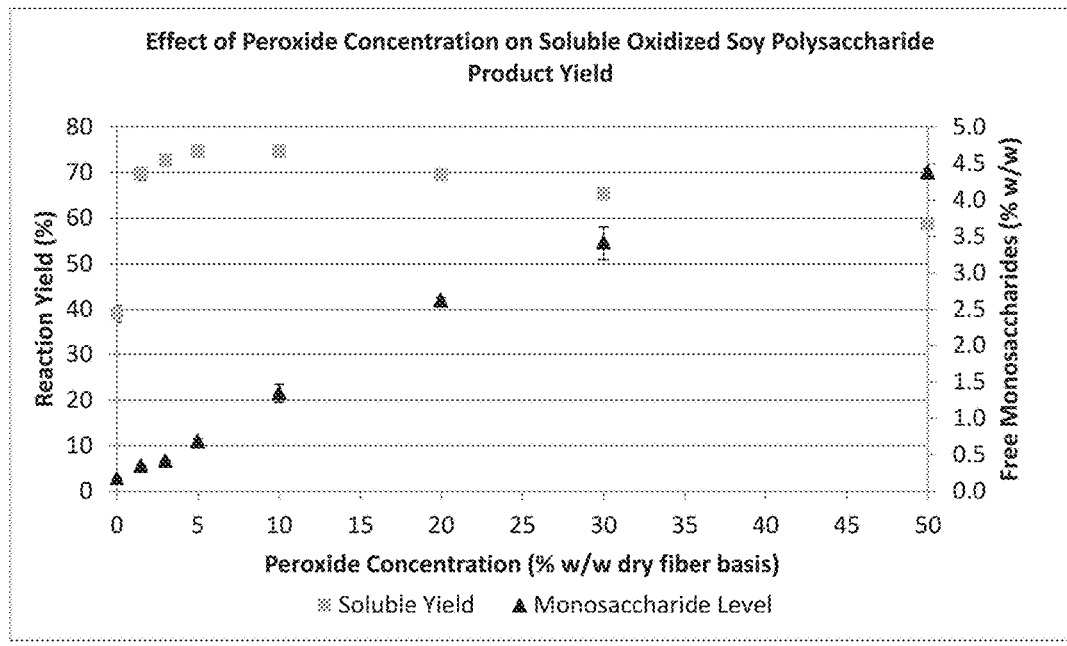
FIG. 3: Shown is the effect of hydrogen peroxide concentration on the overall yield of soluble oxidized soy polysaccharide and monosaccharides generated in a reaction performed at pH 7 and 121° C. for 60 minutes, initially containing 3% solids. Refer to Example 5.
Figure 4:
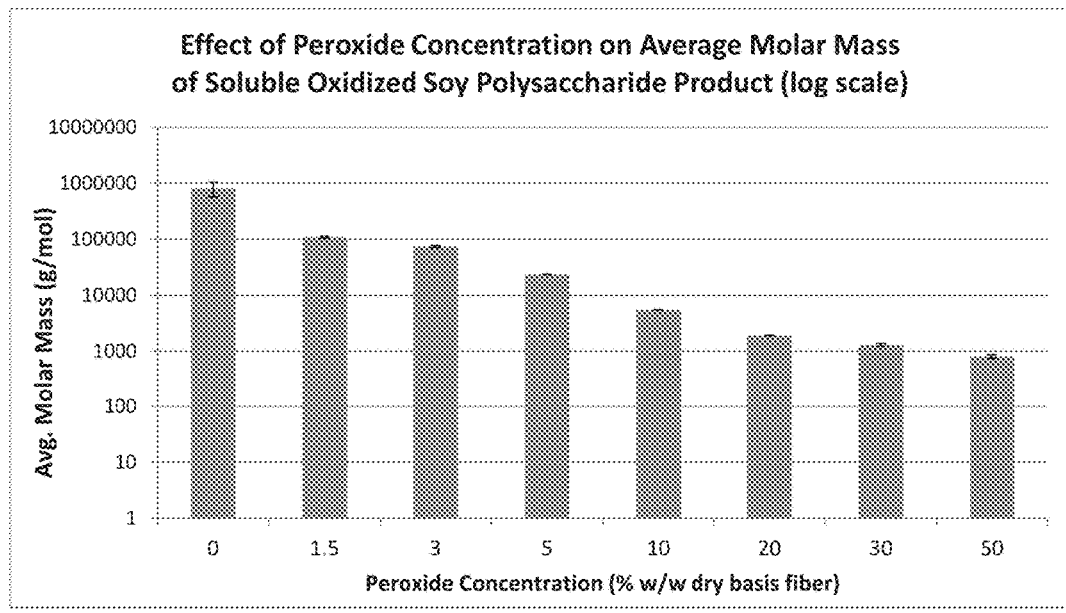
FIG. 4: Shown is the average molar mass (g/mol) of each soluble oxidized soy polysaccharide product analyzed in the experiment for which results are provided in FIG. 3. Refer to Example 5.

FIG. 3 shows the effect of hydrogen peroxide concentration on the overall yield of soluble oxidized soy polysaccharide and monosaccharides generated in a reaction performed at pH 7 and 121° C. for 60 minutes, initially containing 3% solids. All experiments were performed in duplicate. It was observed that the reaction yield varies from 40% (without peroxide addition) to 75% (with 5.10% w/w peroxide addition). There was also a linear relationship between peroxide addition level and free monosaccharides generated. FIG. 4 shows the average molar mass (g/mol) of each soluble oxidized soy polysaccharide product. These results (FIG. 4) indicate that as peroxide concentration is increased, there is a resulting increase in degradation of the polysaccharides to lower molar masses.

In order to partially describe the process of peroxide solubilization of soy polysaccharides, a design of experiment (DOE) was performed. A central composite design of three factors: reaction time (minutes), reaction pH, and hydrogen peroxide concentration (w/w %) were used. A two-level full factorial design was conducted with all samples performed in duplicate, resulting in a total of 40 individual reactions. Reaction time ranged from 6.5-73.5 minutes, reaction pH ranged from 2.8-11.2, and hydrogen peroxide concentration ranged from 0.6-12.4% in the DOE experiments. For each reaction, the corresponding soluble yield, free monosaccharide level, and average molar mass by SEC-MALS were determined. Response surface equations were generated for each response variable individually with full quadratic terms and backward elimination of insignificant terms at a threshold of $\alpha=0.1$. This model was chosen due to the continuous nature of the response variables and the desire to optimize these responses based on the process variables. The response variables of average molar mass and free monosaccharide percentage were transformed with a base-10 logarithm to achieve a normal distribution for these responses. In addition, a multivariate principal component analysis (PCA) was conducted with a correlation matrix to show the relationship between all response variables.

Table 6 (below) shows the resulting response surface equations for the three chosen response variables in terms of the three chosen experimental factors.

TABLE 6

Response Surface Parameters for DOE Models of Yield, Log(monosaccharides), and Log(avg. molar mass)

| | term | const. | conc. | time | pH | (conc.)$^2$ | (time)$^2$ | (pH)$^2$ | conc.* time | conc.* pH | time* pH |
|---|---|---|---|---|---|---|---|---|---|---|---|
| yield (%) | coded coefficient | 61.05 | 3.18 | 10.28 | −6.45 | — | −3.98 | 3.16 | — | 2.90 | 7.82 |
| | uncoded coefficient | 120.4 | −1.41 | 0.215 | −18.06 | — | −0.00994 | 0.505 | — | 0.332 | 0.1564 |

TABLE 6-continued

Response Surface Parameters for DOE Models of Yield, Log(monosaccharides), and Log(avg. molar mass)

| | term | const. | conc. | time | pH | (conc.)$^2$ | (time)$^2$ | (pH)$^2$ | conc.*<br>time | conc.*<br>pH | time*<br>pH |
|---|---|---|---|---|---|---|---|---|---|---|---|
| | p-value | 0.000 | 0.006 | 0.000 | 0.000 | — | 0.001 | 0.005 | — | 0.050 | 0.000 |
| log(mono.) | coded coefficient | −0.5772 | 0.0906 | 0.1329 | −0.3650 | — | −0.0381 | 0.1760 | — | — | — |
| | uncoded coefficient | 1.238 | 0.2587 | 0.01426 | −0.5403 | — | −0.000095 | 0.02816 | — | — | — |
| | p-value | 0.000 | 0.000 | 0.000 | 0.000 | — | 0.037 | 0.000 | — | — | — |
| log(avg. molar mass) | coded coefficient | 5.5118 | −0.2579 | −0.2936 | 0.4983 | −0.1442 | −0.0676 | −0.2765 | −0.1729 | — | 0.1730 |
| | uncoded coefficient | 2.574 | 0.1781 | −0.0093 | 0.6804 | −0.01177 | −0.000169 | −0.04425 | −0.002469 | — | 0.00346 |
| | p-value | 0.000 | 0.000 | 0.000 | 0.000 | 0.001 | 0.099 | 0.000 | 0.003 | — | 0.003 |

Figure 5:
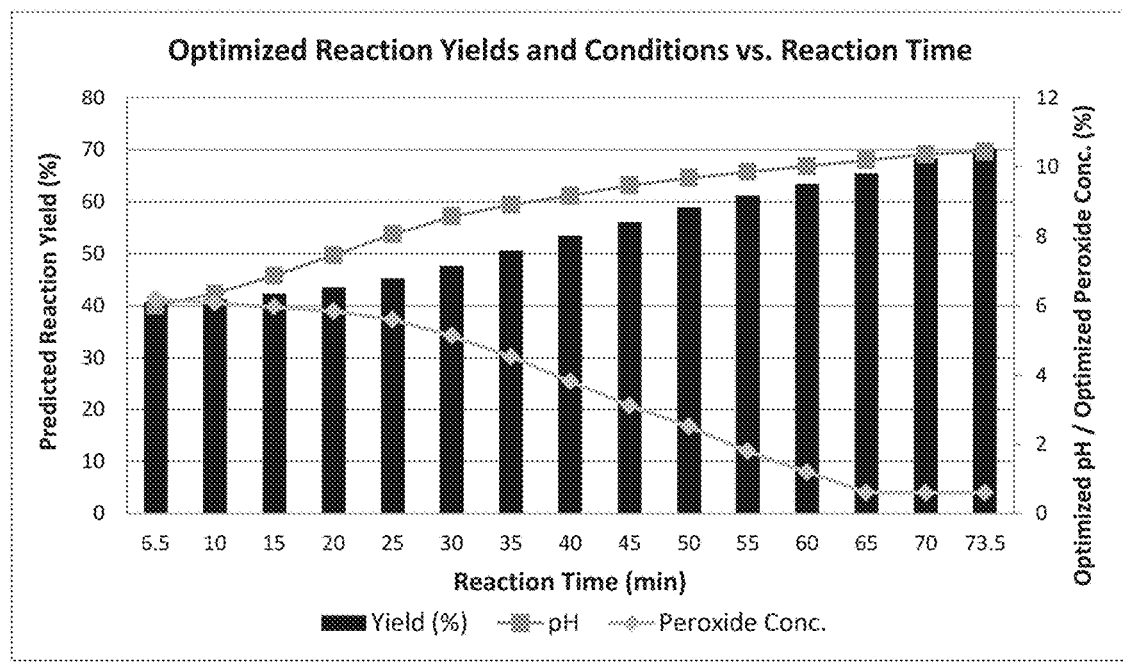
FIG. 5: Shown are optimized reaction yields, hydrogen peroxide concentration (%), and reaction pH over various reaction time periods. Refer to Example 5.
Figure 6:
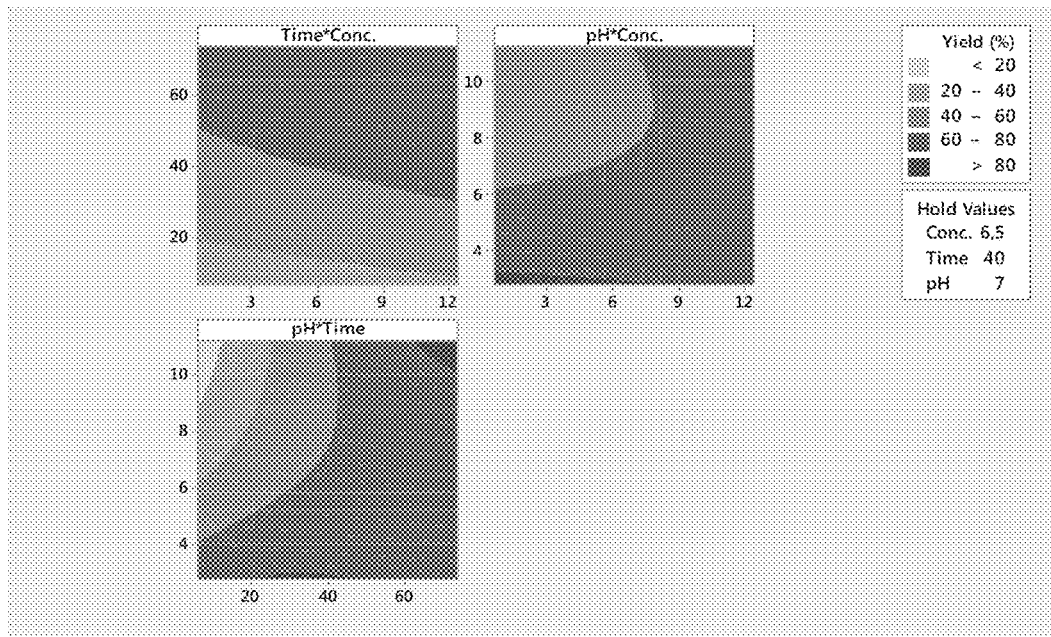
FIG. 6: Shown are contour plots of reaction yield response as a factor of the three reaction parameters of pH, reaction time, and peroxide concentration. Refer to Example 5.
Figure 7:
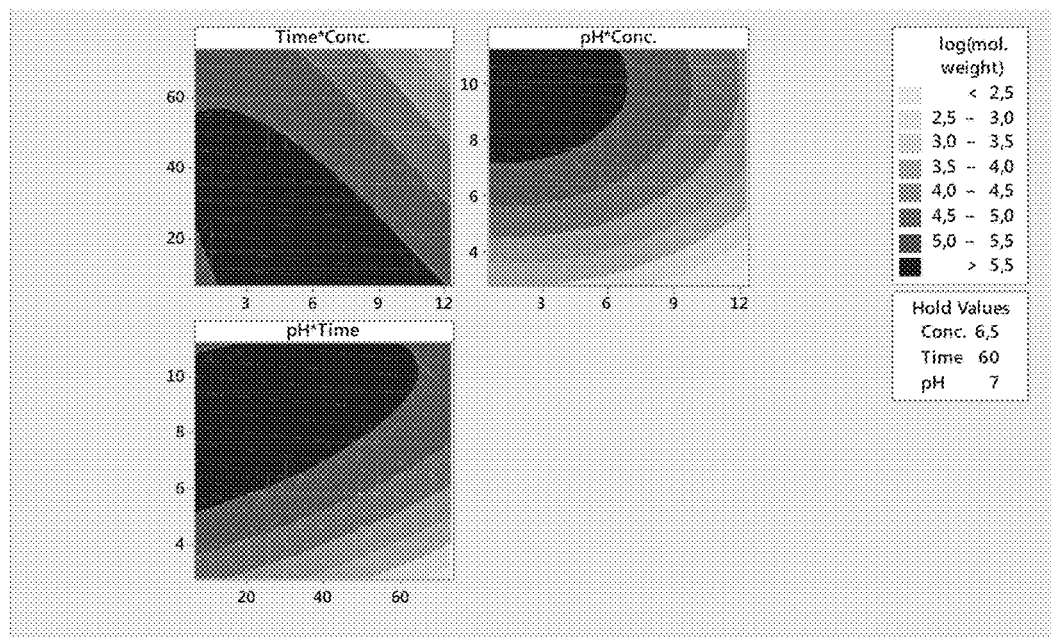
FIG. 7: Shown are contour plots of log(molar mass) response as a factor of the three reaction parameters of pH, reaction time, and peroxide concentration. Refer to Example 5.
Figure 8:
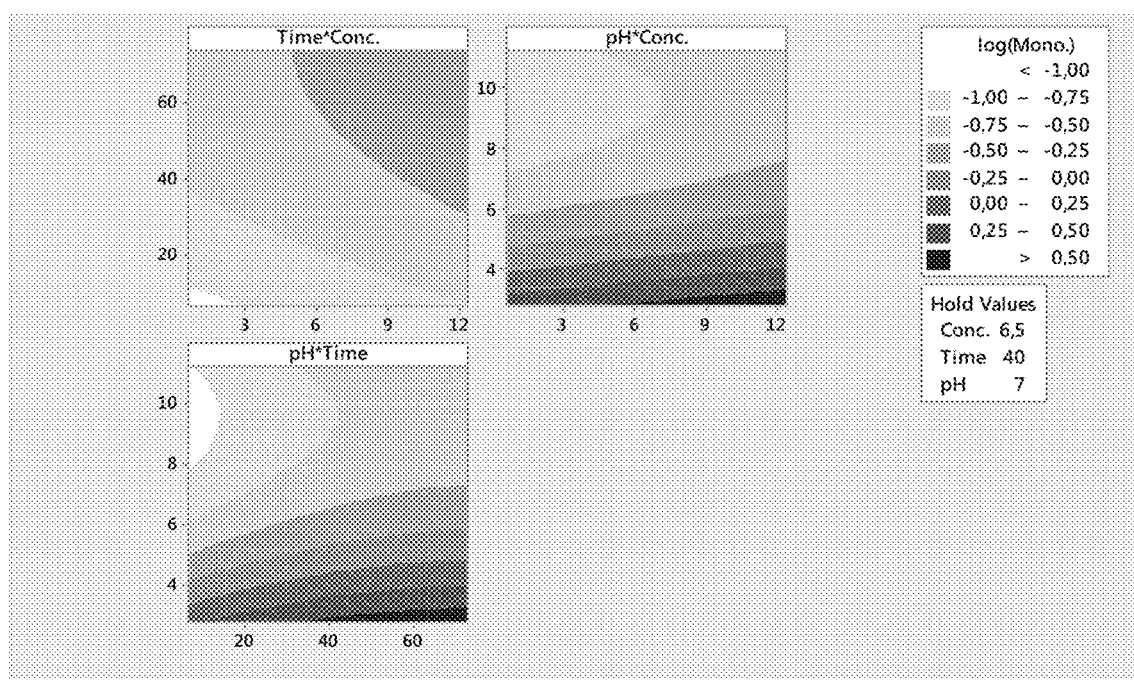
FIG. 8: Shown are contour plots of log(free monosaccharides) response as a factor of the three reaction parameters of pH, reaction time, and peroxide concentration. Refer to Example 5.

The coded coefficients were useful for directly comparing the effects of the different factors, and the uncoded coefficients were used directly in a response surface equation to predict the value of a response variable. The relationships described by these equations are visually represented in the contour plots shown in FIGS. 6-8. This model exemplifies a peroxide solubilization process and can be used to predict optimal reaction conditions for satisfying certain desired reaction criteria. As an example of this operation, FIG. 5 shows the results of maximizing reaction yield, minimizing free monosaccharides generated, and maximizing average molar mass for varying reaction times at a constant temperature of 121° C. and 3% initial solids provided to a reaction. Only the optimized reaction yield is provided in this figure, but all three response variables are optimized.

Various reactions for solubilizing soy polysaccharide via peroxide-mediated oxidation were carried out as follows (Examples 4A-D).

Example 5A 3.6 g of soy polysaccharide (spent flake, a dry tan powder) was added to 116.4 mL of DI water and adjusted to pH 7.0 using 2 M sodium hydroxide in a 250-mL glass reaction vessel. Next, 360 mg of 30% hydrogen peroxide was added to this preparation to achieve a 3% w/w addition of hydrogen peroxide based on dry soy polysaccharide content. The preparation was mixed thoroughly, sealed in the glass reaction vessel and autoclaved for 60 minutes at 121° C. The reaction was cooled to room temperature following this treatment. The reaction was then centrifuged at 10,000×g for 15 minutes to remove insoluble material, leaving behind a soluble fraction. This soluble fraction comprised peroxide-solubilized soy polysaccharide, which is soluble in aqueous solution.

Table 7 (below) shows the compositions of the starting material and the soluble and insoluble fractions of the peroxide solubilization reaction performed in Example 5A. It is apparent from these data that an oxidized soy polysaccharide preparation herein can contain protein, lipid, and ash material.

TABLE 7

Composition of Peroxide Stabilization Reaction Components/Fractions

| sample | dry basis protein (%) | dry basis fat (%) | dry basis minerals (%) | dry basis carbohydrate by difference (%) |
|---|---|---|---|---|
| Starting soy spent flake | 10.05 | 0.82 | 3.31 | 85.82 |
| Post peroxide treatment: soluble fraction | 6.81 | 0.38 | 0.99 | 91.82 |
| Post peroxide treatment: insoluble fraction | 13.43 | 1.22 | 3.63 | 81.72 |

GC-MS was used to quantify the glycosidic linkage profiles of the soy polysaccharide substrate, and of the soluble and insoluble fractions produced by the oxidation reaction of Example 5A. These data are provided in Table 8 (below).

TABLE 8

Linkage (Molar %) Profiles of Peroxide Solubilization Reaction Components/Fractions

| | Starting soy | Post peroxide treatment | |
|---|---|---|---|
| Linkage | polysaccharide [n = 4] | soluble fraction [n = 2] | insoluble fraction [n = 2] |
| arabinose | | | |
| T-Araf-(1→ | 11.8 | 14.7 | 8.5 |
| T-Arap-(1→ | 2.0 | 0.8 | 3 |
| →2)-Araf-(1→ | 0.2 | 0.2 | 0.3 |
| →3)-Araf-(1→ | 0.2 | 0.2 | 0.2 |
| →5)-Araf-(1→ | 11.4 | 14.8 | 7.4 |
| →3,5)-Araf-(1→ | 3.2 | 3.8 | 1.7 |
| →2,5)-Araf-(1→ | 2.1 | 2 | 1 |
| galactose | | | |
| T-Galp-(1→ | 2.8 | 3.0 | 1.7 |
| →4)-Galp-(1→ | 30.7 | 39.3 | 19.9 |
| →2)-Galp-(1→ | 1.0 | 0.4 | 1.3 |
| →6)-Galp-(1→ | 0.2 | 1 | 0.3 |
| →3,4)-Galp-(1→ | 0.4 | 0.8 | 0 |
| →2,4)-Galp-(1→ | 0.4 | 0.6 | 0 |
| →2,3,4)-Galp-(1→ | 0.1 | 0.1 | 0.2 |
| →2,4,6)-Galp-(1→ | 0.1 | 0.1 | 0 |

TABLE 8-continued

Linkage (Molar %) Profiles of Peroxide Solubilization Reaction Components/Fractions

| Linkage | Starting soy polysaccharide [n = 4] | Post peroxide treatment soluble fraction [n = 2] | Post peroxide treatment insoluble fraction [n = 2] |
|---|---|---|---|
| glucose | | | |
| T-Glcp-(1→ | 0.3 | 0.1 | 0.3 |
| →4)-Glcp-(1→ | 20.1 | 0.5 | 39.7 |
| →3,4)-Glcp-(1→ | 0.4 | 0 | 0.9 |
| →2,4)-Glcp-(1→ | 0.2 | 0 | 0 |
| →4,6)-Glcp-(1→ | 1.7 | 0 | 0 |
| →3,6)-Glcp-(1→ | 0.9 | 0 | 0 |
| →3,4,6)-Glcp | 0.1 | 0 | 0.1 |
| fucose | | | |
| T-Fucp-(1→ | 1.5 | 1 | 1.8 |
| xylose | | | |
| →2-Xylp-(1→ | 2.8 | 3.4 | 3.1 |
| rhamnose | | | |
| →2,4)-Rhap-(1→ | 1.8 | 3 | 1.2 |
| mannose | | | |
| T-Manp-(1→ | 0.1 | 0 | 0.2 |
| →4,6)-Manp-(1→ | 0.2 | 0 | 2 |
| galacturonic acid | | | |
| T-GalAp-(1→ | 0.2 | 0.3 | 0.2 |
| →4)-GalAp-(1→ | 3.5 | 9.8 | 5 |

As shown in Table 8, the linkages of the starting soy polysaccharides indicate the presence of various polysaccharide types including arabinan [→5)-Araf-(1→; →2,5)-Araf-(1→; →3,5)-Araf-(1→], type I arabinogalactan [→4)-Galp-(1→; →3,4)-Galp-(1→; T-Araf-(1→], homogalactan [→4)-Galp-(1→], homogalacturonan [→4)-GalAp-(1→; T-GalAp-(1→], rhamnogalacturonan [→2,4)-Rhap-(1→], xyloglucan [→4,6)-Glcp-(1→; →4)-Glcp-(1→; →2)-Xylp-(1→; →2-Galp-(1→; T-Fucp-(1→], and cellulose [→4)-Glcp-(1→]. It was observed that the hydrogen peroxide solubilization of this material results in a final soluble product enriched in polysaccharides. Table 8 also provides the linkage profile of insoluble oxidized soy polysaccharide. The insoluble fraction was heavily enriched in cellulosic polysaccharides which appear to be more resistant to solubilization via this process. In total, the linkage results clearly demonstrate that the hydrogen peroxide solubilization process generates oxidized soluble soy polysaccharide with a linkage profile that is highly representative of native soy polysaccharides of soy spent flake.

Further analysis was made to quantify the glycosidic linkage profiles of the soy polysaccharide substrate, and of the soluble and insoluble fractions produced by the oxidation reaction of Example 5A. These data are provided in Table 9 (below); the values shown are averages of duplicate analyses. Table 9 also provides the common polysaccharide types typically associated with each observed linkage type.

TABLE 9

Linkage (Molar %) Profiles of Peroxide Reaction Substrate and Products

| Monosaccharide[a] | Linkage | Starting Spent Flake Mol % | H$_2$O$_2$ Treat. Soluble Mol % | H$_2$O$_2$ Treat. Insoluble Mol % | Common associated polysaccharide types[a] |
|---|---|---|---|---|---|
| Ara(f) | Terminal | 12.3 | 15.3 | 11.0 | Type I/II AG, HX, XG, arabinan |
| | 2- | 0.4 | 0.1 | 0.5 | Type I/II AG, HX, RGII |
| | 3- | 0.2 | 0.3 | 0.4 | HX |
| | 5- | 2.1 | 2.5 | 2.5 | Arabinan, Type II AG, HX |
| | 3,5- | 3.0 | 3.5 | 2.5 | Arabinan |
| Ara(p) | Terminal | 1.7 | 1.2 | 2.8 | Type II AG |
| Gal(p) | Terminal | 2.0 | 4.3 | 3.3 | XG, Type II AG, HX, RGI, RGII |
| | 4- | 26.8 | 36.6 | 20.7 | Type I AG/RGI |
| | 3- | 1.7 | 0.7 | 1.7 | Type II AG |
| | 6- | 0.1 | 0.2 | 0.3 | Type II AG, RGI, RGII |
| | 3,4- | 0.5 | 0.3 | 0.4 | Type I AG |
| | 2,4- | 0.3 | 0.2 | 0.3 | Type I AG |
| | 3,4,6- | 0.1 | 0.0 | 0.0 | Type II AG |
| | 2,3,4- | 0.1 | 0.0 | 0.0 | Type I AG |
| Glc(p) | Terminal | 0.4 | 0.1 | 0.6 | Across glucan classes |
| | 4- | 24.0 | 1.7 | 27.0 | Cellulose, XG, HM, starch |
| | 6- | 0.2 | 0.1 | 0.2 | — |
| | 3,4- | 0.3 | 0.9 | 0.4 | — |
| | 2,4- | 0.2 | 0.0 | 0.2 | — |
| | 4,6- | 0.5 | 0.4 | 0.4 | XG, starch |
| | 3,4,6- | 0.1 | 0.0 | 0.0 | — |
| Fuc(p) | Terminal | 1.4 | 0.7 | 3.1 | XG |
| Xyl(p) | 2- | 1.1 | 2.2 | 1.5 | XG, RGII |
| | 4- | 9.8 | 12.4 | 8.4 | HX |
| | 2,4- | 2.0 | 2.8 | 1.3 | HX |
| | 3,4- | 0.2 | 0.0 | 0.2 | HX |
| Rha(p) | Terminal | 0.0 | 0.1 | 0.0 | Type II AG, RGII |
| | 2- | 0.9 | 1.4 | 1.5 | RGI |
| | 2,4- | 2.1 | 4.1 | 1.8 | RGI |
| Man(p) | Terminal | 0.2 | 0.2 | 0.0 | — |
| | 4,6- | 0.0 | 0.0 | 2.4 | HM |

TABLE 9-continued

Linkage (Molar %) Profiles of Peroxide Reaction Substrate and Products

| Mono-saccharide[a] | Linkage | Starting Spent Flake Mol % | H$_2$O$_2$ Treat. Soluble Mol % | H$_2$O$_2$ Treat. Insoluble Mol % | Common associated polysaccharide types[a] |
|---|---|---|---|---|---|
| GalA(p) | Terminal | 0.2 | 0.5 | 0.6 | HG, RGI, RGII |
|  | 4- | 4.7 | 6.5 | 3.7 | HG, RGI |
|  | 3,4- | 0.0 | 0.8 | 0.0 | RGI |
| GlcA(p) | Terminal | 0.1 | 0.0 | 0.3 | HX, Type II AG, RGII |

[a]Abbreviations: (f) = furanose; (p) = pyranose; Ara = Arabinose; Gal = Galactose; Glc = Glucose; Fuc = Fucose; Xyl = Xylose; Rha = Rhamnose; GalA = Galacturonic Acid; GlcA = Glucuronic Acid; AG = Arabinogalactan; HG = Homogalacturonan; HM = Heteromannan; HX = Heteroxylan; RG = Rhamnogalactan; XG = Xyloglucan.

Table 10 (below) shows the calculated levels of various polysaccharide classes for these three samples (starting spent flake, soluble oxidized product, insoluble oxidized product) using assignment criteria in Pettolino et al. (*Nature Protocols* 7:1590-1607, incorporated herein by reference). Approximately 85% of the observed linkages were assigned to polysaccharide classes using these criteria. It was observed that the H$_2$O$_2$-mediated oxidation in this Example resulted in a soluble product enriched in arabinan, type I AG, HG, rhamnogalacturonan, (glucurono)arabinoxylan, and XG polysaccharides.

TABLE 10

Polysaccharide Composition (Molar %) of Peroxide Reaction Substrate and Products

| Polysaccharide | Starting Spent Flake | H$_2$O$_2$ Treated Soluble | H$_2$O$_2$ Treated Insoluble |
|---|---|---|---|
| Arabinan | 8.1 | 9.6 | 7.5 |
| Type I AG[a] | 27.8 | 37.1 | 21.6 |
| Type II AG | 2.0 | 0.9 | 2.0 |
| XG | 2.7 | 3.4 | 2.5 |
| Rhamnogalacturonan I/II | 6.2 | 11.1 | 6.7 |
| HG | 1.6 | 2.2 | 0.3 |
| (Glucurono)arabinoxylan | 14.4 | 18.3 | 11.9 |
| HM | 0.0 | 0.0 | 4.7 |
| Cellulose | 23.5 | 1.3 | 26.7 |
| Others (Unassigned) | 13.7 | 16.1 | 16.1 |

[a]Abbreviations: AG = arabinogalactan; HG = homogalacturonan; HM = heteromannan; XG = xyloglucan.

The linkage and monosaccharide profiles disclosed in Table 9 were determined using the following procedures:
Complete Acid Hydrolysis for Monosaccharide Profile: Sulfuric acid (12 M) was added to the dry sample at a ratio of 6 mL/g sample and the samples were immediately vortexed to coat the dry sample in acid. The samples were incubated for 60 min in a 30° C. water bath with vortex-mixing every 15 min. After incubation, the acid concentration was diluted to 0.49 M through the addition of MILLIQ water. The samples were covered loosely and autoclaved in a TUTTNAUER 2840EL benchtop autoclave for 40 min at 123° C. The samples were then diluted with MILLIQ water to the required level for chromatographic analysis, filtered using 0.45-μm syringe filters, and analyzed by HPAEC-PAD (below). A concentration for each monosaccharide was determined, converted to a molar concentration using the molecular weight of the corresponding sugar, and converted to molar percentage by dividing each individual result by the total. All monosaccharide determination experiments were performed in triplicate.
Free Monosaccharide Determination: H$_2$O$_2$-treated soluble fractions and samples which underwent complete acid hydrolysis were diluted, filtered using 0.45-μm syringe filters, and analyzed by HPAEC-PAD (below). A concentration for each monosaccharide was determined, and this value was multiplied by the total sample weight to determine a mass of each sugar in the fraction. This mass was adjusted to account for the added weight from hydration of the monosaccharides by multiplying the values by the ratio of the unhydrated mass to hydrated mass for each monosaccharide (e.g., the Glc ratio would be 0.9=162.14/180.16). Finally, these values were divided by the starting dry basis weight of soy spent flake used to give a corresponding percentage of the starting material which was identified as free monosaccharides.
Carbohydrate Linkage Determination by Gas-Chromatography-Mass Spectrometry (GC-MS): The glycosidic linkages present in the generated samples were determined by GC-MS as outlined in Pettolino et al. (*Nature Protocols* 7:1590-1607, incorporated herein by reference). Samples underwent cell wall alcohol insoluble residue (AIR) preparation, alpha-amylase digestion for starch removal, carboxyl reduction, methylation, hydrolysis with trifluoroacetic acid (TFA), reduction, acetylation, and GC-MS determination.
High Performance Anion Exchange Chromatography with Pulsed Amperometric Detection (HPAEC-PAD): Chromatographic analysis was performed on a DIONEX ICS-3000 Ion Chromatography system with a CarboPac® PA100 guard column (50×4 mm) followed by a CarboPac® PA100 analytical column (250×4 mm) and a PAD, all from Dionex Corporation (Sunnyvale, Calif.). The flow rate used was 1 mL/min under the following elution profile, with MILLIQ water as eluent A and 600 mM NaOH as eluent B: 0-26 min, 1.5% B; 26-27.6 min, 1.5-30% B; 27.5-30 min, 30% B; 30-33.5 min, 30-75% B; 33.5-43.5 min, 75% B; 43.5-43.6 min, 75-1.5% B; 43.5-57.5 min, 1.5% B. Monosaccharides were quantified using external calibration derived from six standards containing a mixture of Fuc, Rha, Ara, Gal, Glc, Xyl, GlcA, and GalA. The concentration levels used for all monosaccharides ranged from 0.5-20 parts per million (ppm). The standard curves for each sugar were fitted with a linear calibration curve without offset with the exception of Fuc where a second order polynomial calibration curve without offset was used.

Example 5B

A second reaction was performed largely following the above procedure in Example 5A, with the exception that a chelator (EDTA, 0.1% w/w based on dry soy polysaccharide content) was further included in the reaction. A chelator can be added to bind free transition metals in the reaction, limiting degradation mediated by the Fenton reaction. In addition, the reaction was performed using 7.2 g of soy polysaccharides (double the amount used in Example 5A).

Example 5C

A third reaction was performed generally following the above procedure in Example 5A, with the exception that the reaction was conducted at 80° C. for 240 minutes. In addition, the reaction was performed using 7.2 g of soy polysaccharides (double the amount used in Example 5A), and conducted in a heated water bath instead of an autoclave.

Example 5D

A third reaction was performed generally following the above procedure in Example 5A, with the exception that the reaction was conducted at 150° C. for 15 minutes. In addition, the reaction was performed using 7.2 g of soy polysaccharides (double the amount from Example 5A), and conducted in a bomb-reactor instead of an autoclave.

Thus, oxidized soy polysaccharide was prepared with reactions containing a peroxide compound. Such preparations were also found to comprise protein, lipid and ash material. From this observation, it is apparent that preparations of soy polysaccharide further comprising soy protein, lipid and/or ash can be used to prepare oxidized soy polysaccharide compositions. Also, the monosaccharide and linkage content, as well as the sub-polysaccharide content, of soluble and insoluble oxidized soy polysaccharide material were determined.

What is claimed is:

1. A composition comprising an oxidized water soluble soy polysaccharide compound, wherein the compound is produced by contacting a water insoluble soy polysaccharide under aqueous conditions with:
    (i) at least one N-oxoammonium salt,
    (ii) at least one periodate compound, and/or
    (iii) at least one peroxide compound;
    wherein the water insoluble soy polysaccharide comprises arabinose, galactose, xylose, and galacturonic acid as a majority of constituent monosaccharide monomeric units.

2. The composition of claim 1, wherein the soy polysaccharide is contacted with the N-oxoammonium salt.

3. The composition of claim 1, wherein the soy polysaccharide is first contacted with the periodate compound, and then contacted with the N-oxoammonium salt.

4. The composition of claim 1, wherein the N-oxoammonium salt comprises a TEMPO oxoammonium salt.

5. The composition of claim 1, wherein the composition is a household product, personal care product, industrial product, pharmaceutical product, or food product.

6. The composition of claim 5, wherein the household product is a detergent composition.

7. A method of producing an oxidized water soluble soy polysaccharide compound, the method comprising:
    (a) contacting a water insoluble soy polysaccharide under aqueous conditions in sequence first with at least one periodate compound followed by at least one N-oxoammonium salt,
        wherein the water insoluble soy polysaccharide is oxidized by the N-oxoammonium salt and periodate compound thereby producing an oxidized water soluble soy polysaccharide compound, and
    (b) optionally, isolating the oxidized water soluble soy polysaccharide compound.

8. The method of claim 7, wherein the N-oxoammonium salt comprises a TEMPO oxoammonium salt.

9. The method of claim 8, wherein the N-oxoammonium salt comprises a 4-acetamido-TEMPO oxoammonium salt.

10. The method of claim 8, wherein the TEMPO oxoammonium salt is provided by oxidizing an agent comprising TEMPO under said aqueous conditions.

11. The method of claim 7, wherein the aqueous conditions are acidic or basic.

12. A method of increasing the builder capacity and/or anti-redeposition capacity of an aqueous composition, wherein the method comprises:
    contacting an oxidized soy polysaccharide compound produced according to the method of claim 7 with an aqueous composition, wherein the builder and/or anti-redeposition capacity of the aqueous composition is increased by the oxidized soy polysaccharide compound compared to the builder and/or anti-redeposition capacity of the aqueous composition before the contacting step.

13. A method of treating a material, said method comprising:
    contacting a material with an aqueous composition comprising an oxidized soy polysaccharide compound produced according to the method of claim 7.

* * * * *